United States Patent [19]

Converse, III et al.

[11] Patent Number: 4,587,619
[45] Date of Patent: May 6, 1986

[54] METHOD AND APPARATUS FOR ELECTRONIC LEAK TESTING

[75] Inventors: Vernon G. Converse, III, Franklin; James M. Bordato, Grosse Pointe Wds.; Theodore R. Bott, Berkley; Charles E. Foerster, Jr., Northville, all of Mich.; Desra N. Herbst, Jr., Spring Valley, Ohio; Ronald K. Mudge, Brighton, Mich.; Richard L. Smith, Livonia, Mich.; Frank R. Young, Franklin, Mich.

[73] Assignee: Scans Associates, Inc., Livonia, Mich.

[21] Appl. No.: 330,384

[22] Filed: Dec. 14, 1981

[51] Int. Cl.⁴ .................. G01M 3/02; G06F 15/20
[52] U.S. Cl. ........................... 364/552; 73/40; 73/49.2; 340/605; 364/558
[58] Field of Search .............. 364/509, 510, 552, 558; 73/40, 45, 45.1, 45.2, 49.2; 137/312; 285/93; 340/605

[56] References Cited

U.S. PATENT DOCUMENTS

| | | | |
|---|---|---|---|
| 2,936,611 | 5/1960 | Le Mat et al. | 73/40 X |
| 3,100,986 | 8/1963 | Starr et al. | 73/40 |
| 3,457,775 | 7/1969 | Hinderer et al. | 73/40 |
| 3,465,562 | 9/1969 | Donohoe | 73/40 |
| 3,800,586 | 4/1974 | DeLatorre et al. | 73/49.2 |
| 3,872,712 | 3/1975 | Westervelt et al. | 73/49.2 X |
| 3,878,376 | 4/1975 | Sholes, Jr. et al. | 364/558 X |

FOREIGN PATENT DOCUMENTS 7624656 of 1976 France .

OTHER PUBLICATIONS

Patent Abstracts of Japan, vol. 4, No. 131, Sep. 13, 1980.
Furness Controls Limited, Catalog entitled "Production Line Leak Detectors".

Primary Examiner—Errol A. Krass
Assistant Examiner—Edward R. Cosimano
Attorney, Agent, or Firm—Gifford, Groh, VanOphem, Sheridan, Sprinkle & Dolgorukov

[57] ABSTRACT

The specification discloses an electronic dynamic balance leak testing system utilizing a "live zero", wherein a source of test medium at a predetermined desired pressure or vacuum is connected to a part to be tested, and after the part is filled with the test medium, and an interval is provided for the system to stabilize the affects due to wave front oscillations, the test part is momentarily isolated from said test media and a microcomputer system is utilized, both to cause said isolation, and to measure the differential pressure existing at two points during the test. In a modification of our system which can dynamically project leak and accept or reject parts much sooner because of this projection feature, the rate of change of the differential pressure transducer is examined and is compared to a curve which is characteristic of the rate of change of a volume which is experiencing a predominately leak based change of pressure. When the rate of change is determined to be predominately a leak based change, the rate of change is determined to be a "Qualified Leak" or a qualified curve. In this case, after a predetermined sample time elapses from the point at which the curve was qualified, a reading of leakage is taken, such reading is then extrapolated to a full test time reading and compared to limits to see if a part is to be accepted or rejected.

73 Claims, 57 Drawing Figures

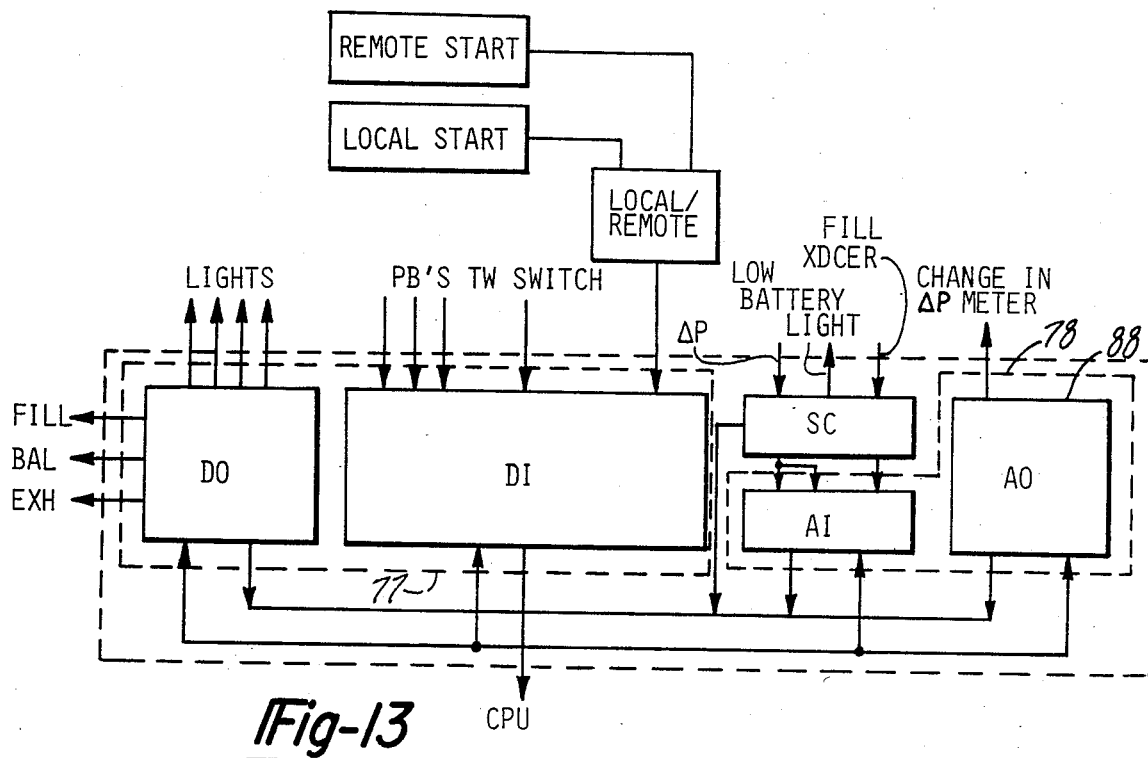
_Fig-13_
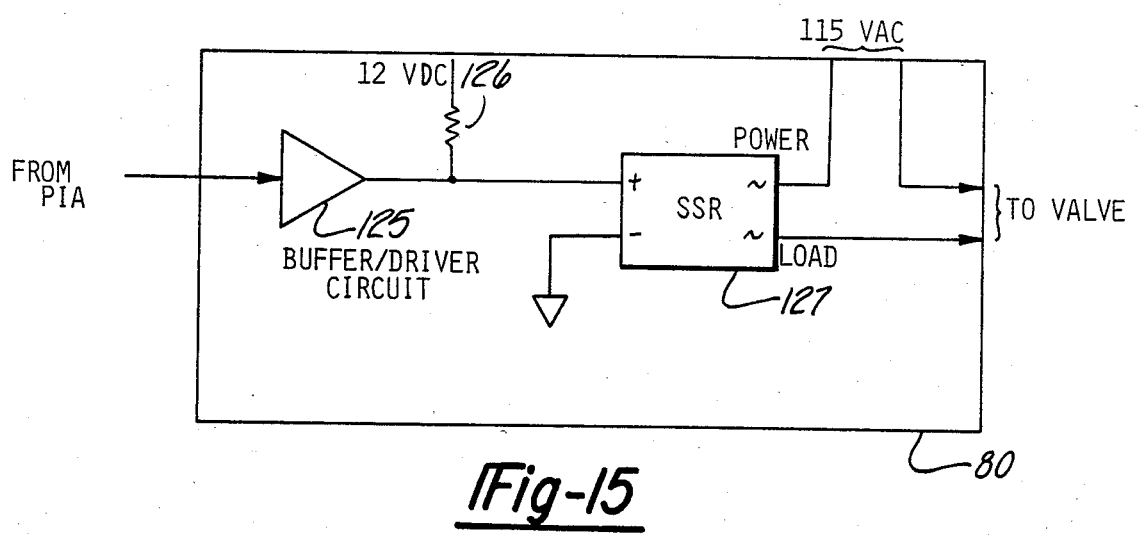
_Fig-15_

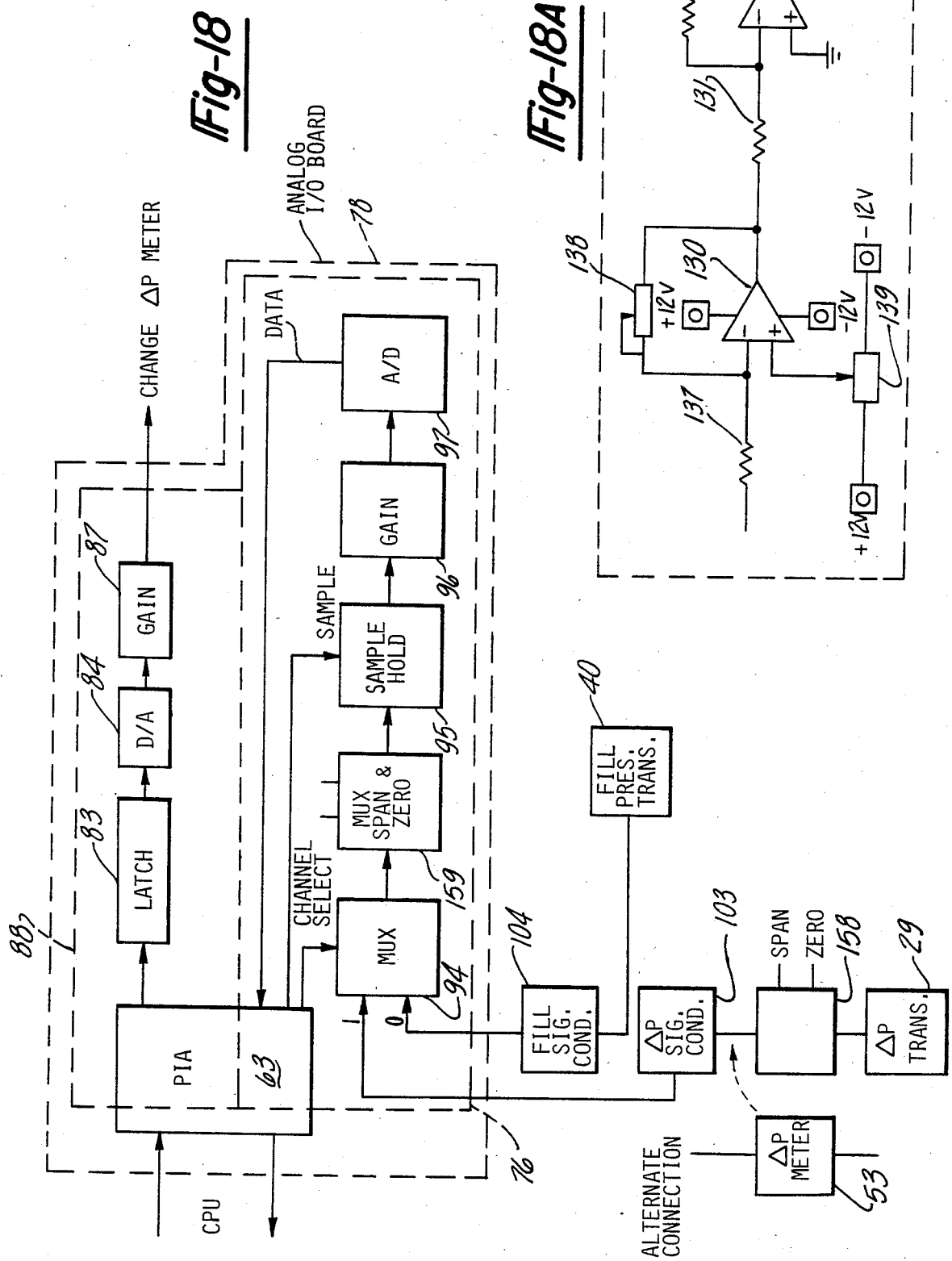

ANALOG TO DIGITAL
CONVERSION SUBROUTINE

NOTE THAT PRIOR TO USING THE A TO D
SUBROUTINE THE CHANNEL SELECTION
AND SAMPLE HOLD PROCESSES ARE DONE
BY THE ROUTINE WHICH IS REQUESTING
A CONVERSION. NOTE ALSO THAT THE
A TO D IS CONFIGURED TO PRODUCE
CONVERSIONS CONTINUOUSLY SO, NO
START TRIGGER IS REQUIRED NOR IS
ANY BUSY OR CONVERSION COMPLETE
SIGNALS USED.

ENTERED ΔP LIMIT AS 15.0% = 150

WORKING ΔP: 150 DIVIDED BY 2 = 75

$$\frac{(WORKING\ \Delta P)\ 75}{(FULL\ SCALE)\ 500} = .15 = 15.0\%$$

A/D CONVERT @ 1COUNT = .01V

ADJUST INPUTS VIA ZERO AND SPAN
ON EACH CHANNELS CONDITIONING
SO THAT +5.00V = +FULL SCALE AND
SO THAT −5.00V = −FULL SCALE

THUS 1 COUNT = .2% FULL SCALE
   5 COUNTS = 1.0% FULL SCALE
 500 COUNTS = 100.0% FULL SCALE

METHOD AND APPARATUS FOR ELECTRONIC LEAK TESTING

BACKGROUND OF THE INVENTION

1. Field of the Invention

This invention relates to leak testing systems, and more particularly to a method and apparatus for electronically performing dynamic balance leak tests wherein a part is filled, evacuated, or surrounded, with a test medium at a predetermined pressure or vacuum, and the change of that pressure or vacuum over a period of time, compared with the reference pressure, is measured. The actual testing sequence consists of filling, evacuating from, or surrounding the part to be tested with air, or another testing medium, bringing it to a predetermined test pressure or vacuum, disconnecting or shutting off the test part from the source of testing medium, allowing a short time for the system to "balance" itself, and thereby eliminate parasitic influences such as changes in barometric pressure, variations in the air supply systems, adiabatic heat, valve operation effects, etc., and then measuring the differential pressure after the balance time to obtain an accurate initial differential pressure reading. We call such a reading a "live zero" reading because it is not the same for each test, such as a predetermined pressure or vacuum reading would be, but instead is one that can change for every test to reflect actual conditions within the test system.

The differential pressure is again measured at the end of a predetermined test period. It should be understood that the differential pressure readings are taken at the test part with respect to the source.

The difference between the differential pressure at the beginning of the test period, and at the end thereof, constitutes the "change in pressure", which is the measure of leakage of the part. Leakage may be an indication of faulty casting, faulty machining, improper materials, or other similar problems, and such leakage may call for rejecting the part if it is above permissible limits.

It should be understood that the amount of permissible leakage is a standard set by the manufacturer on the basis of experience and the demands which the part must satisfy. Setting such a standard may be preceded by experimentation, operating on the basis of the tentatively set standard, analyzing field reports, etc.

2. Description of the Prior Art

Applicants' assignee for many years has performed dynamic balance leak tests for its customers utilizing a pneumatic apparatus described in U.S. Pat. Nos. 3,248,931 and 3,387,619, and the advantages of such system over the systems known in the art is fully explained in the specification of those patents, which are specifically incorporated herein by reference.

However, as good as such system is, and such system is better than anything available in the art at the present time, the best sensitivity which could be obtained with such a system was 0.01 inches of water. While with this sensitivity such systems are still satisfactory, and are serving well for many, many, testing purposes, as the demand for faster and faster and more sensitive leak testing systems become apparent, Applicants were faced with the necessity of developing an even faster and more sensitive leak testing system.

Some attempts were made to make the pneumatic system more sensitive, but it was immediately found that the mass and the bulk of the parts used therein made any prospects for greatly improved sensitivity very small, and Applicants then decided to try an electronic approach to leak testing in an attempt to get better sensitivity, because such approach was becoming more and more practicable with the advances in the electronics' art.

Applicants' first attempt at providing an electronic system was to mimick the pneumatic circuitry of the aforementioned leak test system with electronic analog circuitry. However, because it was preferable to have a drift-free type of circuitry, it was desirable to have the calculations performed on a digital basis. This led to the use of calculator integrated circuit chips to perform the digital calculations and comparisons. However, this attempt was not successful because Applicants quickly ran into major problems trying to interface the calculator integrated circuit chips required with other parts of their system.

At about the same time this was occurring, the electronics field was experiencing the advent of microprocessors and microcomputers utilizing microprocessors. Knowing of this, the Applicants decided to try and use a microcomputer in their attempt to arrive at a satisfactory leak testing system. After consideration of the above-mentioned problems, it was thought that use of a microcomputer system in a dynamic balance leak test system would be most satisfactory. After much effort, this approach proved to be correct, and Applicants arrived at the system disclosed, and claimed, herein.

By taking this approach, Applicants reduced or eliminated many of the sensitivity problems in present day electronic leak test systems as discussed below.

The typical electronic leak testing system in the art today decreases in absolute sensitivity as the pressure at which you perform the test is increased. In one presently available electronic test system not using dynamic balance leak test it is common to have two meters, a percent pressure meter graduated from 0% to 100% with 50 graduations, such that the reading 100% equals the full scale pressure of the transducer, which is greater than the pressure at which the test is being performed. A second meter designates pressure change, that being a zero center scale with 20 graduations on the left-hand side from −1.0 to 0 and with 20 graduations on the right-hand side from 0 to +1.0.

This available test system has a sensitivity selection of 0.1% to 10% of full scale, and when using the finest sensitivity range for example, if the 100% pressure (test pressure) is 20 lbs. per sq. in. (p.s.i.) gauge, the sensitivity is 20 lbs. per sq. in. multiplied by the sensitivity (0.1%=0.001) divided by the number of graduations on one half of the pressure change scale (20). Thus, the smallest change you can read is (20×0.001)/20=0.001 p.s.i., which equals 0.03 inches of water.

When one tests at 100 p.s.i., which would now be the 100% pressure reading, multiplied by 0.001 and divided by 20, this equals 0.005 p.s.i., or 0.15 inches of water, as the smallest sensitivity which can be read. By using dynamic balance, Applicants have eliminated this change in absolute sensitivity.

Further, with this type of division of the analog electrical signal into actually 20,000 analog parts in the immediately previous example, you have such a small signal that electrical noise becomes a serious problem. If the transducer used provides a 10-volt analog signal, which is divided into 20,000 analog parts of 0.5 millivolts, each analog part can be of a smaller value than much of the electrical noise commonly encountered, thereby reducing the accuracy of the reading.

Another inconvenience with present day electronic leak test systems concerns the need to change to different transducers for different test pressures. Typically, if one is going to test at 20 p.s.i., one will use a pressure transducer rated at 20 p.s.i. to get the best sensitivity possible (i.e. one wouldn't normally use a 100 p.s.i. transsducer at 20 p.s.i.). However, if the system is to be used for many different tests at many different pressures, frequent changing of transducers will be necessary if the best sensitivity is to be maintained.

Another problem the Applicants were aware of in their search for a better system is the fact that in a pressure decay leak test system, which is the type of system which has just been discussed, even the point of 0.1% sensitivity is largely unattainable because changes in the operating conditions and operation of the valves will cause changes in the transducer reading of a magnitude equal in some cases to the magnitude of the signal representing the sensitivity reading.

SUMMARY OF THE INVENTION

Applicant has solved the above problems in the prior art by providing an electronic dynamic balance leak test system wherein a source of test medium at a predetermined pressure is connected to a part to be tested, the part is filled with test medium, a balance interval is provided, the test part is isolated, and the differential pressure reading is taken, with the difference between the initial reading and the reading after the test time being calculated and indicating whether or not a leak is present. In a modification of our invention, we have provided a system which can dynamically project a leak rate by continuously taking differential pressure readings until a point at which we are certain the rate of change of the differential pressure reading indicates a predominately leak based change of pressure, and at this point taking a pressure reading which is extrapolated to a full test time reading and compared to limits to see if the limits will be exceeded, all in a time substantially less than a normal leak test would take.

Thus, one of the objects of the present invention is to provide an improved method of leak testing.

Another object of the present invention is to provide an improved dynamic balance leak testing system.

Another object of the present invention is to provide an improved dynamic balance leak testing system operating on a "live zero" principle, that is a system which measures the differential pressure existing in a test part, with respect to the source, after it has been filled to a predetermined pressure or vacuum and allowed to stabilize to eliminate parasitic conditions (live zero), again measures the differential pressure in the test part after a predetermined test time, and determines the change in differential pressure from the two values so obtained.

Another object of the present invention is to provide an improved dynamic balance leak testing system which operates on the basis of measuring pressure differential between a test part and a source or reference pressure, rather than a direct pressure decay reading at the test part.

A further object of the present invention is to provide an improved electronic dynamic balance leak testing system wherein the need to change transducers as the test pressure changes is largely eliminated.

Another object of the present invention is to provide an electronic dynamic balance leak testing system having improved sensitivity.

Another object of the present invention is to provide an electronic dynamic balance leak testing system of the foregoing nature, wherein the absolute sensitivity of the system does not decrease as the test pressure is increased.

A further object of the present invention is to provide increased sensitivity and greater accuracy in an electronic dynamic balance leak testing system by reducing problems associated with electrical noise in the system.

A further object of the present invention is to provide an electronic dynamic balance leak testing system utilizing a microcomputer to operate the valves in the system, make the necessary calculations, and make an indication of whether the test part is acceptable or unacceptable.

A still further object of the present invention is to provide an electronic dynamic balance leak testing system and a method of utilizing said system which does not depend on calculator integrated circuit chips to make its calculations.

A still further object of the present invention is to provide a dynamic balance leak testing system of an electronic nature which eliminates the effects that the mass and bulk of the test system parts had in previous pneumatic test systems.

A still further object of the present invention is to provide an electronic dynamic balance leak test system which is relatively simple in construction, durable, and reliable when compared to present day electronic leak testing systems.

A further object of the present invention is to make an electronic dynamic balance leak testing system which is relatively simple in construction, dependable in operation, and easy to set up for testing parts within a wide range of sensitivity and test pressures.

Another object of the present invention is to provide an electronic dynamic balance leak testing system which is capable of projecting acceptability or unacceptability of a part before the total test time normally required by a system not having such a feature.

Another object of the present invention is to provide a leak testing system of the foregoing nature, wherein the slope of a curve representing the change of pressure is continually calculated during a leak test.

Another object of the present invention is to provide a dynamic balance leak testing system having an early accept feature, wherein the actual leak test is not started until the slope of a curve representing the leak rate of the particular part being tested reaches a point wherein the slope of a subsequent section of the curve changes less than, for example, 10% of the slope of a preceding portion of the curve.

Another object of the present invention is to provide a leak testing system which is capable of finding the projected leak rate of a part from a point wherein the slope of a curve representing the leak rate of a particular part does not change by more than, for example, 10% for any one test interval, then finding the actual leak rate of the same part, and comparing the projected leak with the actual leak to validate the projected leak found by the system.

Further objects and advantages of this invention will be apparent from the following description and appended claims, reference being had to the accompanying drawings forming a part of the specification, wherein like reference characters designate corresponding parts in the several views.

BRIEF DESCRIPTION OF THE DRAWINGS

FIG. 13 is a schematic view similar in large part to FIG. 12, but showing, in addition, the analog output portion of the interface shown in FIG. 10.

FIG. 15 is a schematic view of an output buffer which may be used in the circuit shown in FIG. 14.

FIG. 18 is a diagrammatic view of the analog input printed circuit board shown in FIGS. 12 and 13 and showing the fill pressure signal conditioning apparatus and the pressure transducer signal conditioning apparatus.

FIG. 18A is a schematic view of a fill pressure signal conditioner shown in FIG. 18.

It is to be understood that the invention is not limited in its application to the details of construction and arrangement of parts illustrated in the accompanying drawings, since the invention is capable of other embodiments, and of being practiced or carried out in various ways. Also, it is to be understood that the phraseology and terminology illustrated herein are for the purpose of illustration, and not for the purpose of limitation.

DESCRIPTION OF THE PREFERRED EMBODIMENTS

To aid in understanding the terminology used in the present application, the Applicants have thought it advisable to present the following short glossary of terms used in the electronics' art. It should be understood that some of these terms may vary from manufacturer to manufacturer of the electronics devices disclosed, or be one of a few terms which can describe essentially the same item. For the purposes of the present glossary, it should be understood that Applicants are using terms as they are commonly used in the electronics' art:

Analog signal—a continuously variable voltage signal.
Bit—single signal with generally two states, on or off (on is also referred to as "one").
Board—another name for printed circuit board.
Chip—another term for integrated circuit.
Digital signal—a signal containing multiple bits.
EPROM—electronically programmable ROM (erasable using ultraviolet light).
IC—integrated circuit, usually on a chip.
I/O—input-output.
PC—printed circuit on a board containing the necessary interconnections.
PIA—peripheral interface adaptor as manufactured by Motorola. Other manufacturers use similar terms.
RAM—random access memory.
ROM—read only memory.

Figure 1:
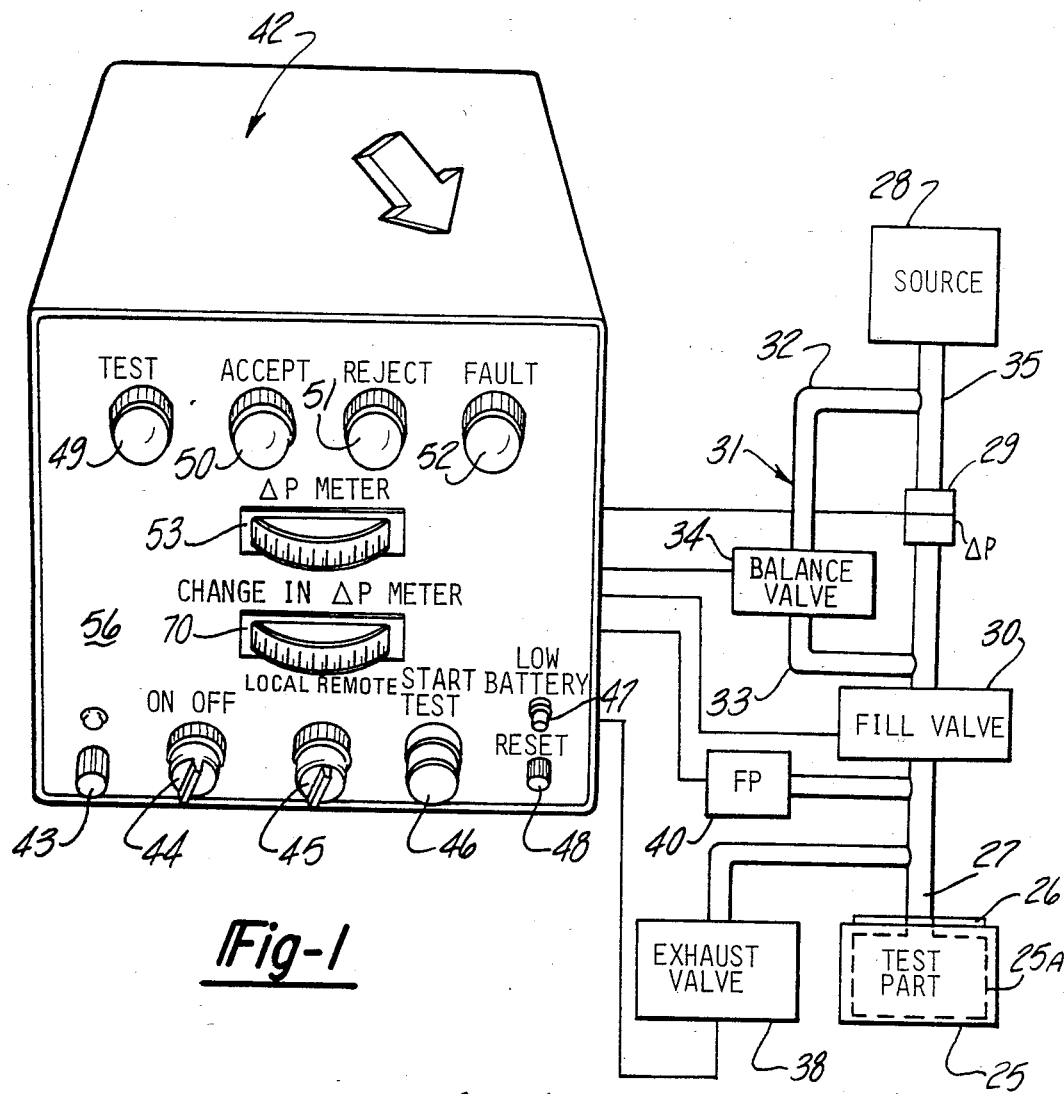
FIG. 1 is a diagrammatic view of a construction embodying our improved electronic dynamic balance leak testing system.

Our improved electronic dynamic balance leak testing system is shown diagrammatically in FIG. 1. In our system a test part 25 is sealingly mounted to a test fixture 26. Communicating with the fixture 26 and the interior 25A of the test part 25 is a first conduit 27.

At the other end of the first conduit 27 is a differential pressure transducer 29. Connected to the differential pressure transducer is a second conduit 35 communicating with the source 28 of said pressure. The source of test pressure depends on the test part being tested, the medium which the part is being tested with, and the volume of such medium that is needed. The medium may be a source of pressure or of vacuum.

The source 28, when a very small part is being tested under pressure, may simply be a tank of compressed air which would have sufficient volume and pressure to pressurize many test parts. If the test parts were of medium size, the source may be an air compressor connected to a compressed air tank and adapted to keep it at a substantially uniform pressure, whereas if a large test part were being tested, the source 28 may have to be rather sophisticated to keep a large volume of media at a sufficient pressure to make for efficient testing. However, it is not believed that the source need be described in any greater detail, since providing a suitable source is well within the skill of the art. However, it should be understood that the test media is not limited to air, but can be any practicable fluid media.

Interposed in the first conduit 27 between the test part 25 and the differential pressure transducer 29 is a fill valve 30. In order to provide a path for the test media to reach the test part 25 from the source 28, a bypass conduit is provided and is generally designated by the numeral 31. The bypass conduit consists of a first section 32 and a second section 33.

As illustrated, the first section 32 of the bypass conduit 31 at one of its ends is interposed in the second conduit 35 between the source 28 and the differential pressure transducer 29, and at its other end is connected to the input end of the balance valve 34. The second section 33 of the bypass conduit 31 at one of its ends is interposed in the first conduit 27, between the differential pressure transducer 29 and the fill valve 30, and at its other end is connected to the output end of the balance valve 34.

To allow the test part 25 to return to ambient conditions after testing, an exhaust valve 38 is provided which is interposed in the first conduit 27, between the fill valve 30 and the test part 25. Also provided at approximately the same location is a fill pressure transducer 40. To provide for proper operation, the balance valve 34, the differential pressure transducer 29, the fill valve 30, the fill pressure transducer 40, and the exhaust valve 38 are all connected by suitable electrical means to the electronics of the system housed in an equipment cabinet generally designated by the numeral 42.

Located on the front panel 56 of the cabinet are a fuse 43 for the protection of the system, an on-off switch 44 to activate and deactivate the system, a local-remote select switch 45 to select local or remote mode of operation of the system, a start test switch 46 which is utilized to start a leak test when the test system is in its local mode, a reset switch 48 which is utilized to reset the microcomputer program to its initial state, and a low battery indicating means 47 which is activated when the batteries are low.

To indicate the progress and results of the leak test a test indicating means 49, an accept indicating means 50, a reject indicating means 51, and fault indicating means 52 are mounted on the front panel 56 of the cabinet 42. To indicate the leakage during the test, a differential pressure meter 53 is also mounted to the front panel 56. If desired, a change in differential pressure meter 70 may also be mounted on said panel.

Figure 2:
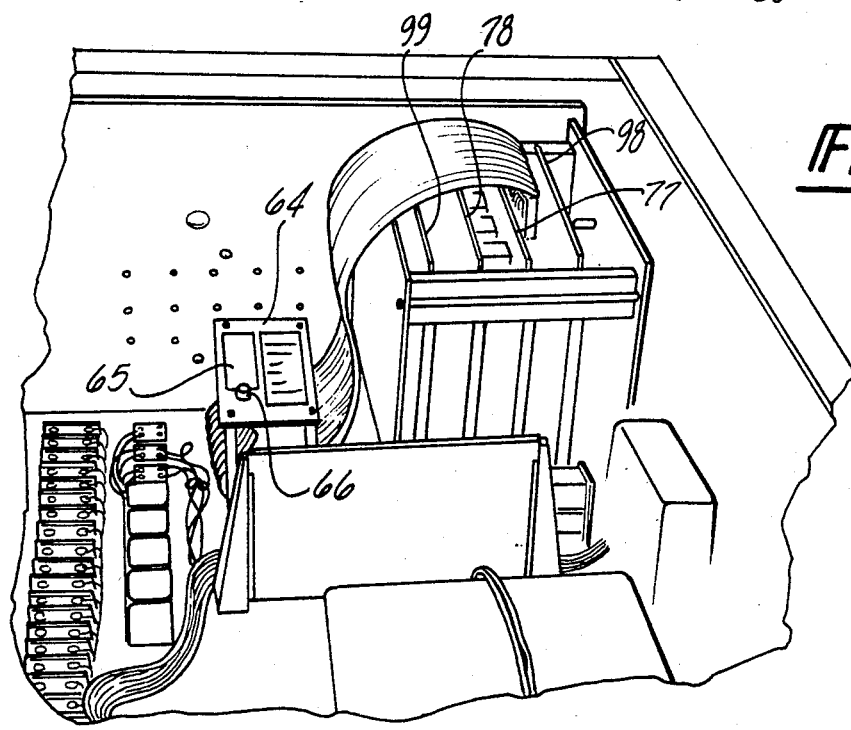
FIG. 2 is a partial perspective view of the interior of the equipment cabinet shown in FIG. 1.

As indicated by the arrow in FIG. 1, additional parts are mounted in the interior of the cabinet which are significant in understanding the operation of the system, and these parts are shown in FIG. 2 and will be explained below in connection with the operation of the system.

Figure 3:
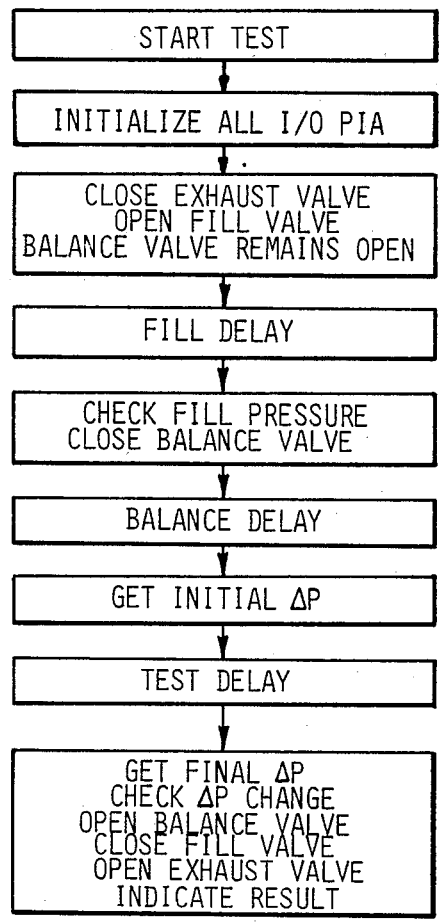
FIG. 3 is a flow chart showing the sequence of principle operations utilized by our electronic dynamic balance leak testing system in the performance of an improved method of leak testing.

The principle operations in our improved method of electronically testing parts for leakage can be understood by referring to FIG. 3 in addition to FIG. 1. It can be seen by referring to the flow chart in FIG. 3 that the leak test sequence is first started. In manual mode this is accomplished by depressing the start test switch 46. This results substantially simultaneously in a closing of the exhaust valve 38, an opening of the fill valve 30, and the balance valve 34 remaining open. This allows the medium from the source 28 to pass through the bypass conduit 31, including the first section 32, the balance valve 34, and the second section 33, and the fill valve 30 to the interior 25A of test part 25 through the fixture 26.

At this time a built in fill delay time is programmed into our electronic dynamic balance leak testing system to compensate for such factors as the size of the test part, the pressure the part is being tested at, the size of the source and adiabatic heat loss and other factors which may be present, and which will be well known to those skilled in the leak testing art.

At the conclusion of the fill delay time, if properly set, since the first and second conduits 27 and 35 are connected to opposite sides of the differential pressure transducer 29, and pressure is free to communicate with all parts of the conduits 27 and 35, the differential pressure transducer is subject to an equal pressure on both sides thereof. At substantially the same time the fill pressure is checked, as sensed by the fill pressure transducer 40, and the balance valve 34 is closed. At this time the test part is effectively isolated from the source. As can be seen, one side of the differential pressure transducer will be subjected to the test pressure, while the other side of the differential pressure transducer will be subjected to the pressure at the test part, which at this instant is the same pressure, and thus the differential pressure indicated on the differential pressure meter 53 will be substantially 0. It should be understood that the differential pressure meter indicates the differential pressure sensed by the differential pressure transducer.

However, it can be seen that if the test part 25 does leak, and if the source 28 is a pressure and not a vacuum, the pressure downstream of the differential pressure transducer 29, that is at the test part, will become less, while the pressure upstream of the transducer, that is at the source, will remain constant, resulting in a signal being supplied by the differential pressure transducer 29, which, in turn, will result in the movement of the differential pressure meter 53 indicating a leak in the test part.

In actual operation, a balance delay time, which is a short period after the closing of the balance valve, is used to eliminate any effects from the closing of such valves, and allow stabilization of the media within the test part.

At the conclusion of the balance delay time, the initial differential pressure reading is obtained from the differential pressure transducer 29. The valves are held in a static condition during a test delay time, during which time, in one embobdiment of our system, any leak in the test part will be continuously indicated on the differential pressure meter 53.

After the test delay time, the final differential pressure readings are obtained, and the change in differential pressure from the initial differential pressure reading is calculated. If this change in differential pressure does not exceed a predetermined amount, the accept indicating means, such as light 50 will indicate an acceptable part.

If the change in differential pressure exceeds the predetermined limit, the reject indicating means, such as light 51 will indicate an unacceptable part, in which case it is clear that the test part 25 has failed the test. The fault indicating means, such as light 52 would indicate invalid test conditions. It should be understood that while we have illustrated the accept, reject and fault indicating means in this case by lights, that other means, depending on the desire of the test equipment user, such as bells, buzzers, sirens, etc., could be used to indicate the various functions, and this is the reason why we have used the term "indicating means" in certain places throughout the specification, wherein others we have used the term "lights", and indicated such apparatus in the drawings.

In a more sophisticated version of our system, the change in differential pressure is indicated on the change in differential pressure meter 70, and retained until the next test is started.

At the conclusion of the test, again substantially simultaneously, the fill valve 30 is closed, the balance valve 34 is opened to prevent a large change in pressure across the differential pressure 29 which might damage the same, and the exhaust valve 38 is opened to let the pressure escape from the test part 25 through the fixture 26, the conduit 27 and the exhaust valve 38. At this time, the test would be completed. It is assumed, of course, that throughout the entire sequence above the fuse 43 is in working condition, the on-off switch 44 is set to the on position, and the local-remote switch 45 is set to local operation.

Figure 4:
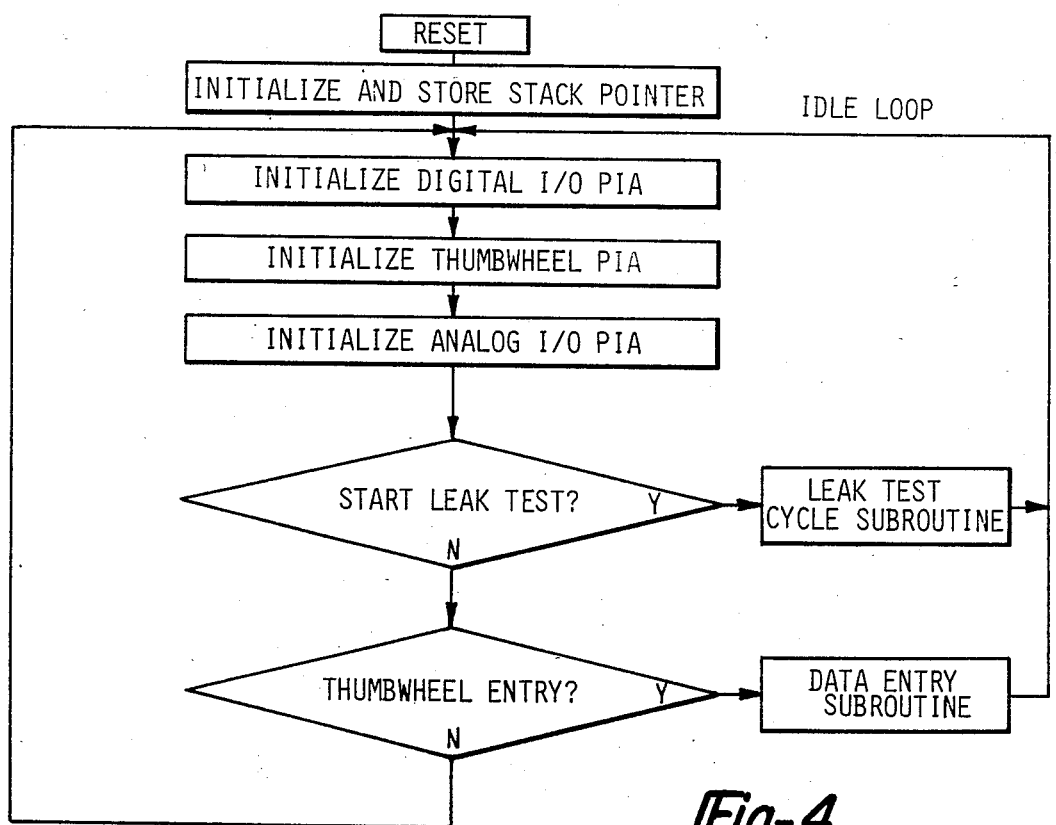
FIG. 4 is a flow chart showing the sequence of principle steps performed by the microcomputer utilized in our new system to perform the principle operations shown in the chart of FIG. 3.
Figure 5:
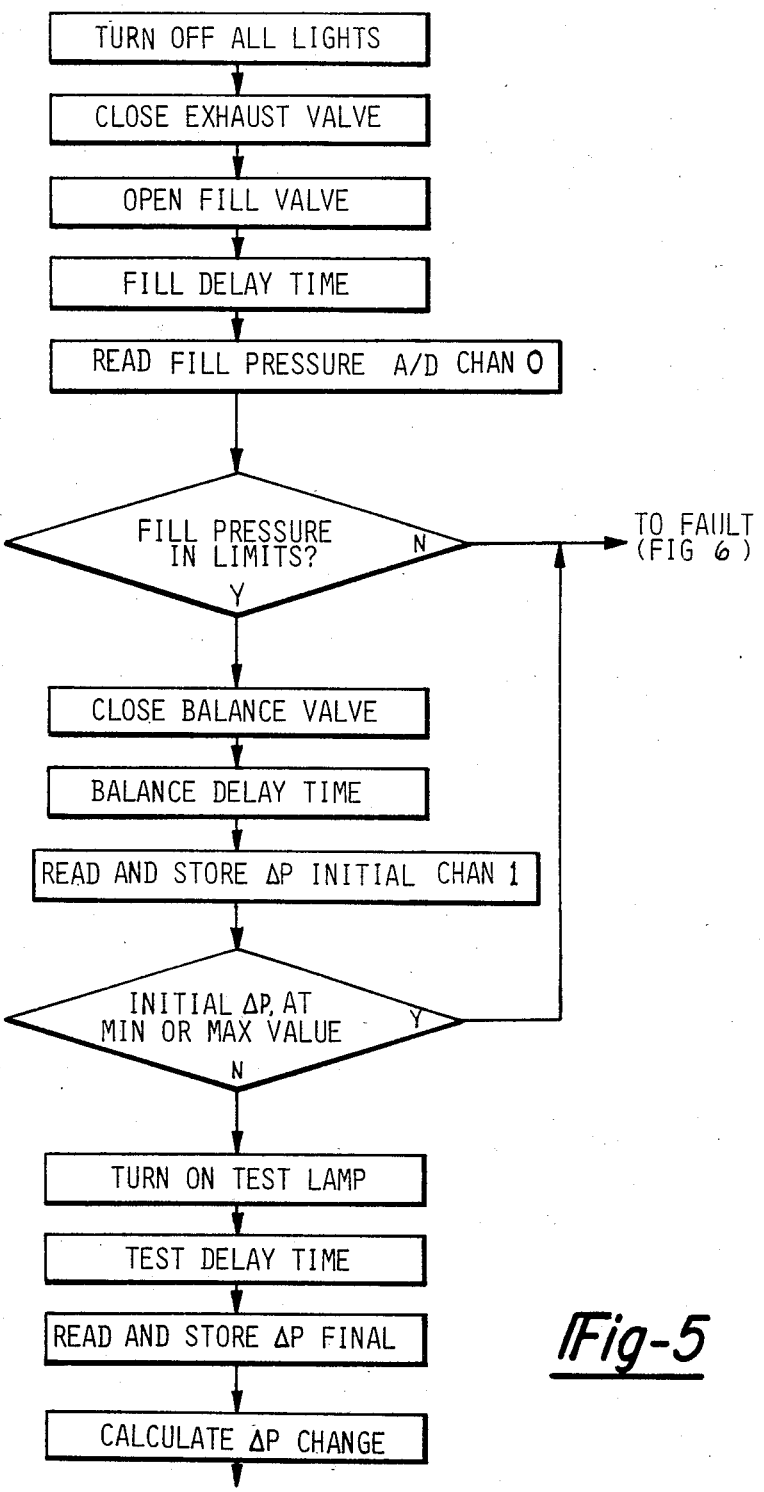
FIG. 5 is a flow chart showing, in part, the sequence of principle steps performed by the system in the leak test cycle subroutine of the flow chart shown in FIG. 4.
Figure 6:
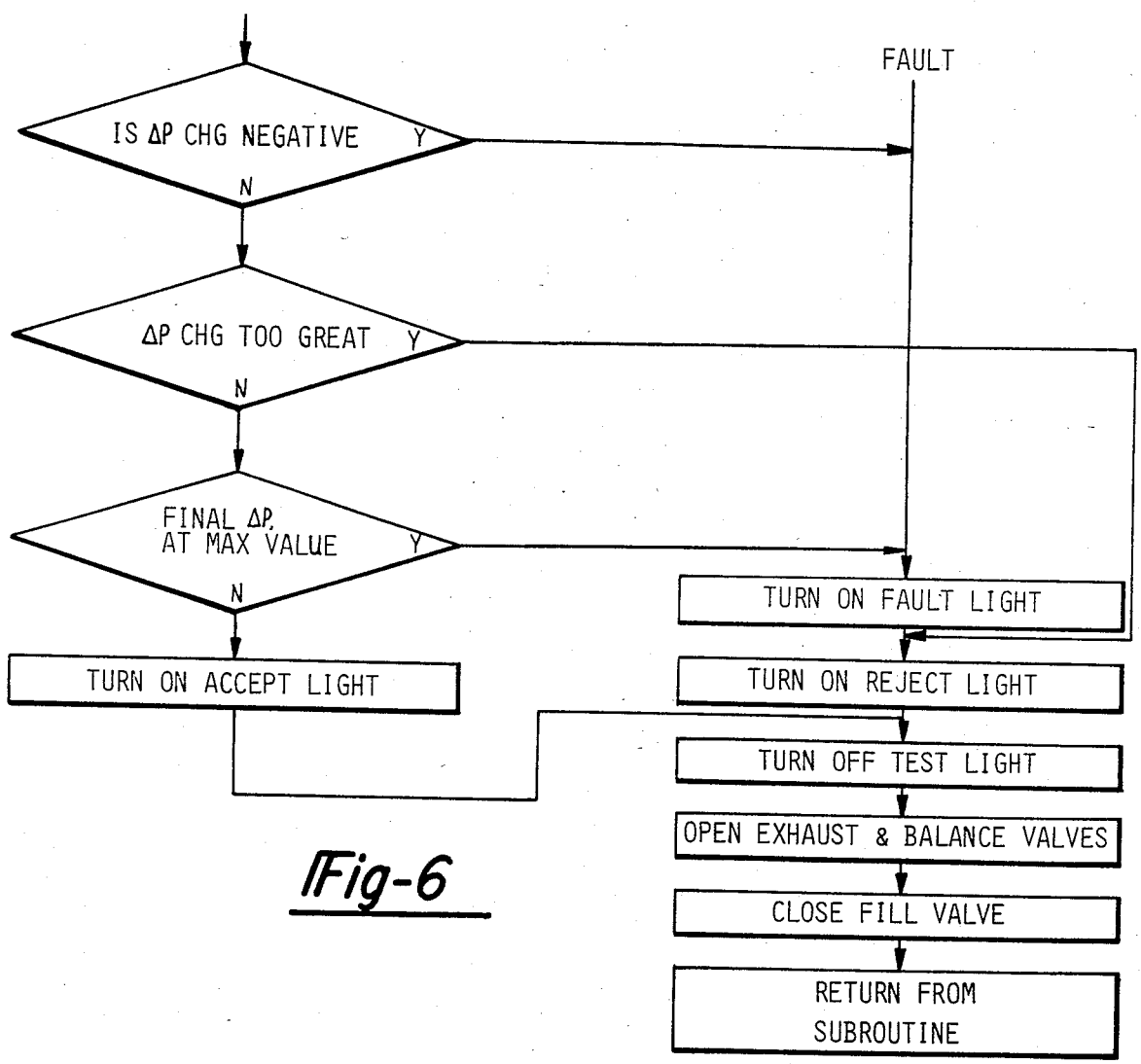
FIG. 6 shows the balance of the principle steps performed by the leak test cycle subroutine of the flow chart shown in FIG. 4, the operations of FIG. 6 taking place immediately after the steps in FIG. 5.

Since a microcomputer system 60 (see FIG. 7) is used to control the various functions just described, for the purposes of understanding the present invention, the much more detailed flow charts in FIGS. 4, 5 and 6 are presented.

To aid in understanding the flow charts, one is referred to the many works concerning the use of a microprocessor. Among these works are "Using the 6800 Microprocessor" by Elmer Poe, published by the Howard W. Sams & Co., Inc. of Indianapolis, Ind. (1978). Many other works are also available and reference to these works should be had if the terms used in the following descriptions known to those skilled in the microprocessor art are not completely understood.

Referring now to FIG. 4, the very basic test sequence is shown in which, upon pressing the reset switch 48, the microcomputer program is initialized. The first such step is to initialize and store the stack pointer within the microcomputer system 60.

The stack is an area in RAM memory 71A (FIG. 10) that is reserved for the register's contents during an interrupt or use by the program. Its location in memory is arbitrary and is chosen by the individual who has prepared the program, with consideration of the fact that the location chosen must contain RAM. Just as the CPU 72 uses the program counter to hold the location of the next instruction, it uses the stack pointer to hold the next available stack location. The stack pointer must be initialized before being used, and it is usually initialized at the beginning of the program.

Figure 14:
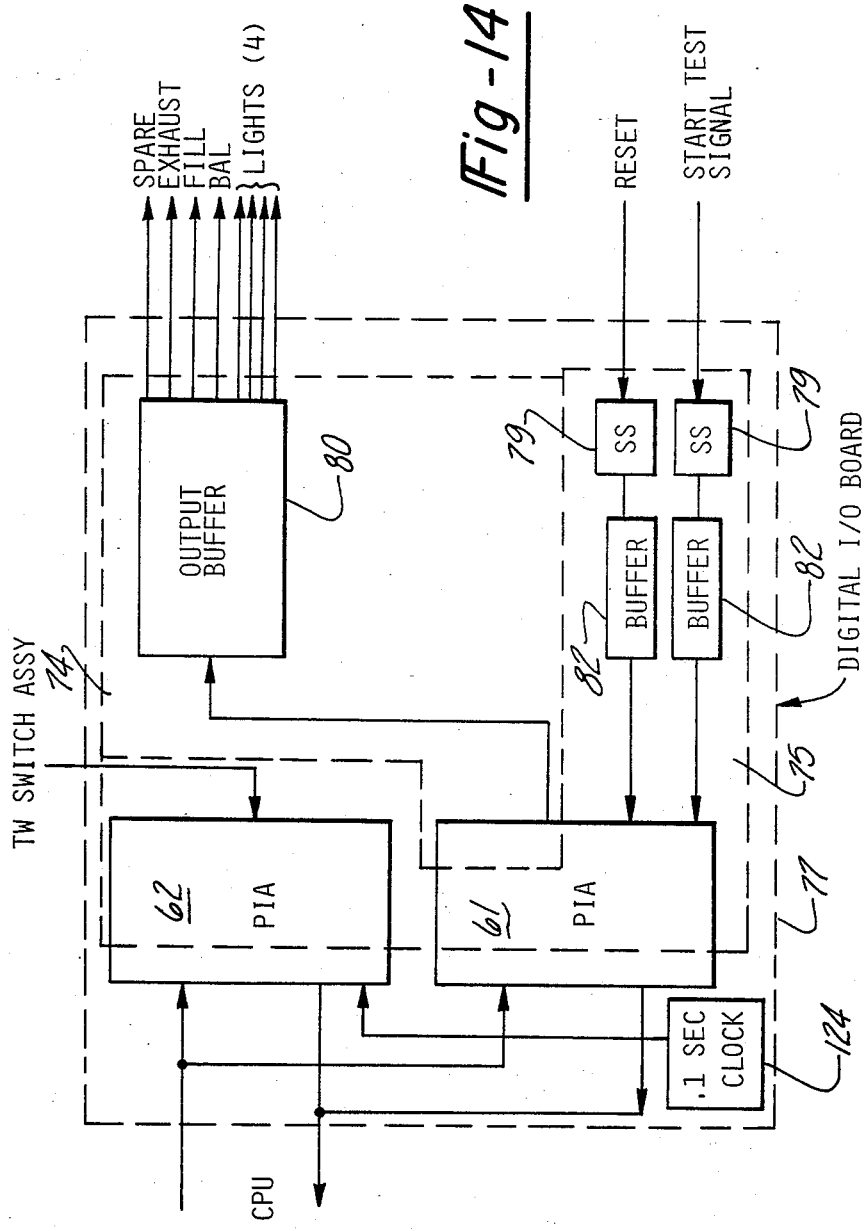
FIG. 14 is a schematic view of the digital input-output (I/O) printed circuit board shown in FIGS. 12 and 13.

Following the initialization of the stack pointer, the system will initialize the digital input-output peripheral interface adaptor (PIA) 61, initialize the thumbwheel peripheral interface adaptor 62, and initialize the analog input-output peripheral interface adaptor 63 (see FIGS. 14 and 18). Initialization of the PIA's is used to define the intended usage of the individual signals connected to the peripheral interface adaptor, that is, which signals are to be inputs and which are to be outputs. Thereafter, if the start test signal is present, the leak test cycle subroutine shown in FIGS. 5 and 6 will be called into play, and after that subroutine is completed, the program will return to a point immediately prior to initializing the digital input-output peripheral interface adaptor.

If a thumbwheel entry was made, the microcomputer goes into the data entry subroutine in which the data from the thumbwheel switch 65 is stored in memory in the manner to be described hereinafter, after which time the data entry subroutine goes back to the operation immediately proceeding the peripheral interface adaptor initializing steps. If the thumbwheel entry has not been made, the program goes back to the operation immediately proceeding the peripheral interface adaptor initializing steps.

Now referring to FIGS. 5 and 6, the operation of the leak test cycle subroutine, presuming the test part 25 has been mounted to the fixture 26, will turn off all indicating means, close the exhaust valve 38, and substantially simultaneously open the fill valve 30. As explained previously, the balance valve 34 remains open during this operation.

Programmed into the software at this time is a fill delay time which, when properly selected, gives the system sufficient time to fill the test part. At the conclusion of this fill delay time, the microcomputer will read the fill pressure as sensed by the fill pressure transdcuer 40, and make a comparison of that pressure with the predetermined desired pressure limits. If the pressure is not within limits, the fault light 52, and the reject light 51 will both be illuminated. This might indicate a gross leak, such as a part with a hole therein. If the fill pressure is within limits, the balance valve 34 will be closed, and the program will now pause for a predetermined time identified as balance delay time. This allows the system to come to equilibrium and thereby minimize the effects of the adiabatic heat loss caused by the filling of the test part, the changing of the the volume caused by the opening and the closing of the fill and balance valves, etc.

After the passing of the balance delay time, the microcomputer reads and stores the initial differential pressure valve from the differential pressure transducer 29. This value is then compared with the minimum maximum values possible from the analog to digital converter 97, thereby checking for being within the operating range of the differential pressure transducer.

If this reading is at or beyond its minimum or maximum value, the fault light 52 and the reject light 51 are both turned on, and the testing should be halted until an operator comes to the system to determine problems therein. If this reading is within the operating range, the test light 49 is illuminated, and the unit will go into the portion of the program called test delay time.

At the conclusion of the test delay time, the microcomputer system reads, and stores, the final differential pressure value, and calculates the change in differential pressure.

Referring now to FIG. 6, a comparison takes place, and if the change in differential pressure is negative, the fault light 52 will be illuminated in addition to the reject light 51, the test light 49 will be turned off, the exhaust and balance valves 38 and 34 will be opened, at the same time the fill valve 30 is closed, and the test will be over and the subroutine will then return to the main program and the testing should halt until an operator attends to the system.

If the change in differential pressure from the first reading is positive, the positive change will be compared to the predetermined limit, and if the change is too great, thereby indicating an excessive leak, the reject light 51 will be turned on, the test light will be turned off, the balance, exhaust and fill valves will operate as just described, and the test will be over and the program will again return to the main test program from the leak test subroutine.

If the positive change is not too great, the system checks to see if the final differential pressure value is at the maximum value. If so, the fault sequence previously described is initiated. If not, the accept light 50 will be turned on, the test lamp will be turned off, the balance, exhaust and fill valves will operate as just described, and the test will be over and the program will again return to the main test program from the leak test subroutine.

It should be understood that when the fault light 52 comes on, as was explained above, the rest of the steps following also take place. Whenever the fault light is turned on, regardless by which portion of the program, the reject light will come on, the test light will turn off, and the exhaust and balance valves open as the fill valve closes, the test ends, and the computer program returns from the subroutine to the main test program. This is illustrated by the flow chart of FIG. 6.

Figure 7:
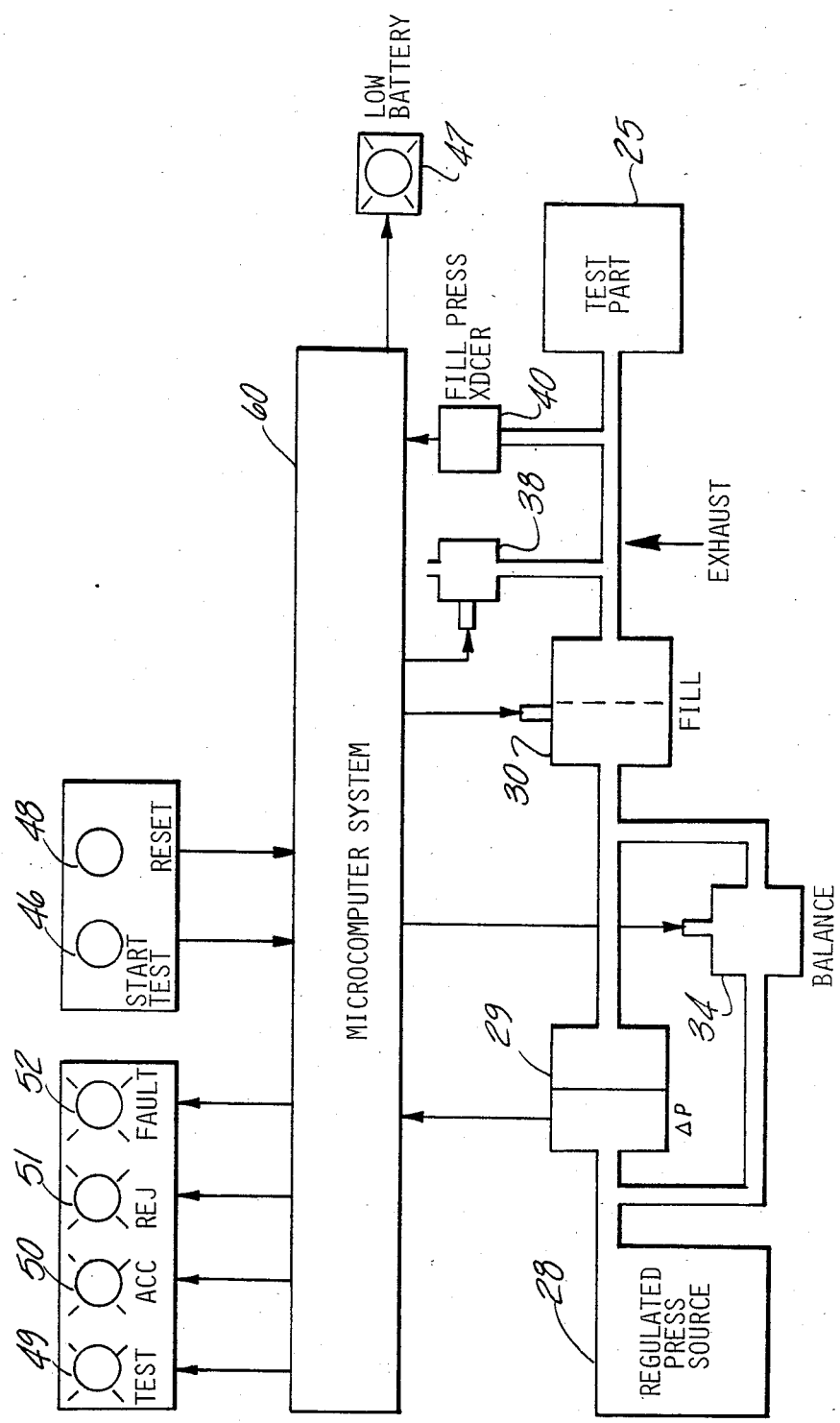
FIG. 7 is a diagrammatic view of the basic electronic dynamic balance leak testing system.

Referring now to FIG. 7, there is shown the interconnections of the various valves, transducers, lights and switches just described with the operation of the microcomputer system. Also shown by the direction of the arrows are whether such devices are solely providing a signal to the microcomputer system, or solely receiving such a signal.

The system in its most basic form without the thumbwheel switch assembly 64, local-remote select switch 45, differential pressure ($\Delta P$) meter 53 or change in differential pressure meter 70 is shown in FIG. 7.

As can be seen, the microcomputer system 60 solely receives signals from the start test switch 46, the reset switch 48, the differential pressure transducer 29, and the fill pressure transducer 40.

Receiving signals from the microcomputer system are the test, accept, reject and fault lights, 49-52 respectively, the balance valve 34, the fill valve 30, the exhaust valve 38 and the low battery light 47.

Figure 8:
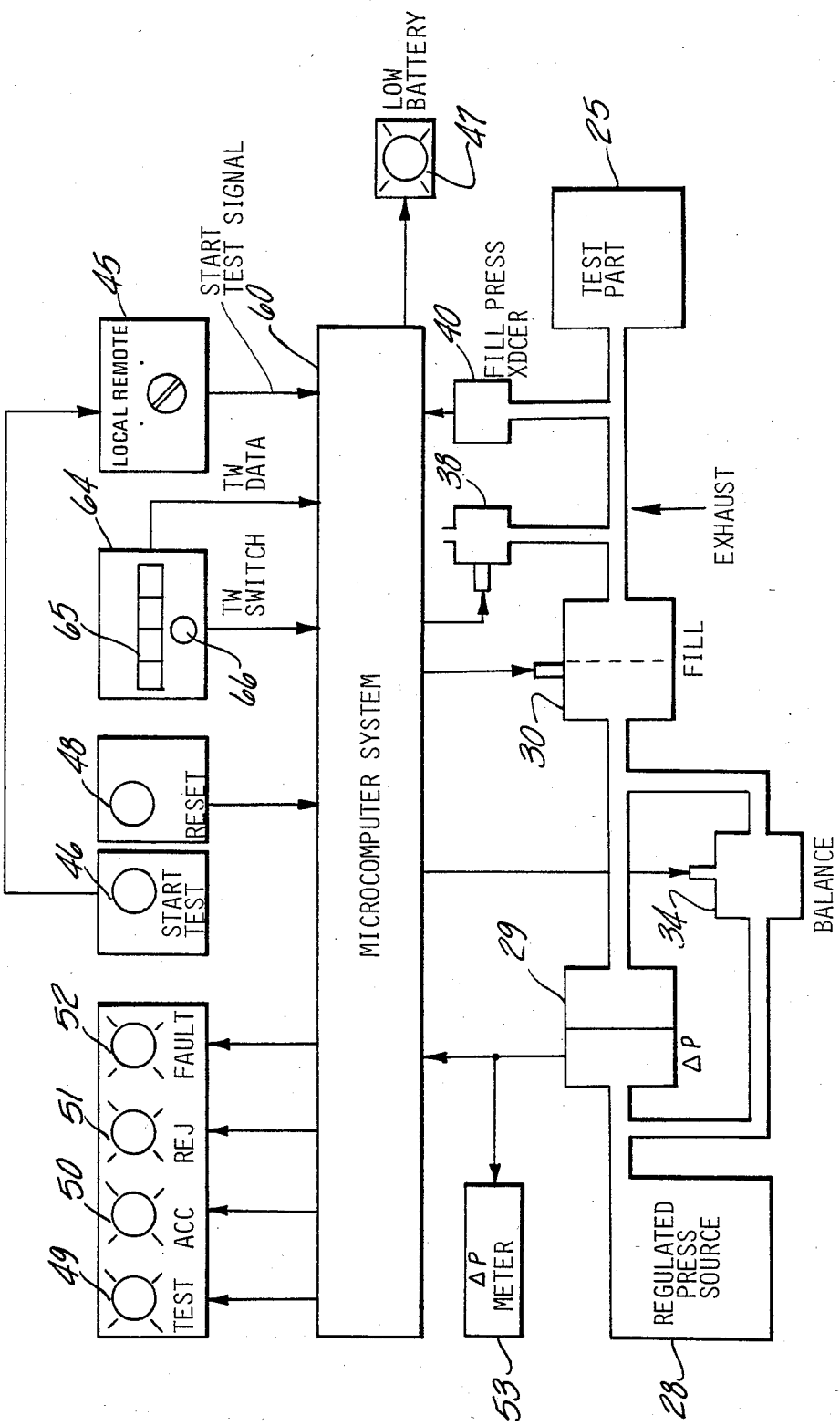
FIG. 8 is a diagrammatic view of the components of the system shown in FIG. 1, and is similar to that of FIG. 7, but showing a direct reading differential pressure meter, a thumbwheel switch assembly for programming values into the leak testing system, and a switch for local or remote test start input selection, all of which may be added to our basic electronic dynamic balance leak testing system if desired.

Referring to FIG. 8, which is largely the same as FIG. 7, the optional thumbwheel switch assembly, generally designated by the numeral 64, which consists of the thumbwheel switch 65 and the thumbwheel switch pushbutton 66, is used when it is desired to change the test parameters, whereas the local-remote select switch 45 is used in connection with appropriate software and hardware to let the system be operated in local or remote mode. Again these devices supply signals to the microcomputer system. Also shown is the differential pressure ($\Delta P$) meter 53 which receives a signal from the differential pressure transducer 29.

Figure 9:
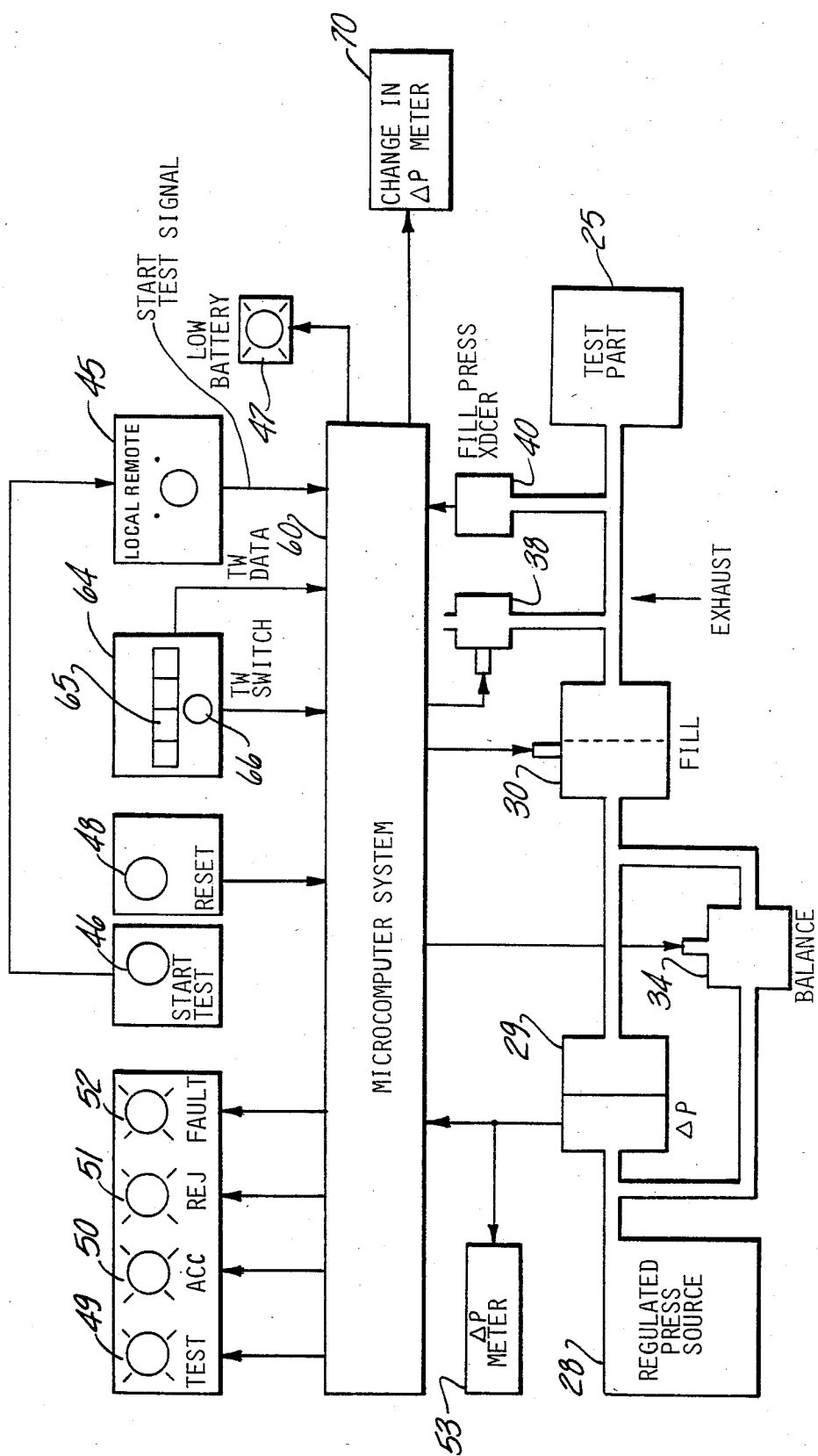
FIG. 9 is a view similar in large part to the view shown in FIG. 8, but showing the addition of a meter which shows the change in differential pressure during the test portion of the cycle.

FIG. 9 shows a view similar in large part to FIG. 8, but with the addition of the change in differential pressure meter 70 which is shown receiving a signal from the microcomputer system.

Figure 10:
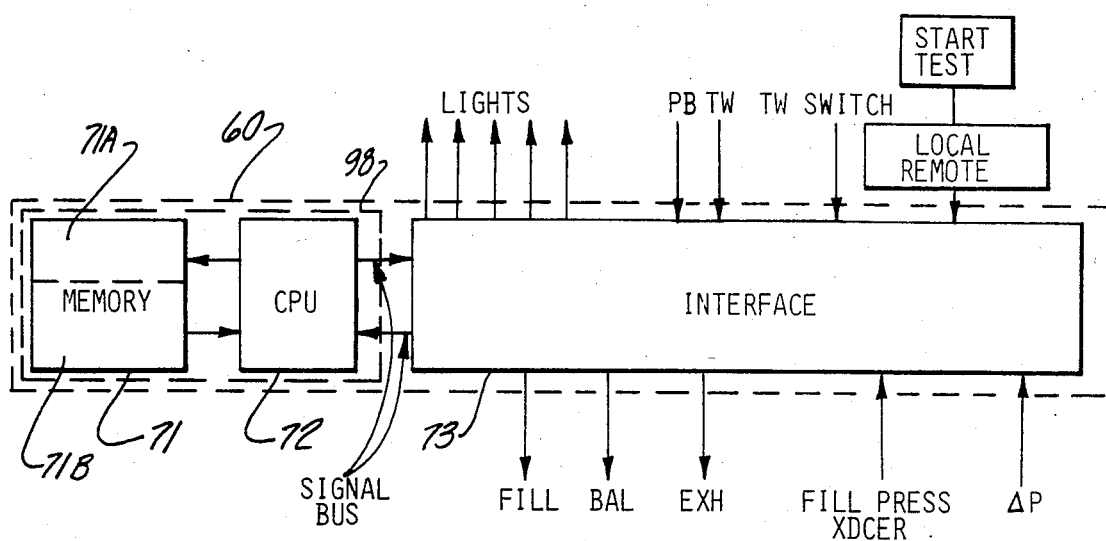
FIG. 10 is a diagrammatic view of the microcomputer system shown in FIG. 8 and including a central processing unit (CPU), a memory and an interface.

Now referring to FIG. 10, it can be seen that the microcomputer system 60 consists of a memory portion 71, a central processing unit (CPU) 72 and an interface 73. It can be seen that signals are freely passed between the memory and the central processing unit, and between the central processing unit and the interface. The CPU and memory are combined and located on the CPU printed circuit board 98. It is also seen that the memory 71 consists of both a RAM memory 71A and an EPROM memory 71B.

Figure 10A:
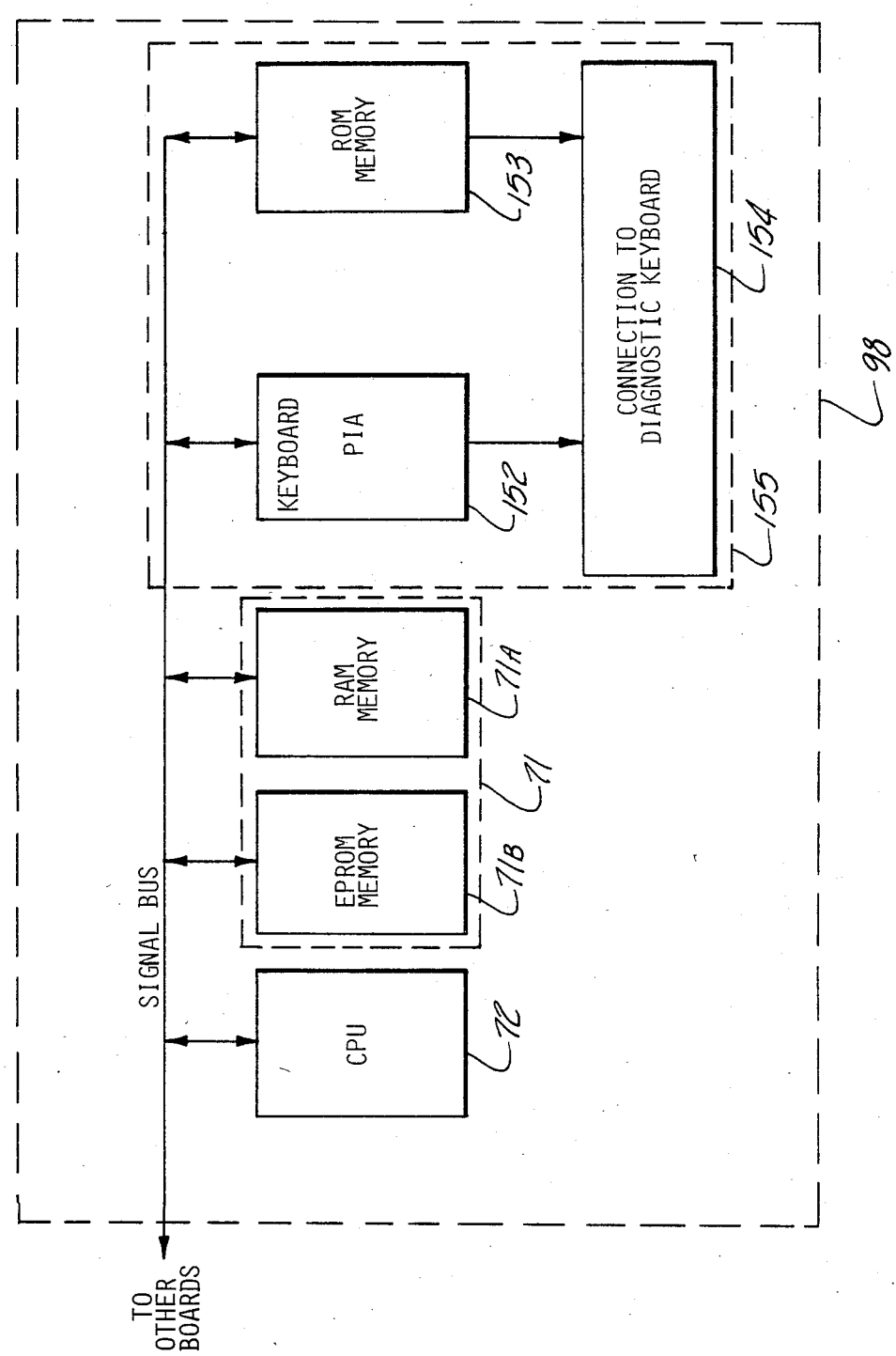
FIG. 10A is a diagrammatic view of the CPU printed circuit board shown in FIG. 10.

Referring to FIG. 10A, it can be seen that the CPU printed circuit board 98 consists of the central processing unit 72, the memory 71, and the diagnostic package 155. In turn the diagnostic package consists of a ROM memory 153, a keyboard peripheral interface adaptor (PIA) 152, and a connection to a diagnostic keyboard, 154. It should be understood that these microcomputer components are interconnected through the signal bus, which is a multiple quantity of bi-directional signals. These components are part of the 6800 family as manufactured by Motorola Semiconductor Products, Inc. of Phoenix, Ariz.

In actual application, we have chosen to use the model No. MC6802 CPU, the model No. MCM2716C EPROM memory, the model No. MCM6810 RAM memory. CPU board 98 is commerically available from Scans Associates, Inc. as their model No. 30119, although it should be understood that other manufacturer's equivalent components could be substituted and the apparatus would work equally as well.

Figure 11:
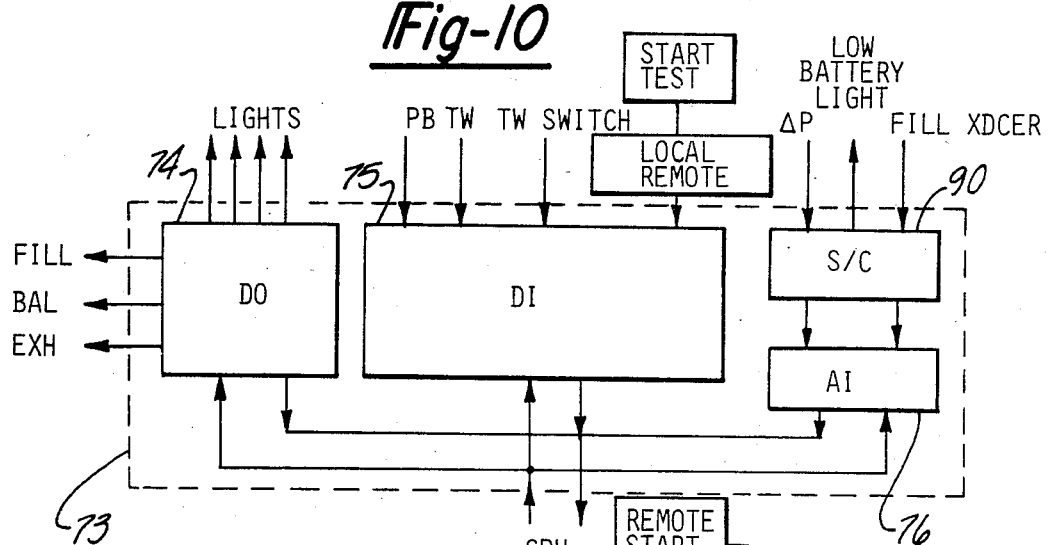
FIG. 11 shows the interface portion of the microcomputer system shown in FIG. 10.

Referring to FIG. 11, it can be seen that the interface 73, in turn, for the basic system consists of digital output circuitry indicated by the numeral 74, digital input circuitry indicated by the numeral 75, analog input circuitry indicated by the numeral 76, and signal conditioner circuitry indicated by the numeral 90.

Figure 12:
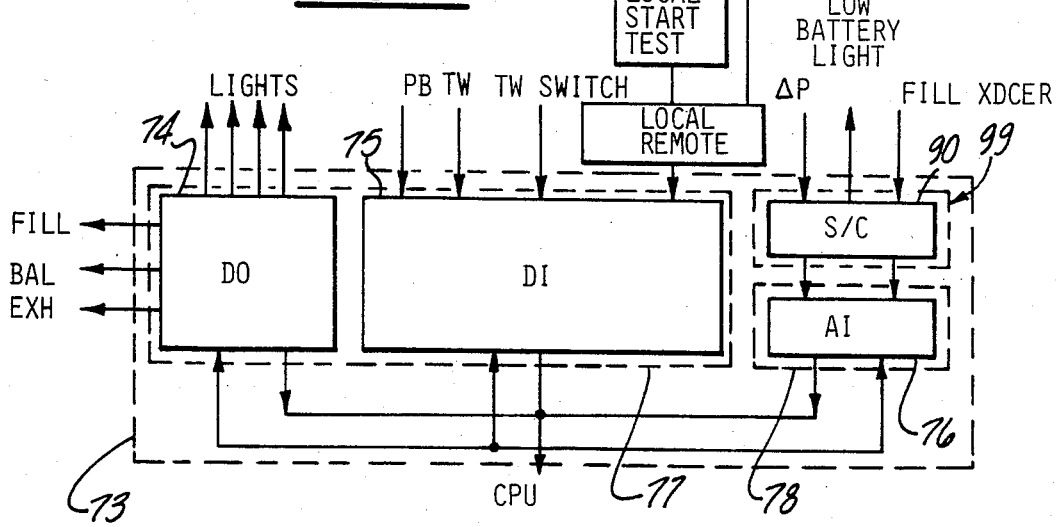
FIG. 12 shows the digital, analog and signal conditioning printed circuit boards used in the microcomputer interface shown in FIG. 11.

Referring now to FIG. 12 it can be seen that the interface 73 consists of three printed circuit boards; the digital input-output (I/O) board 77, the analog input-output (I/O) board 78 and the signal conditioning-battery backup printed circuit board 99. FIG. 12 can be correlated with the system shown in FIG. 8, as the arrows indicating the input to the interface and output from the interface correspond to those shown going to and from the microcomputer system 60 in FIG. 8. In addition, signals are freely passed between the central processing unit and the various printed circuit boards using the signal bus.

More specifically, the signals to the test, accept, reject and fault lights, numbers 49–52 respectively, are shown as outputs from the digital output circuitry 74, as are the signals to the fill valve 30, the balance valve 34, and the exhaust valve 38. Inputs from the reset switch 48, as well as from the thumbwheel switch assembly 64 are shown as inputs to the digital input circuitry. The start test input is routed through the local-remote switch 45 to the digital input circuitry. The signals from the differential pressure transducer 29 and the fill pressure transducer 40 are shown as inputs to the signal conditioning-battery backup printed circuit board 99 and are, in turn, supplied to the analog input-output board 78. The remaining output from the signal conditioning board is to the low battery light 47.

Now referring to FIG. 13, this figure is substantially the same as FIG. 12, but shows the addition of analog output circuitry 88, also located on the analog input-output board 78, which is needed to drive the change in differential pressure meter 70. Thus, FIG. 13 is correlatable to FIG. 9 in the earlier diagrammatic views.

FIG. 14 shows in detail a schematic diagram of the digital input-output (I/O) board 77. Connected to the central processing unit 72 in parallel is a thumbwheel peripheral interface adaptor 62 and a digital input-output peripheral interface adaptor (PIA) 61.

The clock 124 is used to generate pulses at 0.1 second intervals. The clock is basically well known in the art and consists of a Motorola K111A one megahertz local oscillator wired to a Mostec model No. MK5009P integrated circuit. As is well known to one in the art, the wiring together of these two components determines the clock signal provided, and it is felt that the instructions which come with these devices give more than adequate disclosure of how to obtain a one hundred millisecond clock output.

The clock output is connected directly to thumbwheel switch peripheral interface adaptor 62. When the clock pulses the peripheral interface adaptor 62, this sets a bit internal to the peripheral interface adaptor. This bit is connected to the interrupt lines of the CPU 72. Thus, every time the clock generates a pulse, the CPU sees an interrupt causing the test program to go to an interrupt service routine. Our service routine in particular first reads and stores the A/D converter output, second decrements the location of variable TIME if greater than zero, third clears the interrupt bit. Such routine can be written by one skilled in the art.

Signals coming into, or being outputted from, peripheral interface adaptors must be buffered or conditioned to match the drive and load capabilities of the peripheral interface adaptor. As is well known in the art, proper buffering, also called interfacing, is a crucial consideration in any computer system. The thumbwheel switch assembly signals are such that no buffering is required and, therefore, are directly connected to the thumbwheel peripheral interface adaptor 62.

It is to also be understood that what is shown herein is a preferred embodiment of our improved electronic dynamic balance leak test system, wherein we are using signals to drive the exhaust valve, the fill and balance valves, the accept, reject, test and fault lights and are receiving input signals from the local-remote start test, and reset switches which must be buffered before being compatible with the peripheral interface adaptors. However, the scope of the present invention is such that equipment embodying it can be used to control a wide variety of leak test systems, and may not have all of the features shown in our device, or may have additional features not shown in the present drawings, but be within the scope of the invention.

In general, referring still to FIG. 14, an output buffer 80 of a type to provide a desired number of output signals is in this case connected to the digital input-output peripheral interface adaptor 61 to provide eight output signals, one of which remains unused, another of which is used to operate the exhaust valve, two of which are used to operate the fill and balance valves, and the others of which are used to operate the test, accept, reject and fault lights 49–52 respectively.

Within the digital input circuitry 75 is a portion of the digital input-output peripheral interface adaptor 61 receiving signals from input buffers 82, which are used to accept signals from the reset switch 48 (see FIGS. 8 and 9), and the test start signal, which would be a signal telling the system to start a new leak test. Both the reset and start test signals are passed through single shots 79 before entering the input buffers 82.

It should be understood by one skilled in the art that the start test signal is supplied from momentarily depressing the start test switch 46 when the local-remote select switch 45 is in local mode and that the start test signal is supplied from an external means when the local-remote select switch is in remote mode.

Figure 17:
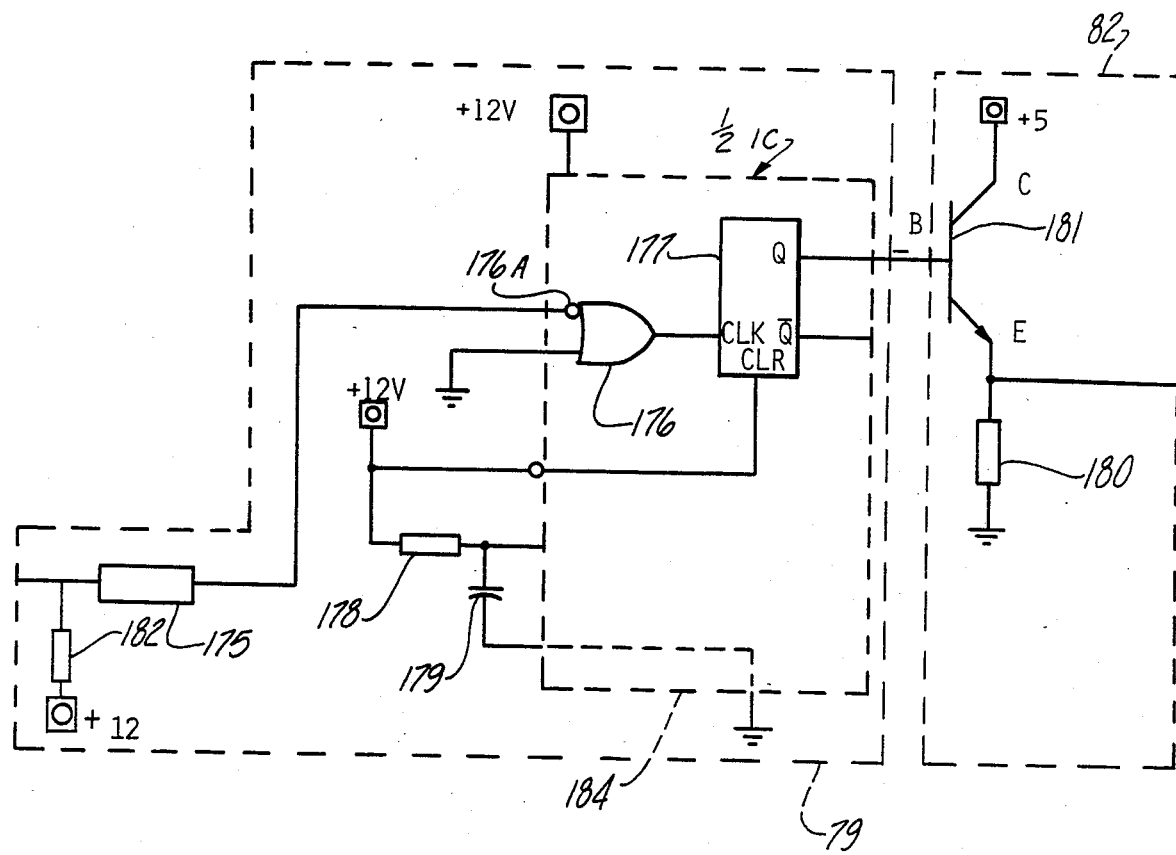
FIG. 17 is a schematic view of the single shots used in the circuit of FIG. 14.

Since a rather special type of signal conditioning is needed for the signal coming from the local-remote start switch, this is shown in more detail in FIG. 17. The signal from the local-remote switch 45 first passes into the input circuit protection resistor 175, which is a device recommended by the manufacturer of the dual signal shot 184, to protect such single shot from transient input spikes. After the signal passes through the circuit protection resistor 175, it enters the OR gate 176 through the inverting input labeled as 176A. The inverting input is necessary to ensure that the signal from the circuit protection resistor, which is normally a "going low" signal, will cause the OR gate 176 to go high. If the inverted input was not present, the connections as shown to the OR gate would cause nothing to happen when the "going low" signal was applied to the OR gate, and this would negate our purpose of having a contact closure to produce a pulse to the clock 177.

The clock 177 receives a signal from the OR gate 176, and it is noted that the clock has a true and not true output, and in this case the not true output is unused, so that when a signal is received by the clock 177 from the OR gate 176, a pulse is applied to the input buffer 82. It should be noted that the signal from the clock will remain high for a time determined by the combination of the timing resistor 178 and timing capacitor 179, which together form a common RC time constant circuit. To ensure that the input to the input circuit protection resistor 175 is at 12 volts, a pull up resistor 182 must be interposed between the source of the signal from the local-remote switch 45 and the input circuit protection resistor 175. The OR gate 176 and the clock 177 are commercially available as one-half of a dual single shot 184 manufactured as model No. MC14538 by Motorola.

Since the purpose of the buffer 82 is to provide a signal to the digital input-output peripheral interface adaptor 61 which is useable by it, and this means a 5-volt signal, the buffer must translate the high signal from the clock, which is 12 volts, to a high signal of 5 volts before it is supplied to the digital input-output peripheral interface adaptor, and this is accomplished by the emitter-follower transistor 181. When the pulse from the clock 177 is applied to the base of the emitter-follower transistor, this results in a 5-volt signal being outputted from the emitter of the emitter-follower transistor because the signal applied to the base of the emitter-follower transistor turns on the transistor, and allows the plus 5-volt signal being applied to the collector to pass through the emitter and to ground through the emitter resistor 180, thus causing a 5-volt pulse to be developed across emitter-resistor 180. This pulse is coupled to an input of peripheral interface adaptor 61.

The pulse being supplied to the digital input-output peripheral interface adaptor 61 (see FIG. 14) is supplied everytime the output of the clock supplies a 12-volt pulse signal, is taken at a point between the emitter of the emitter-follower transistor and the emitter resistor. This results in the proper 5-volt signal pulse being supplied to the digital input-output peripheral interface adaptor 61 everytime a start test signal is provided.

As is well known in the art, the buffering techniques needed for the system hardware will vary depending on the exact process interface adaptor used, as well as the voltage of the input and output signals, and the exact hardware used with the system. We have chosen to show three types of output buffers which may be used with the preferred embodiment, with the understanding that we do not wish the invention limited to use with these types of buffers.

Figure 16:
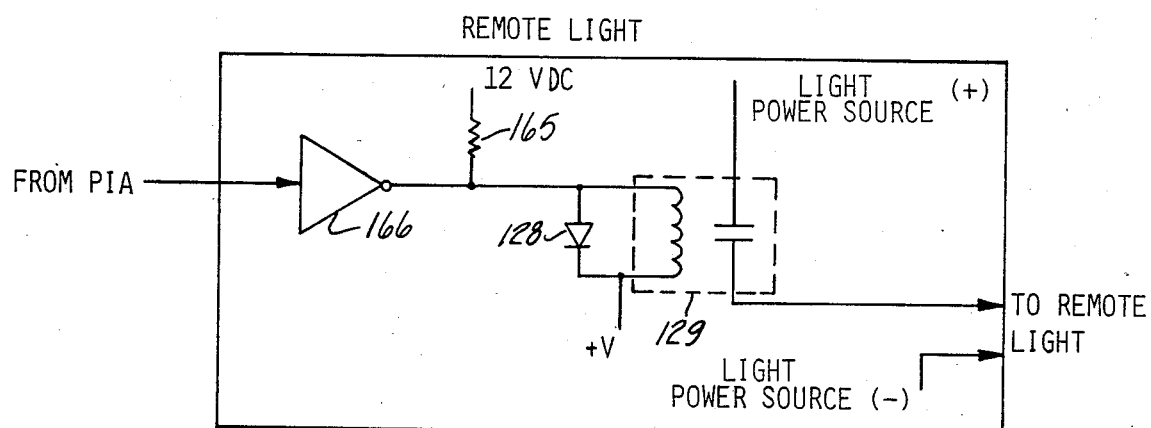
FIG. 16 is a schematic view of an alternate output buffer which may be used in the circuit of FIG. 14.
Figure 16A:
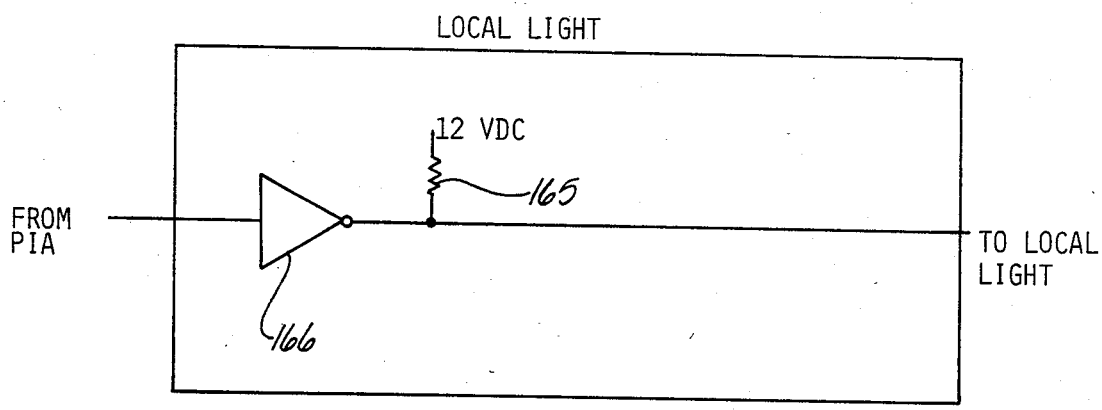
FIG. 16A is a schematic view of a further alternate type of output buffer which may be used in the circuit of FIG. 14.

FIGS. 15, 16 and 16A show only three of many types of individual output buffers which may be used in FIG. 14, and are generally indicated by the numeral 80. As mentioned before, the particular form of the buffer can depend on the particular type of peripheral interface adaptor, or the item which it is desired to drive with the signal from the buffer.

In FIG. 15 the buffer is shown as it may be constructed to operate a valve with a 115-volt AC current. Such buffer accepts the signal from the digital input-output peripheral interface adaptor 61 and feeds it to one input of a buffer/driver circuit 125 and then to a solid-state relay 127 causing the relay to energize the valve. Interposed between the corresponding output of the buffer/driver circuit and the positive input of the solid-state relay is a output buffer pull up resistor 126 connected to the power source of the leak test system (not shown) which in this case might be 12-volts DC. The negative input of the solid-state relay 127 is connected to the power supply common, the power output of the solid-state relay is connected to one leg of the 115-volt AC source, and the load output is connected to one side of the valve, the other side of which is connected to the second leg of the 115-volt AC source.

It should be understood that the buffer/driver circuit 125, and the solid-state relay 127, and resistor 126 are commerically available items. The buffer/driver circuit 125 may be such as model No. 7407 manufactured by Fairchild Camara and Instrument Corporation of Mountain View, Calif. The solid-state relay may be such as model No. 226 R1-5A1 as manufactured by Sigma Instruments Inc. of Braintree, Mass. It should also be understood that the value of and, therefore, the model of the output buffer pull up resistor 126, which is of a standard nature, will depend on the particular configuration of the output buffer.

FIG. 16 is an example of an output buffer 80 which may be used when it is desired to drive a display light (or valve) of different AC or DC voltage through an electro-mechanical relay. Again one input of the open collector inverting buffer/driver circuit 166 is connected to the digital input-output peripheral interface adaptor 61. The corresponding output of the inverting buffer/driver 166 is connected to one side of the electro-mechanical relay 129 which may be such as model No. R105-E1-Y2-J1K manufactured by Potter & Brumfield of Princeton, Ind., and the other side thereof is connected to the power source. Again the inverting buffer pull up resistor 165 is interposed between the output of the buffer/driver circuit and relay 129, and is connected to the 12-volt power supply of the system. In parallel with the relay 129 is a noise suppression diode 128 whose purpose is to prevent large noise spikes from entering the system when the relay is de-energized. As for the connections to the display light, the one line is connected to negative of the light power source, while the other line is connected through the relay contact to the positive of the light power source. It should be understood that the magnitude of the voltage depends on the type of drive to be operated.

FIG. 16A is another example of an output buffer 80 which may be used to drive a display light. In this case, one input of the open collector inverting buffer 166 is connected to the digital input-output peripheral interface adaptor 61. The corresponding output of the inverting buffer 166 is connected to the light it is desired to drive. An inverting buffer pull up resistor 165 is interposed between the output of the inverting buffer 166 and the light.

Again it is to be understood that it is well within the skill of the art to design the particular buffer needed depending on the particular peripheral interface adaptor used and the particular device it is desired to drive.

It should also be understood that the power source for the buffers may be 12 volts DC, as shown herein, or a different voltage depending on the type of logic devices used.

FIG. 18 shows the analog input-output printed circuit board 78, wherein the analog input-output peripheral interface adaptor 63 is connected to the central processor unit 72. The analog input-output board basically consists of two sections, the analog output circuitry 88 and the analog input circuitry 76. Referring first to the analog output circuitry, connected to the analog input-output peripheral interface adaptor 63 is a digital latch 83 which latches the digital signal from the analog peripheral interface adaptor 63, that is, the digital latch remembers the digital signal from the peripheral interface adaptor. Connected to the output of the digital latch 83, which might be model No. 14508 manufactured by Motorola Semiconductor Products Inc., are the corresponding input of a digital to analog (D/A) converter 84 which converts such digital signal into an analog output voltage signal proportional to the digital value of the digital input signal.

The output of the digital to analog converter 84, which might be model No. 1408, also manufactured by Motorola, is, in turn, connected to the input of the gain circuit 87 which is used to adjust the output of the digital to analog converter 84 to the desired output value. The output of the gain circuit 87, which may be a simple operational amplifier circuit, is, in turn, connected to the change in differential pressure meter 70, if used.

Now to understand the analog input section 76 of the analog input-output board 78, the multiplexer 94 has a channel select input connected to the analog input-output peripheral interface adaptor 63. The purpose of the channel select input is to select which one of the two analog signal inputs will be passed through the multiplexer 94 to the following portions of the circuit and that, in turn, depends upon which operation is to be accomplished at the precise time the signal is inputted thereto.

For example, it is desired that the channel one input of the multiplexer 94 pass through the differential pressure transducer signal produced by the differential pressure transducer 29. As will be described further below, it is necessary to scale and condition the output of the differential pressure transducer 29 and thus connected to the output of the transducer 29 is a differential pressure signal conditioner 158 which may be such as the Validyne model No. CD101-4. By proper use of the Validyne signal conditioner the maximum output of the transducer 29 may be adjusted to produce a positive maximum value of +5 milliamps, and a negative maximum value may be adusted to the value of −5 milliamps.

This output signal, which is a current, is supplied to a signal conditioner 103. If the differential pressure meter 53 is utilized, the output signal from the signal conditioner 158 is connected to the meter 53 which, in turn, is connected to signal conditioner 103. Signal conditioner 103 contains a resistor which converts the current value to a proportional voltage signal, which is supplied to a span and zero adjust circuit such as that shown in FIG. 18B.

The channel zero input of the multiplexer is connected to the fill pressure signal supplied by the fill pressure transducer 40. As before, to take advantage of the ease of mathematics which conditioning and scaling provides, it is also necessary to scale the output of the fill pressure transducer 40. Since the maximum output span of the selected fill pressure transducer is approximately 10 volts and has a 2.5-volt offset, and a commercially available signal conditioning card, such as the Validyne card, is not available, the fill pressure transducer must be connected to the channel zero input through the fill pressure signal conditioner generally designated by the numeral 104.

Referring to FIG. 18A it can be seen that the input from the fill pressure transducer is connected through a first conditioning resistor 137 to the negative input of a first conditioning operational amplifier 130. A first conditioning potentiometer 138 is connected between the negative input and the output of the first conditioning operational amplifier 130.

Connected to the positive input of the first conditioning operational amplifier is a second conditioning potentiometer 139. Connected to the output of the first conditioning operational amplifier, through a second conditioning resistor 131, is a negative input of a second conditioning operational amplifier 133. The positive input to the second conditioning operational amplifier 133 is connected to ground. A third resistor 134 is connected between the negative input and the output of the second conditioning operational amplifier 133. By reason of this arrangement, our circuit can be used with a wide range of transducers, and still adjust span and zero such that the output will have a value of 0 volts DC when the fill transducer is at zero and have an output of 5 volts DC when the fill transducer is at the desired full scale.

Also, we may use only part of the full range of a transducer with the results. For example, if we want to use a 0–30 p.s.i. differential pressure transducer for only a 0–15 p.s.i. range, we may have a 15 p.s.i. reading giving a 5-volt signal.

After the signal from the fill pressure transducer 40 is conditioned by the fill pressure signal conditioner 104 as just described, it is fed to the channel 0 input of the multiplexer 94. From the multiplexer 94, this signal is, in turn, fed into a non-inverting zero and span adjust circuit 159.

Figure 18B:
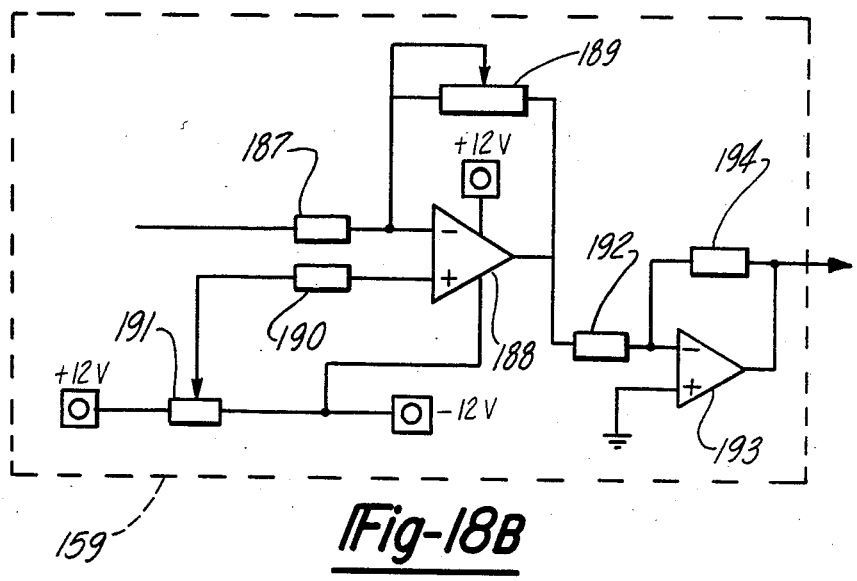
FIG. 18B is a schematic view of a non-inverting zero and span adjustment circuit shown in FIG. 18.

Referring to FIG. 18B it can be seen that the input from the multiplexer 94 is connected through a first gain input resistor 187 to the negative input of a span and zero operational amplifier 188. A gain feedback potentiometer 189 is connected between the negative input and the output of the span and zero operational amplifier 188.

Connected to the positive input of the span and zero operational amplifier is a zeroing input resistor 190. Connected to the zeroing input resistor 190 at its input is a zeroing adjust potentiometer 191. The output of said span and zero operational amplifier 188 is connected through a second gain input resistor 192 to the negative input of an inverting amplifier 193. The positive input of said amplifier is connected to ground, and a gain feedback resistor 194 is connected between the negative input and the output of inverting amplifier 193.

The function of this portion of the non-inverting zero and span adjust circuit 159 embodying elements 192–194 is to re-invert the signals coming from the portion of the circuit embodying elements 187–191 and thus provide a non-inverted zero and span adjusted signal to the input of the sample and hold circuit 95, which may be such as model No. SHM-1C1 manufactured by Datel-Intersil of Mansfield, Mass. Also connected to the sample and hold circuit 95 is a signal from the analog input-output peripheral interface adaptor 63, the purpose of which signal is to cause the sample and hold circuit to sample or pass through the analog input signal. The output of the sample and hold circuit 95 is then fed to the input of the gain circuit 96 whose purpose is to adjust the signal from the sample and hold circuit 95 to a signal whose voltage level is compatible with the analog to digital converter 97 to which the signal is supplied. The A/D converter, which might be model No. ADC-ET10BC, also manufactured by Datel-Intersil, is also connected to the analog input-output peripheral interface adaptor 63.

At this point the signal originally taken in by one of the channels of the multiplexer 94 is now fed, after passing through the analog to digital converter 97, as a digital representation of the analog voltage signal to the analog input-output peripheral interface adaptor 63 as a data digital signal. By supplying proper channel select inputs to the multiplexer 94 and proper sample signals to the sample and hold circuit 95, the channel zero and channel one inputs to the multiplexer are converted to a digital representations which are fed to the peripheral interface adaptor 63, thereby supplying values of differential pressure and fill pressure as required by the software.

Figure 19:
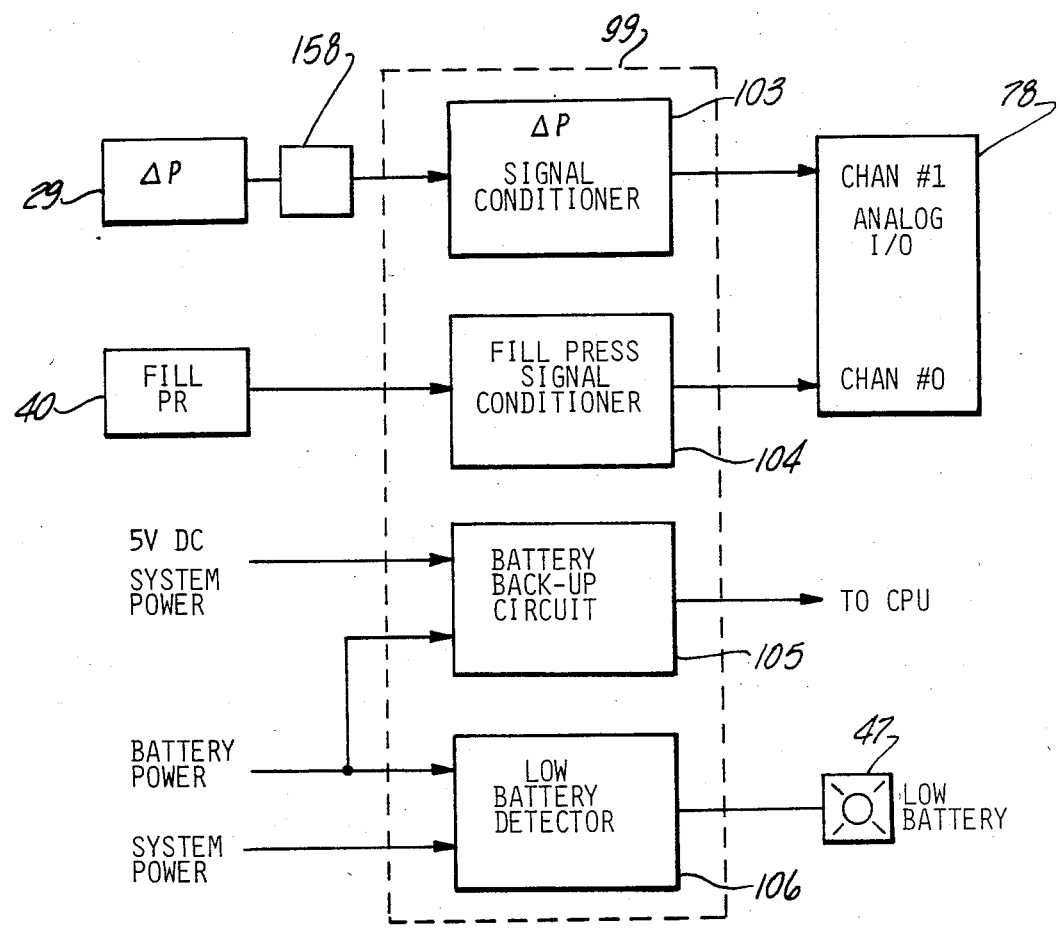
FIG. 19 is a diagrammatic view of the signal conditioning-battery backup printed circuit board shown in FIGS. 11, 12 and 13.

Referring to FIG. 19, between the analog input-output board 78, and the differential pressure transducer 29, and fill pressure transducer 40, are interposed a differential pressure signal conditioner 158 and a fill pressure signal conditioner 104, both of which are located on the signal conditioning-battery backup printed circuit board 99, and a signal conditioner 103.

A battery backup circuit 105 and a low battery detector circuit 106 are also shown in FIG. 19 on the signal conditioner-battery backup printed circuit board 99. The purpose of the battery backup circuit is to prevent loss of memory in case the system power is turned off, or otherwise lost. In this instance, the battery backup circuit (FIG. 21) will supply a voltage to the random access memory portion 71A of the CPU board 98 to retain memory until the system power can be restored. If the battery backup system were not present, and the system power was lost, everything in the RAM, which includes system limits, system tolerances, and fill times, would be lost and would have to be reloaded into the system before it could resume leak testing.

In order to make certain that the batteries in the system are kept in a full power condition, whether by replacement or recharging, a low battery detector circuit 106 is supplied. If the voltage supplied from the batteries falls below a predetermined level, the low battery detector circuit illuminates the low battery light 47, alerting the operator of the system that the batteries need replacing or recharging.

Figure 20:
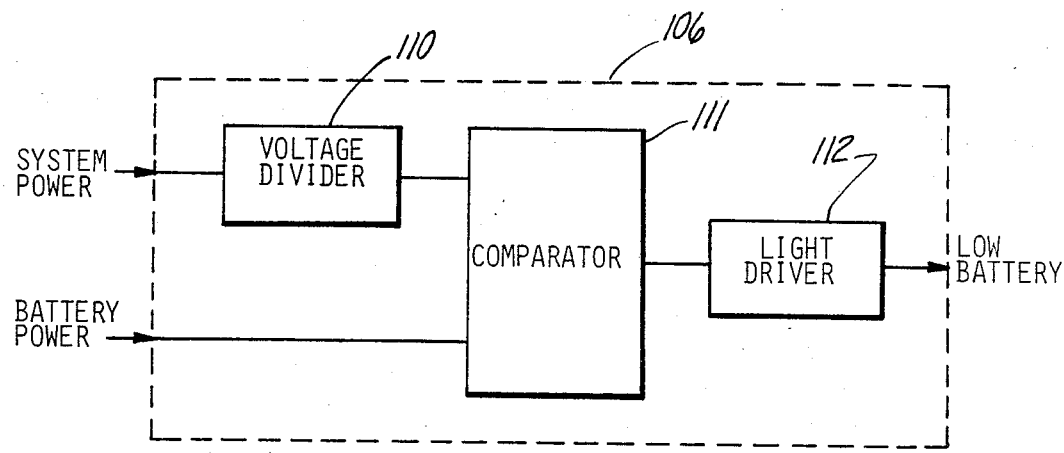
FIG. 20 is a schematic view of the low battery detector circuit shown in FIG. 19.

The low battery detector circuit 106 is shown in FIG. 20. The operation of the system is relatively simple and one simply feeds the system power into the input of a voltage divider 110 which is of proper value to lower the voltage of the system at its output to a value which equals the voltage which you desire the batteries not to fall below. The output of the voltage divider is then connected to a first input of a comparator 111, while the power from the batteries (not shown) is connected to a second input of the comparator 111.

When the second input voltage falls below the first input voltage, the comparator 111, at its output, supplies a signal to the input of a light driver circuit 112. It is to be understood that the light driver circuit is substantially like the output buffers previously described in that its particular form would depend on the particular voltage and other system requirements, and its construction is well within the skill of those in the art. Therefore, it is not felt that a detailed description need be given herein. The output of the light driver is connected to the low battery light 47.

Figure 21:
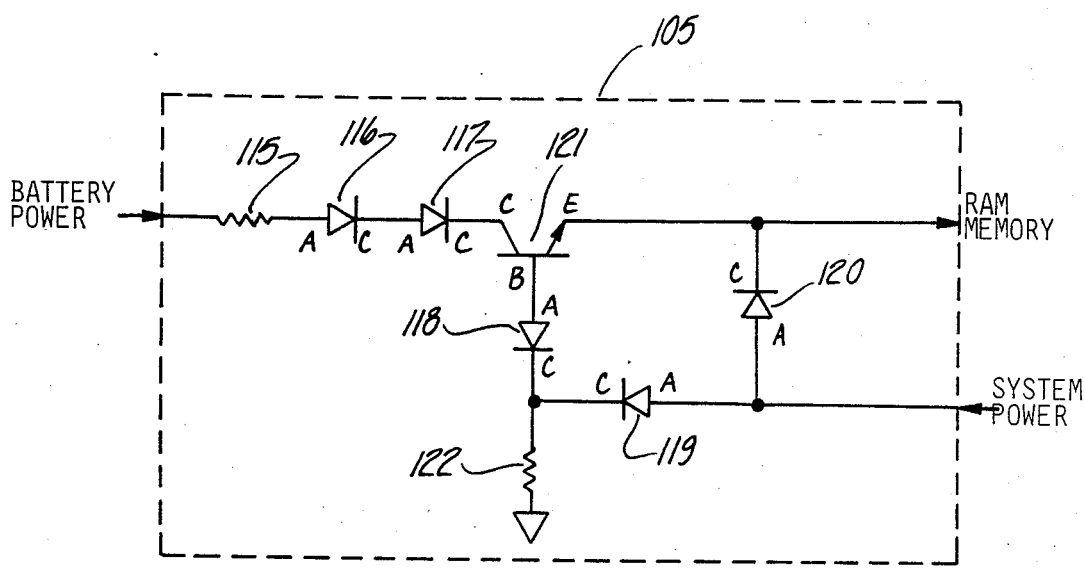
FIG. 21 is a schematic view of the battery backup circuit shown in FIG. 19.

The battery backup circuit 105 is shown in detail in FIG. 21. Central to the battery backup system is a battery backup transistor 121, which may be such as model No. 2N3905 manufactured by Motorola Semiconductor Products Inc., having an emitter, base, and collector. Connected to the collector seriatim is a first diode 116 and a second diode 117, and connected to the anode of the first diode 116 is a power resistor 115. The other end of the power resistor 115 is connected to the battery power in the system.

Connected to the base of the transistor through a third diode 118 and a second resistor 122 is system power common. Interposed between the cathode of the diode 118 and the resistor 122 is a connection to the cathode of the fourth diode 119. The anode of the fourth diode 119 is connected to the system power as well as to the anode of the fifth diode 120. The cathode of the fifth diode 120 is interposed between the emitter of the transistor 121 and the RAM memory.

As long as system power is provided, it will be directly supplied through the fifth diode 120 to the RAM memory because the system power passing through the fourth diode 119 and the second resistor 122 to common is prevented from passing from cathode to anode through the third diode 118, making the transistor 121 act as an open switch preventing the battery power from passing through the transistor 121 to the RAM memory.

However, when system power is lost, there is no current passing through the fourth diode 119, thereby allowing transistor 121 to act as a closed switch and have the battery power pass through the resistor 115, the first and second diodes 116 and 117, through the transistor 121, to the RAM memory.

The resistor 115 is interposed in the circuitry because the RAM memory requires a 5-volt power source, and a 5-volt battery is not available. Thus, depending on the battery that is being used, the value of resistor 115 is chosen so that the voltage supplied to RAM memory is the required 5-volt DC.

Figure 22:
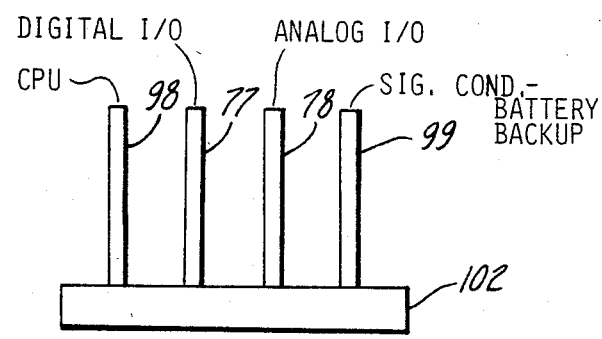
FIG. 22 is an elevational view of the four printed circuit boards shown in the interior of the test cabinet shown in FIG. 2.

FIG. 22 shows the central processing unit contained on a central processing printed circuit board 98, the digital input-output printed circuit board 77, the analog input-output printed circuit board 78, and the signal conditioning-battery backup board 99 are all mounted in a backplane 102, which interconnects the printed circuit boards. Such backplane 102 is utilized, but is not visible in FIG. 2 showing the interior of the equipment cabinet 42.

Much of the above discussion has been directed to an explanation of the operation of the various components in our leak test system. Now for an understanding of the overall system, in actual operation, it is first necessary to supply power to the system in any of several manners well known in the art.

After momentarily depressing the reset switch 48, it is necessary to enter the test values desired for the particular test being run, if they are not already in RAM memory. As previously mentioned, the user will specify some of these values based on past requirements, and the other values will be chosen based on his own experience. Four specification values usually must be provided to have a representative test condition. Presuming that we are talking about testing at standard temperature and pressure, a value of the test volume, and values for test pressure, maximum leak rate and test time must be arrived at. Specified values for a typical test example are:

Test volume: 135 cubic centimeters
Test pressure: 15 p.s.i.
Maximum leak rate: 1 cubic centimeter per minute
Test time: 3 seconds
Fill pressure transducer range: 0–20 p.s.i. full scale
Differential pressure transducer range: 1 inch of water It should be understood that the test volume includes both the system volume and the part volume, and the system volume will be known for the particular system in use.

To test a given cavity for pressure leak rate, the following data must be entered in the microcomputer system 60 via the thumbwheel switch assembly 64. The assembly 64 provides communication with the CPU for storage of the data in RAM memory. If a four digit thumbwheel switch 65 is being used, the digit in the thousand's column is used to select the input data destination, and is coded as follows:

1 = Fill time (in 0.1 second increments)
2 = Balance time (in 0.1 second increments)
3 = Test time (in 0.1 second increments)
4 = Fill pressure low limit (p.s.i. in 0.1% of full scale)
5 = Fill pressure high limit (p.s.i. in 0.1% of full scale)
6 = Pressure change limit (in 0.1% of full scale)

Most of the values required above are easily determined based on experience or experimentation, except the pressure change limit, in percent of full scale of the differential pressure transducer range. In order to calculate the differential pressure change limit, we use the following equation:

$$DP = (407.2 \times LR \times TT)/(60 \times TV) \quad (1)$$

where
LR = leak rate (cc/min)
TV = test volume (cc)
TT = test time (seconds)
DP = differential pressure (inches of water).

For the above example, where LR=1, TV=135, and TT=3, we calculate DP to be equal to 0.15 inches of water. Utilizing a differential pressure transducer with a range of 1 inch of water, we calculate the pressure change limit (PCL) using the following equation:

$$PCL = DP/DPFS \quad (2)$$

where DPFS = full scale differential pressure (inches of water). For the above example, the pressure change limit is calculated to be 15% (i.e. 0.15/1) of full scale.

The remaining three digits on the thumbwheel switch assembly 64 are used to enter the desired values. For example, with a ten second fill time, this would necessitate entering the No. 1100 on the thumbwheel switch 65 because ten seconds contains 100 one-tenth second increments. After this is done, the thumbwheel switch pushbutton 66 would be pressed momentarily, resulting in the transfer of the information from the thumbwheel switch assembly 64 to the microcomputer system 60, in particular to RAM memory.

This occurs (see FIG. 4) because as soon as the thumbwheel switch pushbutton 66 is pressed this acts as the "Yes" entry in the flow chart of FIG. 4, and the signal from the assembly 66 is supplied to the data entry subroutine shown on FIG. 4. The data entry subroutine has not been disclosed in detail because this is a program easily written by one skilled in the computer art. The final program will vary depending on where you want the data stored in the microcomputer memory, and how the data should be stored. It should be noted that data entry cannot be done during the time that a test is taking place. The remaining items from the above table would be entered in a similar fashion. To enter the five second balance time it will be necessary to enter the No. 2050 on the thumbwheel switch 65, and momentarily press the thumbwheel switch pushbutton 66.

Similarly, a three second test time would be entered as 3030, and pressing the thumbwheel switch pushbutton 66 we would have the three second test time.

A 14 p.s.i. fill pressure low limit would result in the entry of 4700 (14 p.s.i./20 p.s.i. is 70% which would be 700 increments of 0.1% each), and a 16 p.s.i. fill pressure high limit would be entered by making the entry 5800 (16 p.s.i./20 p.s.i. is 80%) and pressing the thumbwheel switch pushbutton 66. The pressure change limit of 15% full scale would be entered by entering the No. 6150 (since 15% equals 150 increments of 0.1%) and pressing the pushbutton 66. Again, all of these entries will result in the appropriate signals being supplied from the thumbwheel switch assembly 64 to the microcomputer system 60, and in particular to RAM memory, through the data entry subroutine shown in FIG. 4.

In actuality, the signals from the thumbwheel switch first travel to the interface 73 of the microcomputer system 60, and more particularly to the digital input circuitry 75 of the digital input-output board 77, and then to the thumbwheel switch peripheral interface adaptor 62, as shown in FIG. 14, where they then travel to the central processor unit 72, and then to the RAM memory 71A. It should be understood that, in actuality, the one signal shown going to the interface consists of 17 different signals, four for each digit of the thumbwheel switch 65, and one for the thumbwheel switch pushbutton 66.

It is not believed necessary to set these signals forth in detail because the manufacturers of the thumbwheel switch assemblies supply sufficient instructions to enable one skilled in the art to determine the particular interconnections desired depending upon the application to which the thumbwheel switch is being put. In this case, the thumbwheel switch may be such as model No. 430105-4 manufactured by The Digitran Company of Pasadena, Calif.

It should be further understood that the data entries discussed immediately above cannot be entered while a test is in progress. Further, since the entries will be stored in RAM memory 71A, it is not necessary to reenter them for each test, but only when it is desired to change the test conditions, such as when a new part is being tested, or when power is completely removed from the RAM memory.

Once all the entries have been made, it is possible to proceed with a test as follows. It should be understood that the program for performing a test, as well as for data entry, is stored in EPROM memory 71B. This type memory cannot be changed except using special equipment. The RAM memory 71A is used where values must be able to be changed, such as during data entry and for temporary storage of values obtained during the test.

As previously shown, the first operation after supplying a power to the system is to press the reset switch 48. This results in a signal being supplied through the interface 73, and more particularly, to the digital input circuitry 75 via the digital input-output printed circuit board 77 to the input buffer 82, and to the digital input-output peripheral interface adaptor 61, and then to the CPU 72, thereby being supplied to the microcomputer system 60. This causes the program to run by first initializing the stack pointer and the PIAs, and then continuing to cycle all of these according to the flow chart shown in FIG. 4.

To initiate the test in local start mode, the local-remote switch 45 is set to its local position. To one skilled in the art of computer design, it can be seen that this results in the exclusion of a remote start signal being supplied from the local-remote switch 45 to the microcomputer system 60 via the digital input circuitry 75 and the digital input-output printed circuit board 77, the input buffer 82, and the digital input-output peripheral interface adaptor 61 (see FIGS. 8, 10–12 and 14).

Of course, if a remote signal were being used to start the test, such as when our electronic dynamic balance leak test system is combined as part of a larger machine system, the setting of the local-remote switch 45 in the remote position would permit a remote signal being supplied to the input buffer 82 and the digital input-output peripheral interface adaptor 61 and thus to the microcomputer system 60.

Once all the pushbutton data entries have been made, and the local-remote switch has been set to local mode, the start test switch 46 is pressed momentarily. This results in a signal being sensed by the microcomputer system 60 via the central processing unit 72 because of the signal being supplied to the interface 73, and more particularly to the digital input circuitry 75, the digital input-output printed circuit board 77, and the input buffer 82 which, in turn, supplies the signal to digital input-output peripheral interface adaptor 61. Again see FIGS. 8, 10–12 and 14.

Now that the start test switch 46 has been momentarily pressed, and the hardware operations just described have taken place, a "Yes" answer is supplied to the decision block in FIG. 4 entitled "Start Leak Test?". This results in a transfer of the program to the leak test cycle subroutine shown in FIGS. 5 and 6, which will now control the operation of the hardware components of the system. It should be understood that the fill valve 30 is normally closed, while the balance valve 34 and exhaust valve 38 are normally open.

As previously discussed in connection with FIG. 5, the next operation is for the exhaust and fill valves to be energized, as represented by the close exhaust valve and open fill valve operation blocks in FIG. 5. More particularly this results in signals being supplied from the microcomputer system 60, and in particular the CPU 72 contained therein, to the digital input-output peripheral interface adaptor 61. The close exhaust signal, in turn, is operated on by the digital input-output peripheral interface adaptor 61 and is supplied to the output buffer 80 which changes it into a signal directly able to energize the exhaust valve 38, thereby closing it.

The output buffer 80 may be that shown in FIG. 15, where the signal from the peripheral interface adaptor 61 is supplied to the buffer/driver circuit 125 which results in the operation of a solid-state relay 127 closing the 115 volt AC circuit to directly energize the valve.

In regard to the fill valve, the open fill valve signal is supplied from the CPU 72 to the digital input-output peripheral interface adaptor 61 and then to the output buffer 80 which directly energizes the fill valve 30. FIG. 15 represents an output buffer 80, and results in a signal from the peripheral interface adaptor 61 going through the buffer/driver circuit 125 and operating a solid-state relay to close the 115-volt AC circuit to directly energize the valve.

As previously explained in connection with FIG. 5, the balance valve from the previous test stays open, which is its normal de-energized state, so that there is no signal being supplied to it at the present time.

At this time the fill delay time operation shown in FIG. 5 takes place. It will be recalled that in the example the fill delay time was 10 seconds. The fill delay is done by initially copying the value of the number entered as fill delay in 0.1 second increments, into a RAM memory location called TIME. When an interrupt occurs, it decrements the value stored at TIME as previously described. The interrupt occurs at 0.1 second intervals and thus, the process continues until the value stored at TIME is equal to zero.

Upon completion of the fill delay time operation, as shown in FIG. 5, the leak test system obtains a reading of the fill pressure. Referring to FIGS. 8, 10–12, 18 and 19 this is done by utilizing the analog to digital (A/D) subroutine shown in FIG. 23 to cause a reading from the fill pressure transducer 40 to be obtained by the CPU 72.

It can be seen that the transducer signals are always present at the multiplexer 94. The signal obtained from the fill pressure transducer 40 is supplied to the fill pressure signal conditioner 104.

The signal conditioner 104 changes the signal from the fill pressure transducer 40 to one compatible with the analog input-output board 78 shown in FIG. 18. It should be understood, before proceeding further, that the fill pressure signal conditioner 104 is contained on the signal conditioning-battery backup printed circuit board 99 which, as shown in FIG. 11, is contained as part of the interface 73, which is part of the microcomputer system 60.

The sample and hold circuit 95 receives a signal from the analog input-output peripheral interface adaptor 63 telling it to allow the input voltage to be fed through the output, thus acting as a closed switch.

Figure 23:
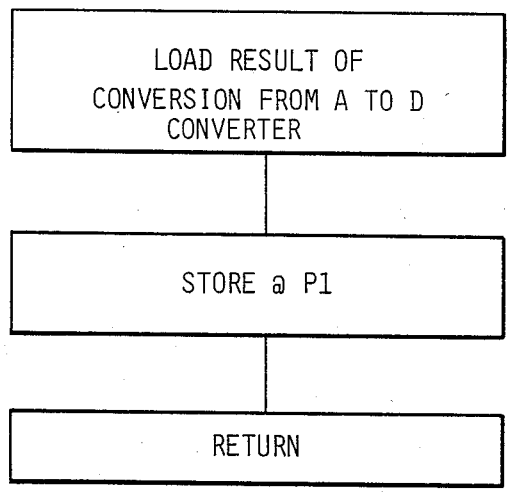
FIG. 23 is a flow chart showing a sequence of principle steps performed by the analog to digital conversion subroutine used in the present system.

With this signal present at the channel zero input of the multiplexer circuit shown in FIG. 18, the A/D subroutine shown in FIG. 23 can be utilized to read such signal. The first operation which must take place is to initialize the analog input-output peripheral interface adaptor 63 which, in effect, is setting up the digital input-output peripheral interface adaptor 61 to use it for analog to digital conversion to enable it to read signals. Once this is done, the channel select input of the multiplexer chip 94 receives a signal from the analog input-output peripheral interface adaptor 63 telling it to throughput the voltage inputted at the channel zero input. In effect it has selected channel zero.

The signal from the multiplexer 94 is enabled to pass through the zero and span adjust circuit 159 and the sample and hold circuit 95, and the gain circuit 96, and to enter the analog to digital converter 97. Then hold is selected by the analog input-output peripheral interface adaptor 63, thus stabilizing and preventing any further variation in the signal from the sample and hold circuit 95 being supplied to the A/D converter.

The analog to digital converter is in a mode of continuously converting the incoming analog signal and does not use a start conversion signal nor does it generate a conversion complete signal. After the fill delay, a reading of channel zero is taken and stored as a variable $P_1$.

Now returning from the A/D subroutine to the flow chart of FIG. 5, it can be seen that the question is next asked by the decision box thereon as to whether or not the fill pressure is within limits. It should be recalled at this time that the fill pressure limits are those which were previously read into RAM memory using the thumbwheel switch assembly 64 when discussing the above example, and in this case is 14 p.s.i. for the fill pressure low limit, and 16 p.s.i for the fill pressure high limit.

If the fill pressure is not within these limits, this indicates a fault, and the CPU 72 will transfer the program to the fault sequence indicated in FIG. 6, which turns on the fault light 52, turns on the reject light 51, turns off the test light 49, opens the balance and exhaust valves, 34 and 38 respectively, closes the fill valve 30, and thus returns the program to the idle loop shown in FIG. 4. This fault sequence occurs in entirety even if some steps cannot be performed, such as the turning off of the test lamp, which might not be on during this particular type of fault.

The fault light is turned on substantially in the same manner as the steps earlier described of closing the exhaust valve and opening the fill valve, in that (see FIG. 14) a signal is supplied from the central processing unit 72 to the digital input-output peripheral interface adaptor 61 which supplies, in turn, a signal to the output buffer 80. The signal from the peripheral interface adaptor 61 is supplied to the input of the buffer/driver circuit 125, and the output of the buffer is then supplied to an electro-mechanical relay 129 to close the contacts, which completes a circuit supplying the power source to the fault light 52, which then is turned on.

The reject light 51 is turned on in a similar manner. The fill valve is closed and the exhaust valve is opened by supplying signals from the CPU to the digital input-output peripheral interface adaptor which, in turn, removes the signals from the output buffers, thereby de-energizing the valves.

Referring again to FIG. 5, if the fill pressure is within limits, the balance valve 34, which, as previously mentioned, remained open from the last test, is now closed. The manner of closing the balance valve need not be described in detail because this is accomplished in the same way the exhaust valve and the fill valve were energized.

At this time, a balance delay time is programmed into the system which, as previously described, is a method of providing a pause in the system operation sufficient to take into account the pneumatic effects caused by the opening and closing of the valves previously discussed. After the balance delay time, which in our example was a five second balance delay time, and was programmed into the system by entering 2050 on the thumbwheel switch 65 and the pressing of the thumbwheel switch pushbutton 66, has expired, the CPU 72 gets and stores the initial differential pressure reading.

Referring again to FIG. 18, the process for obtaining the initial differential pressure reading occurs in substantially the same manner as the obtaining of the reading of the fill pressure transducer 40 previously described. The only difference is that the signal from the analog input-output peripheral interface adaptor 63 to the channel select input of the multiplexer 94 would be such that the multiplexer would be through putting the signal present at its channel one input. Upon getting the reading, the value is temporarily stored in RAM memory as variable $P_1$.

The initial differential pressure is stored in RAM memory 71A, which is a part of the memory 71. Since the A/D converter we are using in what is known as an 10-bit unit, these values are stored in the form of ten bits of information. If all of the bits are in the on, or one state, we know that the transducer values are at or above the maximum value, and the fault sequence is then entered, as previously discussed, if the fill pressure were not in limits. If all the bits are in their off, or zero, condition this would correspond to a negative off scale reading and also results in a fault sequence as before.

As an indication that the CPU 72 has started the actual leak test portion of the test sequence, the program proceeds to turn on the test lamp 49 in a manner similar to that previously described for turning on the fault lamp 52 and the reject lamp 51. The CPU then proceeds to the test delay time operation. If we are using the version of our electronic dynamic balance leak testing system which does not employ the change in differential pressure meter 70, we simply employ another loop for the test delay time to allow this to take place. At the conclusion of the test delay time, the CPU obtains and stores the final differential pressure.

The calculate differential pressure operation involves taking the initial pressure and final differential pressure reading and determining the difference. This method is easily programmed by one skilled in the art, and it is believed that a detailed discussion of the program to calculate these values is not necessary herein.

If the change in differential pressure is positive, this does indicate a loss in pressure to some extent, which would normally be expected. At this time the next decision box is entered, and the question is asked "Is the total differential pressure greater than the limit of differential pressure?" which, in essence, following our previous example, is asking the question whether the pressure change limit has been exceeded. In this case, the program is asking if the change in differential pressure is greater than 15% of full scale, which corresponds to 0.15 inch of water since, in our example, we assumed a one inch of water differential pressure transducer.

If the answer to the question "Is the total differential pressure greater than the limit of differential pressure?" was "Yes", this would indicate a reject part, and we would be going into the reject sequence previously described. We would turn on the reject light 51, turn off the test light 49, open the balance and exhaust valves, 34 and 38 respectively, and return from the leak test subroutine to the main test program.

Figure 24:
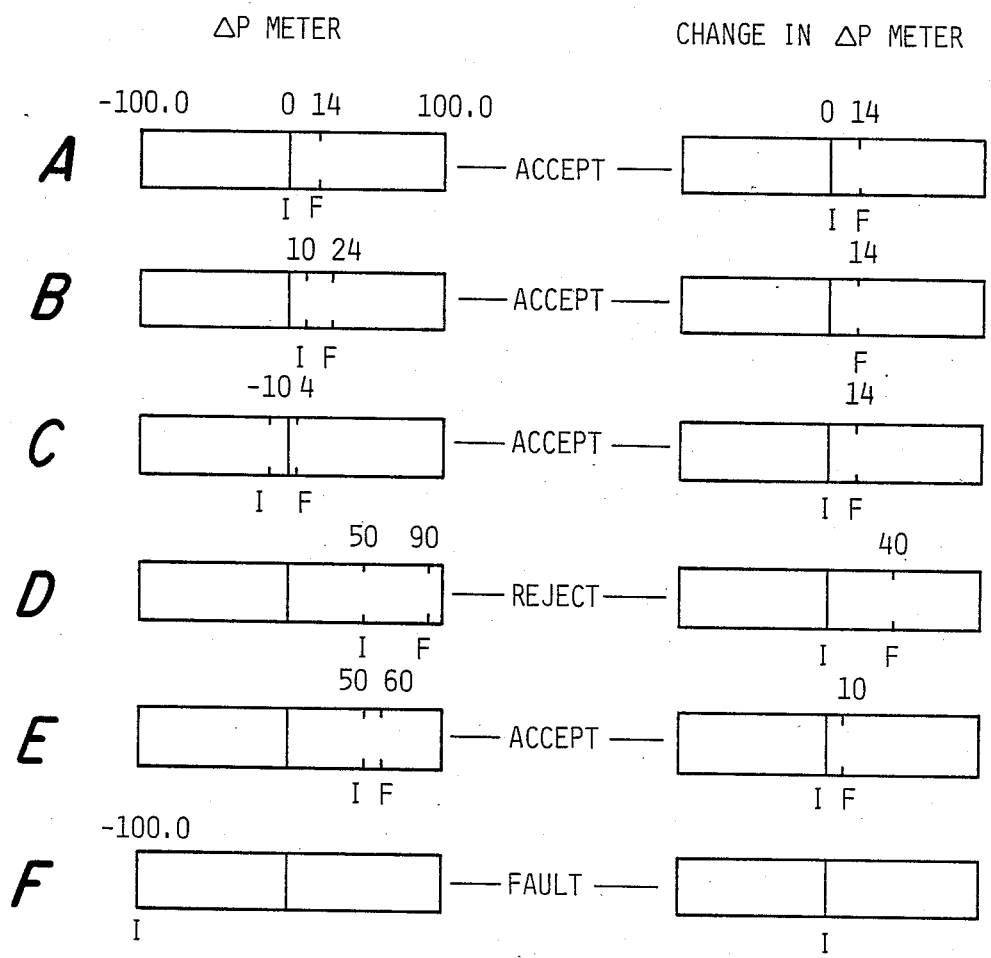
FIGS. 24A–24F depict a series of various readings on the differential pressure and change in differential pressure meters used in the present system which show various conditions which may indicate an acceptable part, a fault in the test, or a rejected part.

Referring to FIG. 24, the need for this maximum value check becomes evident. FIGS. 24A-24F show various views of the differential pressure meter 53, as well as the change in differential pressure meter 70, which will be discussed later.

Using a reading from 0-100 as a full scale reading, we might use a zero center meter which reads from 0 to +100 on the right-hand side as a full scale pressure reading, and from 0 to −100 on the left-hand side as a negative value of the change in differential pressure, which would indicate a negative full scale reading. Since we have a one inch of water differential pressure reading, the +100 would represent 100% of one inch of water, while the −100 would represent a negative 100% of one inch of water.

In the prior art example, the 0–100 full scale reading would represent 15 p.s.i. Note that 15 p.s.i. is equivalent to approximately 415.5 inches of water ($15 \times 27.7 \times 415.5$), thus the transducer in the prior art has a full scale reading with 415.5 times less resolution than the differential pressure transducer we are using. At its best, the prior art sensitivity was one part in 20,000 which is 0.020 inches of water ($415.5/20,000 = 0.0208$).

In our improved system, the resolution is that of the A/D converter, which as previously discussed, is a 10-bit bipolar type, meaning the resolution is approximately 1 part in 1024 (which is 2 to the 10th power). We have selected a Validyne differential pressure transducer with a range of plus or minus 1 inch of water.

To further explain the sensitivity of an A/D converter, we can first consider a 1-bit type. If we have a voltage range of 0–10 VDC, a 1-bit converter can detect two conditions, 0–5 volts (0) or 5–10 volts (1), since a 1-bit signal can either be on or off. If we now consider a 2-bit converter, the additional bit doubles our resolution, and we can now detect four conditions, 0–2.5 volts (0,0), 2.5–5.0 volts (0,1), 5.0–7.5 volts (1,0), or 7.5–10.0 volts (1,1). The resolution is effectively doubled with each additional bit and is determined by powers of two, that is for an 10-bit A/D converter, the sensitivity is one part to the 10th power of two, or one part in 1024. However, for ease of mathematical processing, we have utilized only 1,000 parts to convert the transducer range of −1 inch of water to +1 inch of water. Thus, our sensitivity is 1,000 parts for a full transducer span of 2 inches of water, or 0.002 inches of water per part. This is 10 times better than the prior art.

It should be understood that the models selected and examples shown herein consider the 10-bit A/D converter, however, use of a 12-bit or 14-bit A/D converter, for example, are considered to be within the scope of the invention.

As is well known in the art, when an 10-bit A/D converter is at its maximum value, all bits are on, and the decimal equivalent thereof is the numeral 1023. We have used thumbwheel switches to enter the numbers of our various parameters and indicate the change of pressure on the differential pressure meter 53 and on the change in differential pressure meter 70.

Again referring to FIG. 24, the legends I (initial) and F (final) appear below the representative meters in FIGS. 24A–24E, both under the column labeled "differential pressure meter" and the column labeled "change in differential pressure meter". In the following examples, it should be remembered that the differential pressure meter 53 gives a direct reading of the differential pressure, while the change in differential pressure meter 70 displays a microcomputer calculated value showing the actual change in percent of full scale which takes place regardless of the position of the initial (I) and final (F) readings on the differential pressure meter.

If ideal conditions existed, and no leakage occurred, the I and the F, representing the initial and final differential pressure readings, would be at the 0 point, both on the differential pressure meter, and the change in differential pressure meter.

However, this is not shown in FIGS. 24A–24F because this rarely occurs. What is shown in FIG. 24A is an initial differential pressure reading of 0, and a final differential pressure reading of +14 on the differential pressure meter, and a final value of +14 on the change in differential pressure meter 70. It should be understood that the initial change in differential pressure reading is always 0, since the first calculation is done immediately after the test delay time is initiated.

The initial reading under ideal conditions should be 0 because the source of test pressure, and the test part should be equal the moment after the valves have closed, resulting in a differential pressure display of 0. If the test is ideal, and the adiabatic heat, change in volume, and leakage from the test part are 0, then the final differential pressure meter display would be at 0. Since there is usually some leakage from the part under test, the final reading should show some change from the initial reading. In example A, a final differential pressure transducer reading of +14% of full scale is indicated, and the change in differential pressure is the difference between the final value of +14 and the initial value of 0, or a reading of +14 on the change in differential pressure meter. Since, recalling our example, the limit is 15, this is an acceptable test part, and the accept light will be illuminated.

FIG. 24B shows what normally happens. Because of the delay during the balance time, the initial reading will be at some place other than the 0 point on the differential pressure meter 53. In this case, after the test delay the initial reading is taken at +10, which still represents the 0 point on the change in differential pressure meter 70. The final reading is taken at +24, and the loss from +10 to +24 on the differential pressure meter 53 is represented as a reading of +14 on the change in differential pressure meter 70. If the acceptable value was 15, we have an acceptable part.

Another acceptable test part is shown in FIG. 24C where the initial reading, for many reasons, could be at −10, and a final reading at +4. The change in differential pressure meter 70 shows a final reading of +14, which is an acceptable test part if the limit of differential pressure is 15. However, it now becomes evident that it is possible to have an acceptable part which may be giving a reading such that it is very difficult to visually determine whether the part is good or not.

In order to understand why in one case (FIG. 24B) one may start with a positive initial value, and in another case (FIG. 24C) start with a negative initial value, the concept of a balance time must be understood. Presuming that the test part is one which doesn't have its own thermal characteristics (a much warmer or colder than ambient test part for example) and is not one in which wave characteristics are likely to be found, the use of a balance time is not indicated. Use of a balance time under such conditions, presuming a leaky test part, results in a positive offset to the initial reading. Thus, if no thermal characteristics or wave front characteristics are present, and a large positive initial (I) reading is present, reduction of the balance time should be considered.

However, if thermal or wave front characteristics are present, a positive or negative initial reading can be perfectly proper, depending on the particular test part. One skilled in the art will be able to determine correct compensatory procedures to arrive at a correct balance time. Thus, FIGS. 24B and C are representative of a wide range of possible test parts and conditions.

One type situation which can exist is where the differential pressure meter 53 exhibits an off scale reading in the negative direction within the test period. Since this can happen either with a loss of source pressure or an excessively warm part for which an inadequate fill time has been provided, and these conditions can be easily identified, we don't want to reject a part which gives a negative full scale reading outright. Therefore, these will always be indicated as a fault (FIG. 24F).

The reverse situation, a positive full scale reading, does not result in a fault indication, because such a reading can only result from an excessively cold part for which an inadequate fill time has been provided, or an excessive leak rate. Since a differentiation between these two conditions exceeds the capability of the basic system and requires a method of operation to be described below, a positive full scale reading will always result in a reject.

However, in the following examples it will become evident why the initial and final values of differential pressure must be compared to make certain that they are not at, or beyond, their maximum value. This is because it is possible to have either a good or bad part give an on scale reading on the differential pressure meter 53 while indicating it is unacceptable on the change in differential pressure meter 70 when compared to the differential pressure limits.

FIG. 24D is an indication of this situation, where the initial reading takes place at +50, and the final reading is perhaps +90. Because the change in differential pressure meter will show the difference as +40%, if the limit of differential pressure is 15%, a reject part would be indicated.

In FIG. 24E the initial pressure value could be +50%, perhaps due to a cold part or excessive balance time. The final reading might occur at +60%. This would result in an acceptable part if the limit of differential pressure was greater than 10%.

It can thus be seen that the change in differential pressure meter, at the conclusion of the test, indicates the magnitude of the change in differential pressure in analog form. By operator comparison of the meter reading with the specification set into the system via the thumbwheel switch assembly 64, the operator can determine whether the part is a gross reject, or one which just barely failed. Without the change in differential pressure meter 70, and the advent of electronics previously unavailable in the art, this operation could not take place. Thus, we have solved another problem long standing in the leak testing art.

We have now seen how to calculate the change in differential pressure for many of the various examples which can be encountered in the operation of our improved dynamic balance leak test system, and have discussed the advantages of having a change in differential pressure meter in a leak test system over the standard differential pressure meter, and have further shown how this is much better than the present day system.

It cannot be stressed too strongly that these advantages come from abandoning the direct reading pressure transducer, which must be changed frequently, and which must have its output divided into many, many, parts to get any type of meaningful sensitivity, and by instead going to the use of a differential pressure transducer which has a much smaller range, say plus or minus one inch of water, and when divided by a much smaller number, say 1,000, still gets a much better sensitivity. Using our examples, assuming a 0.1% sensitivity, the present state of the art device uses a 20 p.s.i. direct reading transducer and divides this reading by 20,000 to get a sensitivity of 0.02 inches of water, while with our differential pressure transducer regardless of the test pressure and with our A/D converter of the 10-bit type, 0.002 inches of water sensitivity. It should also be recognized that an analog signal divided into 1,000 parts of 10 millivolts each is much less prone to noise, and thus an advantage over the present state of the art device, where the analog signal must be divided into 20,000 parts of 0.25 millivolts each to obtain the best sensitivity.

There is less need to change transducers and a much greater sensitivity by abandoning the prior art devices and using an electronic dynamic balance leak test system. Also, it is to be noted that our system has a dynamic zero, or floating zero, which we term a "live zero", which attains an initial differential pressure reading at an actual value of differential pressure, and never assumes that the test starts under ideal conditions at the 0 position on the differential pressure meter, thus providing for even greater sensitivity.

It has also been found that by utilizing a different method of operation of the equipment just disclosed, an even faster test than that previously described is attainable by utilizing the equipment to project test results and, thus, arrive at an earlier indication of an acceptable or unacceptable part than is otherwise possible.

Figure 25:
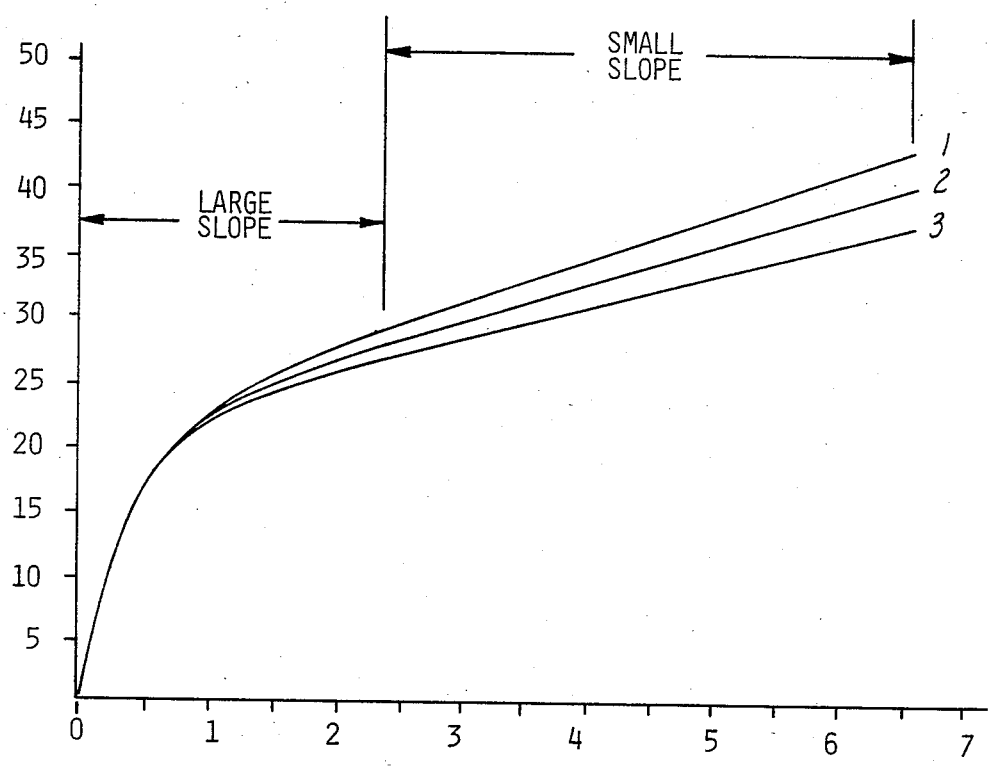
FIG. 25 is an illustration of a graph showing results of three actual leak tests using the system of the present invention.

Referring to FIG. 25, there are shown three curves representing actual X-Y plots from a differential pressure transducer 29 as used in the present invention. The curves consists of basically two parts labeled "large slope" and "small slope". The slope, of course, being represented by the change in the value of the Y coordinate divided by the change in the value of the X coordinate, and the part labeled "large slope" being so called because the number representing the slope is relatively large, while the portion labeled "small slope", as will be explained later, has a value of slope equal to a relatively small number.

It is believed by the inventors that the initial large slope in the curve, represented by the portion of the curve immediately following the closing of balance valve, occurs because of an imperfect choice of balance delay time, the effect of adiabatic heat, and physical changes in volume caused by the closing of the balance valve. The portion of the curve with the small slope represents the system after it has settled down and only the actual leak of the part being tested is being taken into account. However, exactly how to use these properties escaped the inventors for a considerable length of time until it was noticed that the plots of the leak rate from the differential pressure transducer 29 closely resembled a series of mathematical curves of a certain family represented in FIG. 26 and, in fact, the curves labeled 1, 2 and 3 in FIG. 25 very closely resemble the curves labeled C, D and E in FIG. 26, and the mathematical equations which they represent are, of course, illustrated immediately adjacent the last point on the curve.

Figure 26:
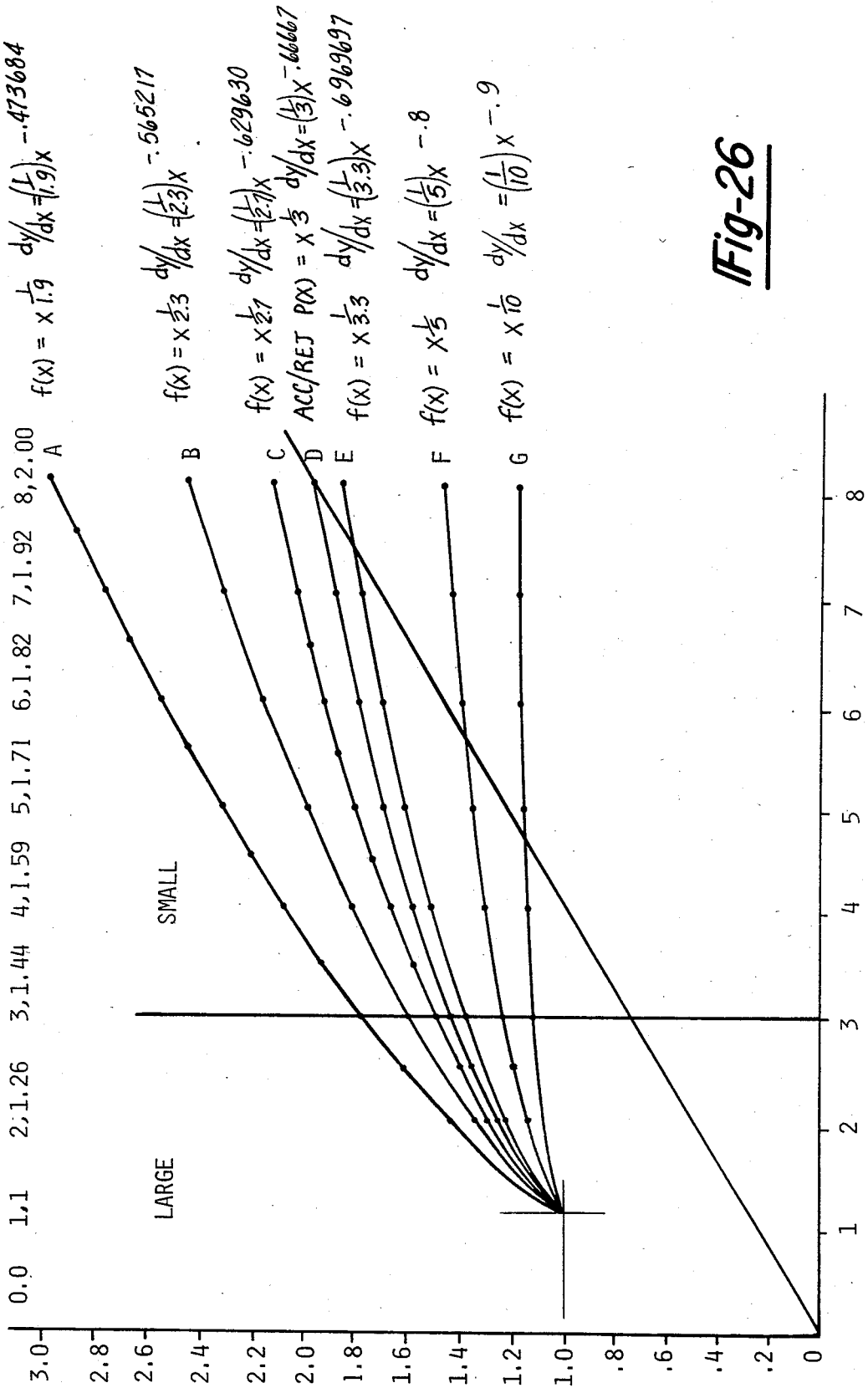
FIG. 26 is an illustration of a graph showing a series of curves generated from mathematical equations which closely resemble the curves shown in FIG. 25.
Figure 27:
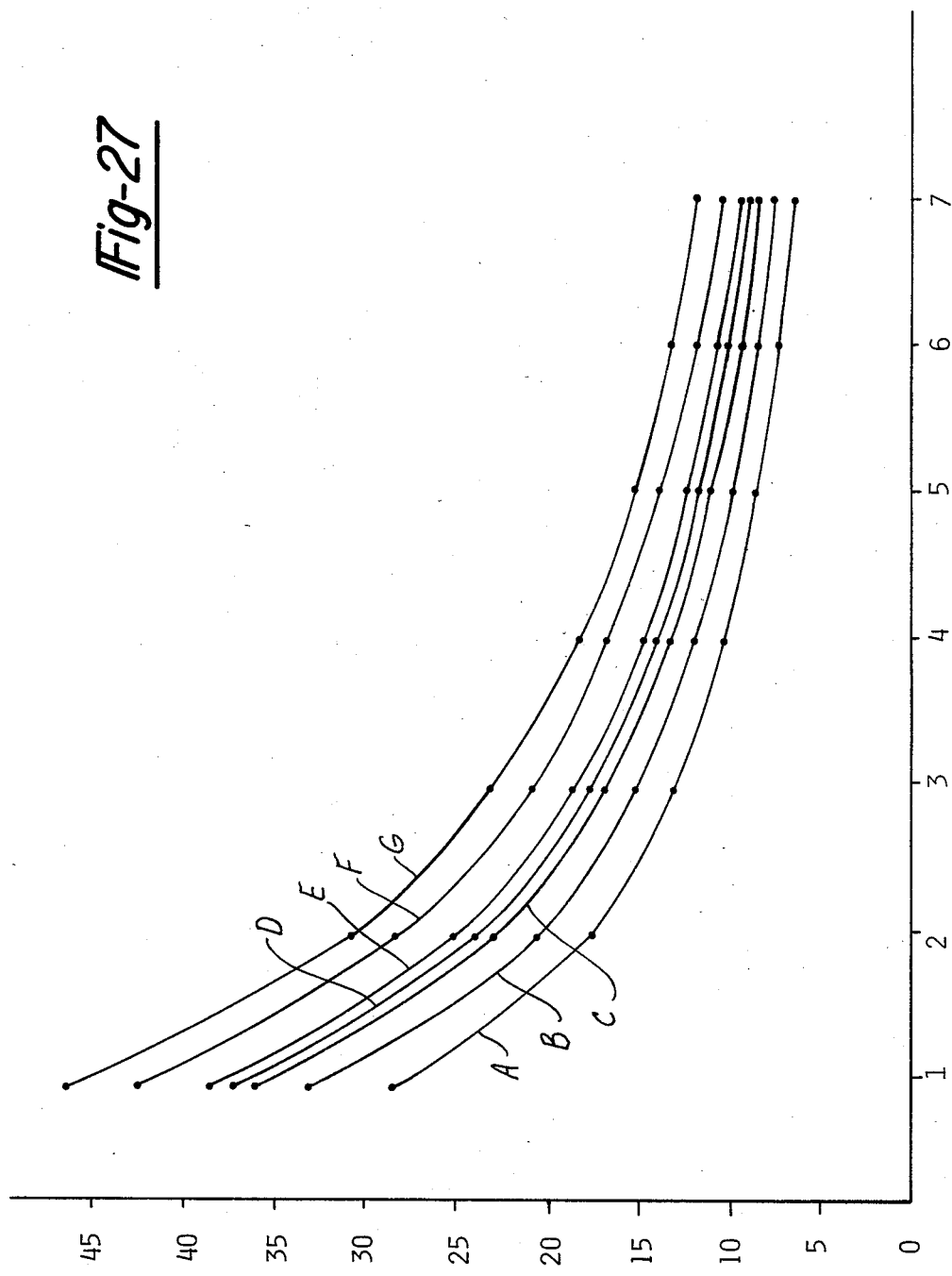
FIG. 27 is a graph showing the slopes of the corresponding lettered mathematical equations of FIG. 26.

Further experimentation led to the chart in FIG. 27 being prepared, which represents a comparison of slope change percentages of the curves in FIG. 26. It can be seen that eventually the slope change curves tend to converge at a constant rate of slope, and the slope change curves for the curves C, D and E, representing the mathematical functions closest to the curves 1, 2 and 3 of FIG. 25, very nearly converge to a single point at a constant slope.

This led the inventors to believe that if the slope of the leak rate curve produced by the values obtained from the differential pressure transducer 29 could be constantly checked until a point on the curve was reached approximately equal to the slope of the mathematical equations, and then the axis of FIG. 25 could be moved up to that point, and a test then begun on the actual leak rate, an early accept or reject could be predicted on the basis of only a few values, taking much less time than the test time previously described for the system without the early accept feature. Mathematically, the slope curves of FIG. 27 converge such that the slope of any further point on the curves of FIG. 27 is a less than 10% change from the slope of a previous point on a curve and this feature was utilized by us to produce the system to now be described with an early accept-early reject feature.

Figure 28:
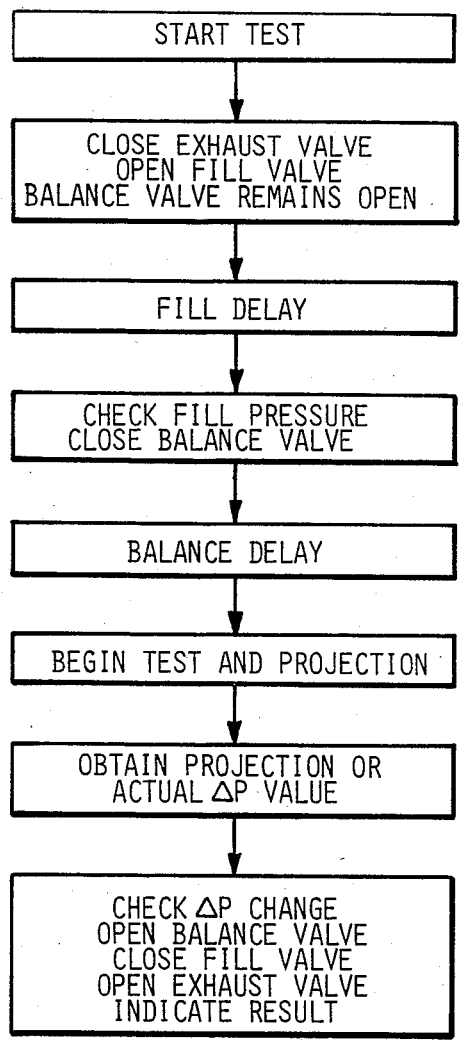
FIG. 28 is a flow chart similar in part to FIG. 3, but with the sequence of principle operations used by a modification of our electronic dynamic balance leak testing system, which is adapted to perform an improved method of leak testing using "dynamic projection" to obtain indications of "early accept" and/or "early reject".

Referring to FIG. 28, there is shown a flow chart similar in large part to that shown in FIG. 3 for our basic leak test system without the "dynamic projection" feature, but showing, in addition thereof, the additional principle operations utilized by the modification of our electronic dynamic balance leak testing system having the early accept and reject features. In this case, all the steps utilized in the previously described system shown in FIG. 3 remains the same until one passes the balance delay block. The balance delay again producing a curve similar to the one labeled "large slope" in FIG. 25.

Figure 28A:
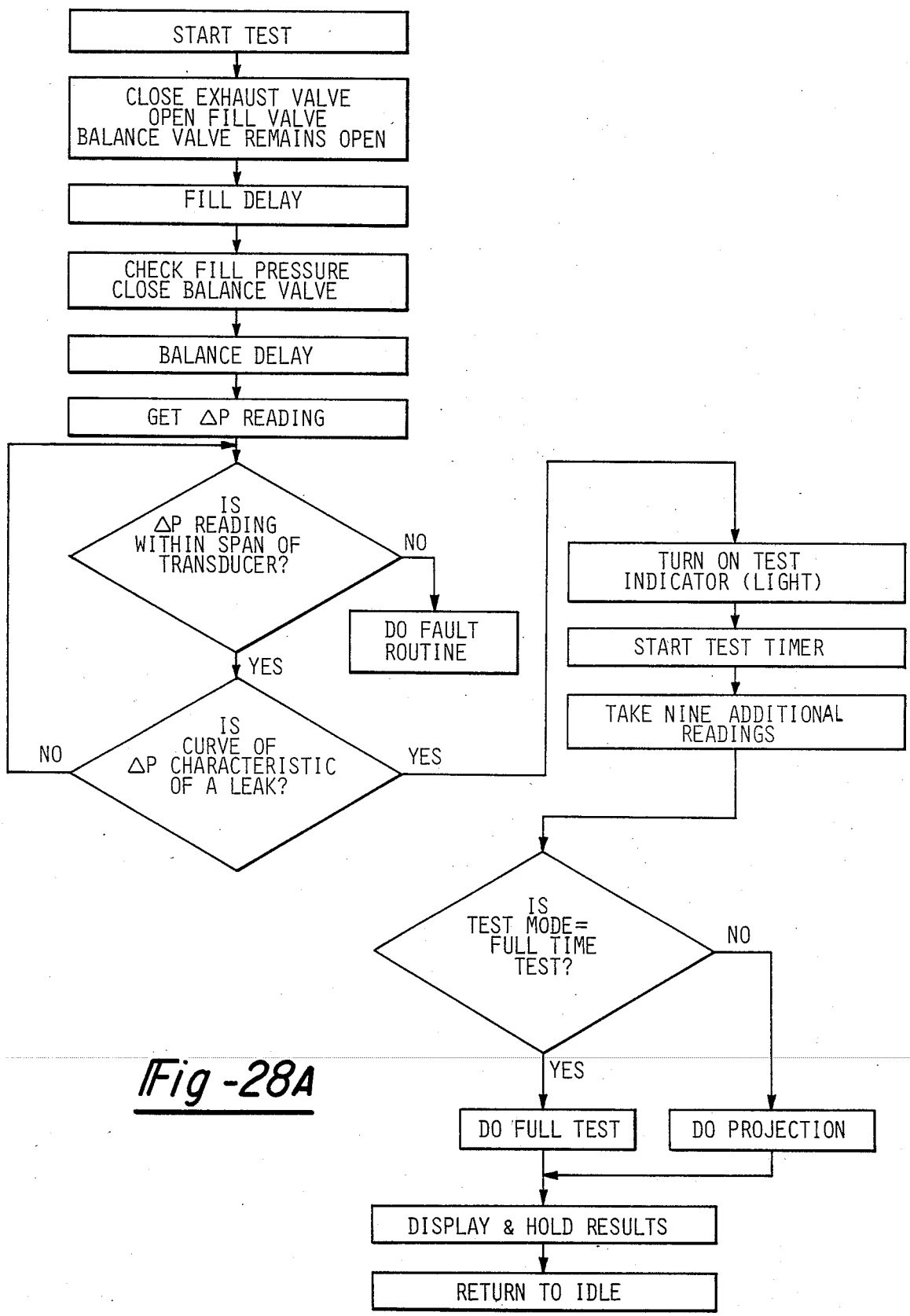
FIG. 28A is a flow chart similar to that shown in FIG. 4, but showing the additional principle steps performed by the microcomputer utilized in our new system to perform the principle operations shown in the chart in FIG. 28.

Similarly, FIG. 28A is like FIG. 4 in large part, but showing the additional operations necessary for our system to perform a "dynamic projection" type of leak test.

Figure 28B:
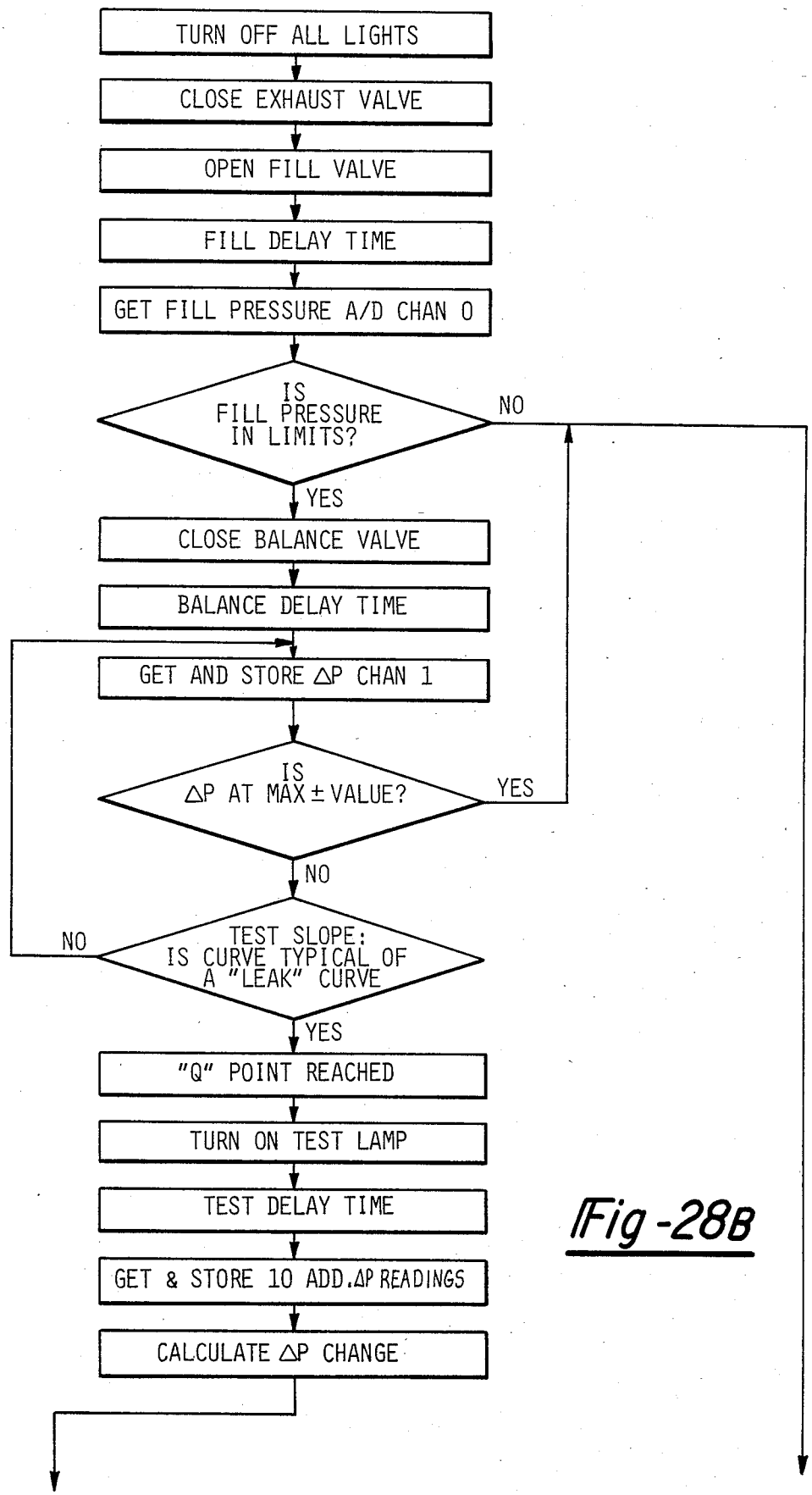
FIG. 28B is a flow chart showing in part a more detailed sequence of principle steps performed by the system illliustrated in the flow chart of FIG. 28A.
Figure 28C:
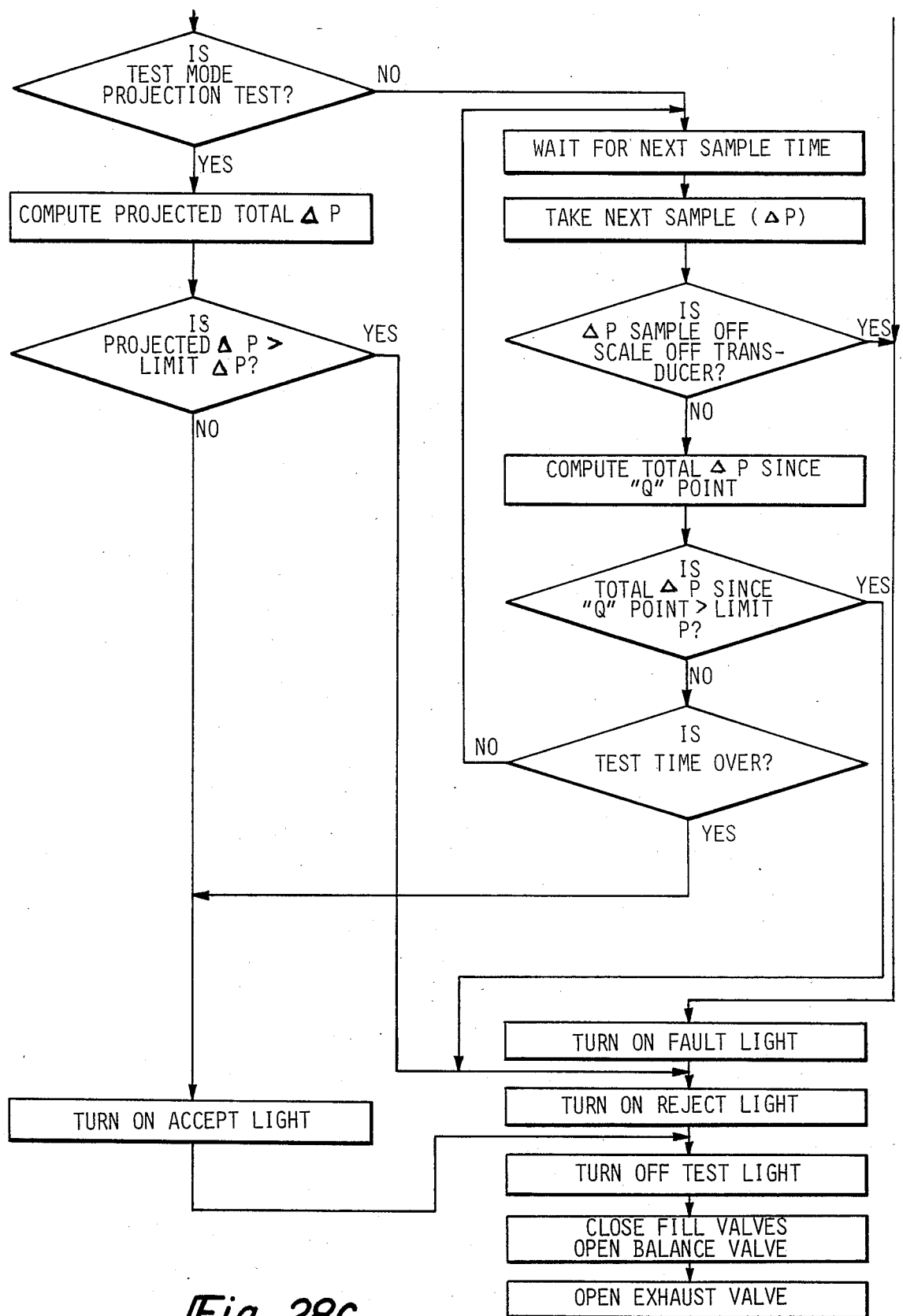
FIG. 28C is a flow chart showing additional steps performed by the leak test system shown in FIG. 28. The operations of FIG. 28C immediately following the steps shown in FIG. 28B.

Also, FIGS. 28B and 28C are in large part similar to FIGS. 5 and 6, but again showing the additional operations needed for the projection type of test.

Slightly different settings of the thumbwheel switches than those previously described are needed to enable our system to obtain a projected leak rate utilizing the movement of the axis as described in FIG. 25 to produce a dynamic projection. As before, the digit in the thousand's column of the thumbwheel switch 65 is used to select the input destination and in our system as it is used to obtain a projected leak rate is coded as follows:

0 = Mode (000 = full test, 001 = projection test).
1 = Equals fill time in 0.1 second increments with a maximum value of 99.9.
2 = Equals balance time in 0.1 second increments with a maximum value of 99.9.
3 = Equals test time in 0.1 second increments with a maximum value of 99.9.
4 = Equals low pressure fill limit (p.s.i.) in 0.1% full scale.
5 = Equals high pressure fill limit (p.s.i.) in 0.1% full scale.
6 = Equals change in differential pressure limit in 0.1% of full scale.
7 = Equals test time to be projected (in integers only e.g. 7 seconds = 070).

After the operator makes these changes, and it is ascertained that the fill pressure transducer signal was scaled to have a full scale value of +5 volts, and the differential pressure transducer was scaled to have a full scale output of plus or minus 5 volts, the system would be ready for operation by the new method described below. This method basically starts off utilizing the same steps as shown in FIG. 5 and would involve initially turning off all the lights.

Figure 29:
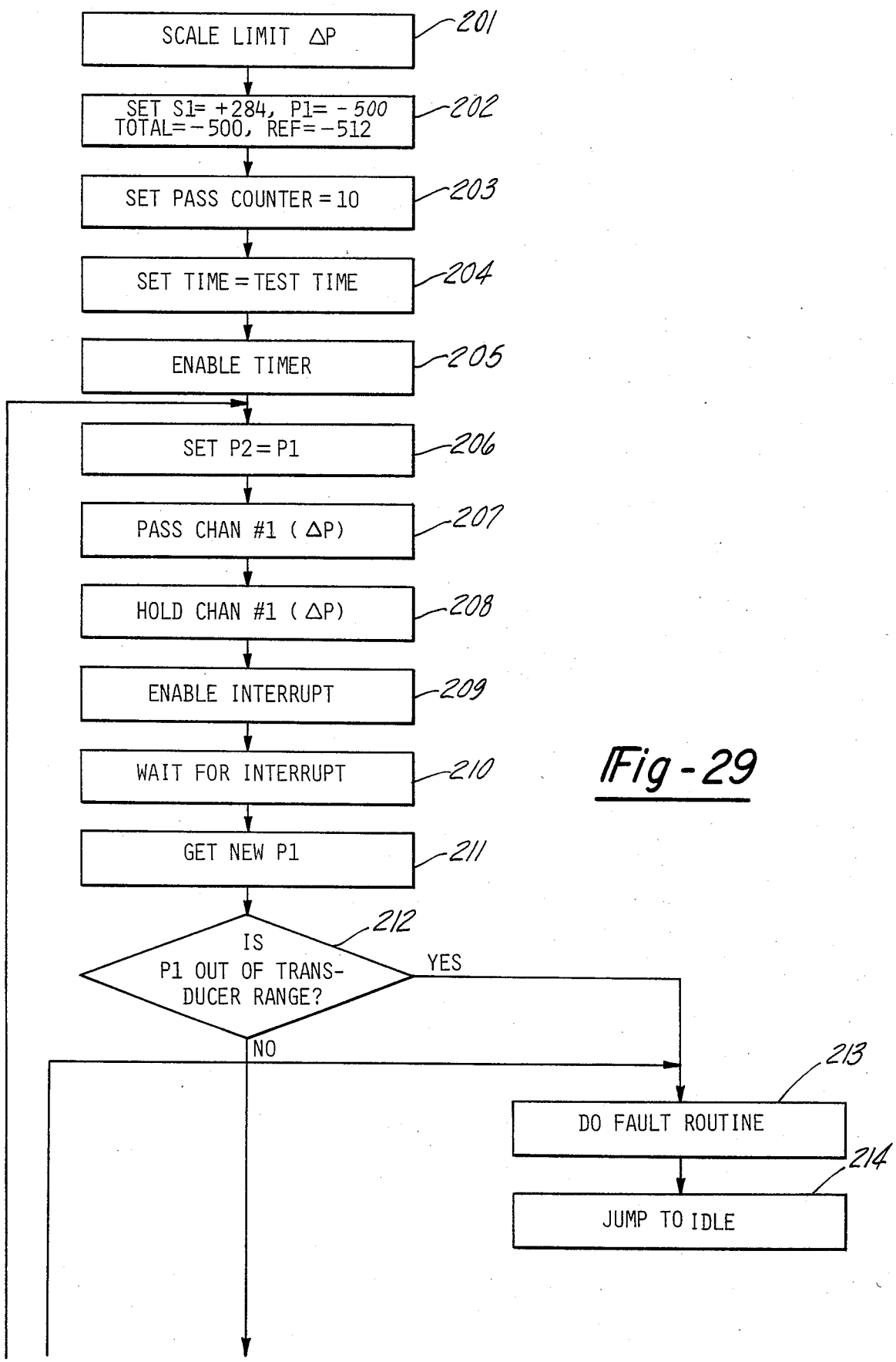
FIG. 29 is a flow chart showing in part the sequence of principle steps performed by the system illustrated in the flow chart of FIG. 28.
Figure 30:
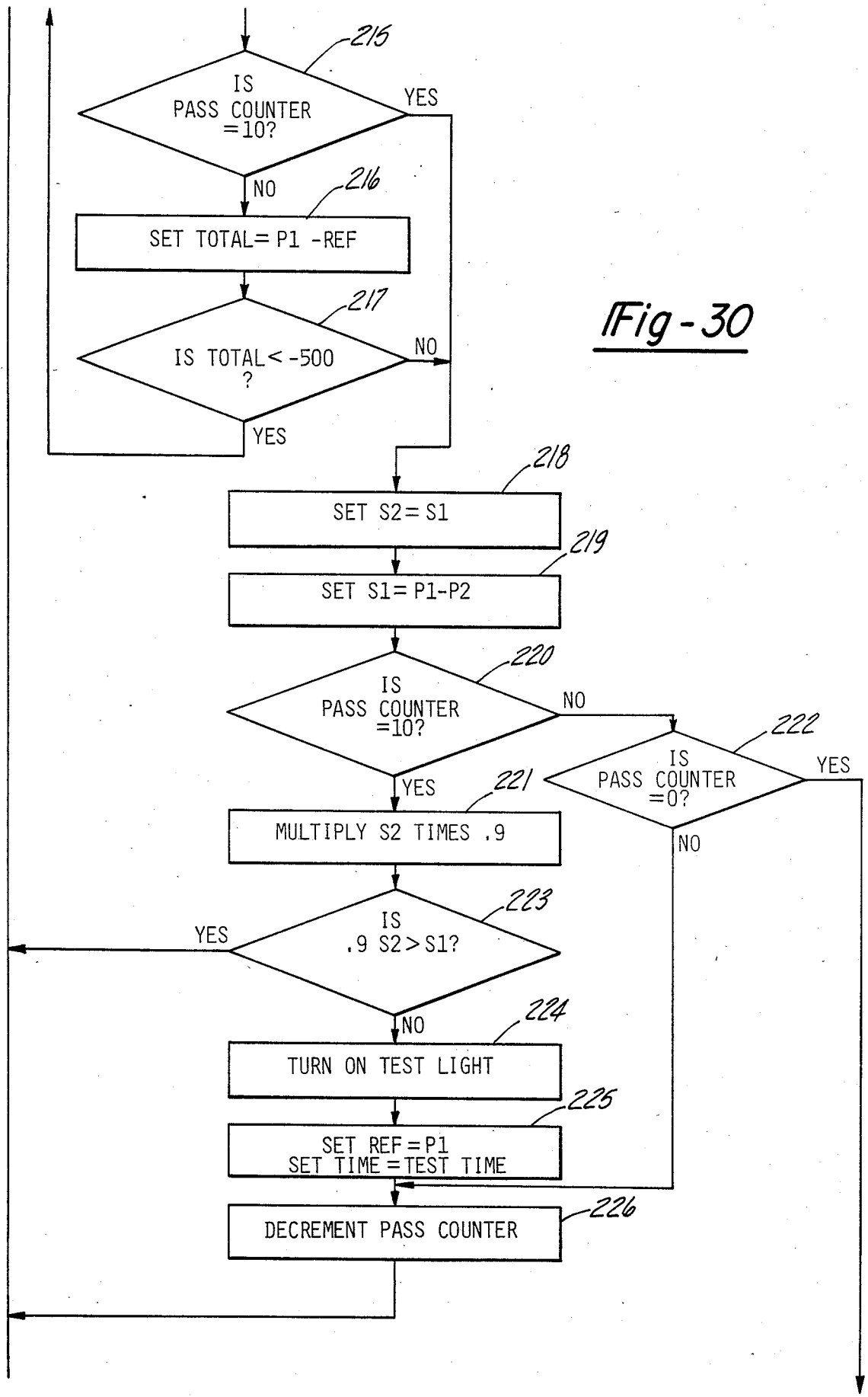
FIG. 30 is a flow chart showing additional steps performed by the leak test system shown in FIG. 28, the operations of FIG. 30 taking place immediately after the steps in FIG. 29.

The next step would be to close the exhaust valve, open the fill valve and wait for the fill delay time and balance delay time as previously described. As indicated by the chart in FIG. 29, after the balance delay time, the system will (block 201) scale the entered limit differential pressure to a working differential pressure and (202) initialize the values of $S_1$ at $+1111$, $P_1$ at $-500$, "Total" at $-500$, and "reference" at $-512$.

The next step (203) would be to set the pass counter at 10 for the purposes to be described below, followed by the step (204) of setting the variable time (TIME) equal to the test time, which the operator previously entered on the thumbwheel switch.

At the next block (205), the timer is enabled. Assuming we are on the first pass through, the next block (206) of the routine used will then set the value of $P_2$, (representing a previous pressure) equal to $P_1$. In this case, of course, since $P_1$ was set equal to $-500$, at this point we would have $P_2$ and $P_1$ both equal to $-500$. Block (207) passes the signal on channel one through the sample hold to the analog to digital converter. Block (208) holds the signal present at the output of the sample hold in a steady state to permit accurate conversion.

Figure 32:
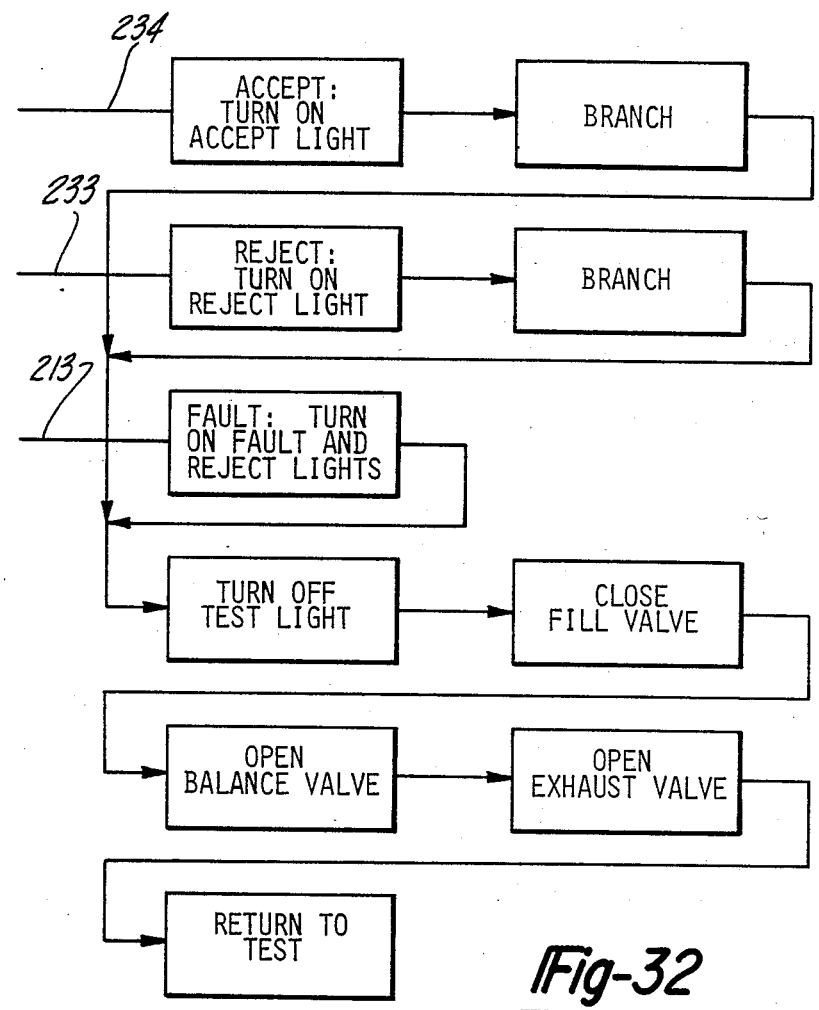
FIG. 32 is a flow chart showing an accept, fault and reject subroutine which may be entered by the system depicted in FIGS. 29, 30 and 31 as indicated by the arrows in FIG. 32.

Block (209) enables the interrupt from the 0.1 second interval timer. Step (210) waits for the next interrupt from the timer. Note that an interrupt service routine converts whatever analog signal is being held by the sample-hold circuit to a digital value and stores this conversion at $P_1$. The interrupt routine also examines the count remaining in TIME, and if this is more than zero, decrements it. Thus, step (211) is accomplished by the interrupt service routine. For use in ease of understanding, a representative curve is presented in FIG. 34 which shows a representative X-Y plot as it may be obtained from the differential pressure transducer 29. As can be seen, the first value of $P_1$, which is represented by the Y plot from the differential pressure transducer, has a value of 65. Step (212) asks the question if the reading of 65 is out of the transducer range. Remembering our scaling, in which we scaled the maximum output of the delta p transducer to represent 5 volts, this can be further said to represent 500 counts of the A/D converter, such that one count of the A/D converter equals 0.01 volts. Since our first value obtained for the differential pressure is 65, which represents 65 counts of the A/D converter, the question one is really asking is "Is 65 greater than $+500$ or less than $-500$?" If everything is operating normally, the answer would be "No" since one would not expect, having the proper test conditions, to overrange the differential pressure transducer 29. If the first reading represented such a great pressure change that the transducer was off scale, one would assume that there was some error in selecting balance time, or fill time, etc., and one would then proceed from the "Yes" branch of the decision block to the fault subroutine, (FIG. 32) to be described later.

However, assuming everything is operating normally, the system will answer the question posed by the decision block (212) with a "No" answer, and then will proceed to the next block (215), which asks "Is the pass counter equal to 10?" If the answer is "Yes", control is transferred to block 218. Block (218) sets $S_2 = S_1$, so $S_2$ now equals 1111.

Now remembering that what we are actually trying to do is to calculate the slope of the X-Y plot of the differential pressure transducer 29 at this point, we must now calculate the slope of the portion of the curve which we have most recently obtained. Remember that slope is equal to the change in the Y coordinate (change in pressure) divided by the change in the X coordinate (change in TIME). For our first example, the change in pressure would be $P_2-P_1=65-(-500)=565$ and change in TIME would be 0.1 second so slope=565/0.1=5650. However, for ease in calculating slope, since we are always dividing by the same 0.1 second of TIME, we just divide by 1 instead of 0.1, and we call slope equal to $P_2-P_1=565$, so $S_1$ equals 565, and $S_2$ equal 1111.

The question is then asked by block (220) if the pass counter is equal to 10, which it is since it was initialized to this value earlier, so the "Yes" branch of the decision block is entered, and the next block (221) calculates the value of $0.9\times S_2$ ($0.9\times 1111=999.9$). In block (222) we want to find is if we are in the portion of the curve such that the value of the slope of a succeeding portion of the curve is less than 10% changed from the value of the immediately preceding portion of the curve. In this instance we see we are on a portion of a curve having a very high slope (565), and $0.9\times S_2$ equals 999.9. This tells us that we have not arrived at the proper portion of the curve to begin the leak test and the system, therefore, follows the "Yes" branch of the decision block to the point immediately preceding the operation of setting $P_2$ equal to $P_1$, block (206).

Since we want to obtain the value of the slope of the next portion of the curve, which will in our example occur at a one-tenth (0.1) second increment, we now set $P_2$, representing a previous value of the differential pressure, to the value of $P_1$ just found, so in this case the microcomputer acts to set $P_2$ equal to 65 and find a new value of $P_1$. The channel one input is then read to obtain a value, at one-tenth (0.1) second later, of 110 counts on the A/D converter, and the microcomputer again checks in block (212) to see if the transducer is out of range. Since it is not, the "No" branch of the decision block is entered and the microcomputer then sets $S_2$ equal to $S_1$ and sets a new $S_1$ equal to $P_2-P_1$ or $110-65=45$ in block (219).

As before, the question is then asked "Is the pass counter equal to 10?" in block (220) which it still will be, and then the program multiplies 0.9 by $S_2$ (565), which is equal to 508.5, and asks if that is greater than 45, and the answer is obviously "Yes" and then the programs loops back again to the portion of the subroutine immediately previous to the operation where $P_2$ representing the previous differential pressure value is set equal to $P_1$ block (206) representing the current differential pressure value.

Figures 33, 34:
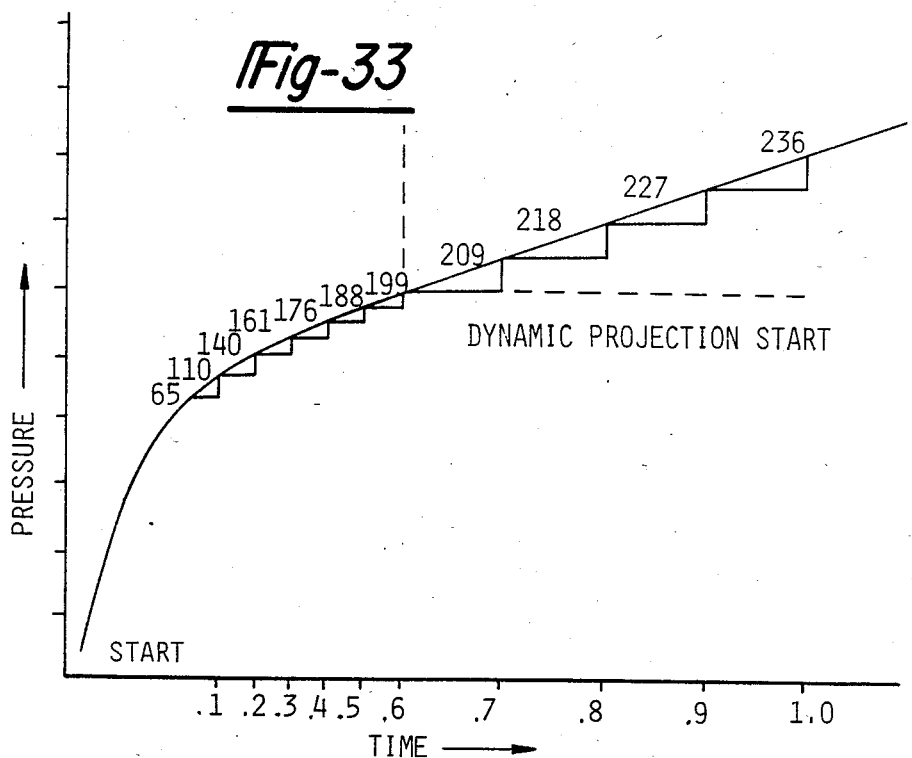
FIG. 33 illustrates a graph showing the start of the dynamic projection portion of the leak test performed by the present invention.
FIG. 34 is a chart illustrating the benefits of scaling inputs in our improved leak test system.

It can be seen utilizing the chart set forth below and the curve of FIG. 34 that it is not until the seventh computation is made that $0.9S_2$ will not be greater than $S_1$. In fact, utilizing these values for the seventh attempt it can be seen that $P_2$ is equal to 188, $P_1$ is equal to 199, $S_2$ is equal to 12, and $S_1$ is equal to 11, and $0.9S_2$ will equal 10.8 which is not greater than 11. It is at this time that we now move the coordinates to the point represented by "dynamic projection" the word "Start" on the graph wherein $P_1$ equals 199 which is now our "Q" point, or qualifying point of the curve, and the point from which the change in differential pressure meter 70 will now read. It should be understood that for a constant slope or zero slope, the "Q" point will be found in two readings. If instead the "Q" point is not rapidly found, the transducer must shortly go out of range and we will go to the fault routine.

Having found the "Q" point, we now turn on the test light and set a value of a new variable "reference" or "Ref." equal to $P_1$, and in this case "reference" would equal 199, which is the same as performing a new initialization step similar to that which was performed when $P_1$ was initialized.

We then decrement the pass counter by one, setting it equal to 9, and then we loop back and set $P_2$ equal to $P_1$ so $P_2$ equals 199. Then the microcomputer reads the next value on the differential pressure transducer, which equals 209, which is 209 counts of the A/D converter. Again, this will be in range so we set the new $P_1$ equal to 209.

The microcomputer then asks the question "Is $P_1$ out of the transducer range?", which it is not. We then ask "Is the pass counter equal to 10?" In this case it is not, so we do not go through the blocks which we have previously gone through, which is logical because we are now on a new portion of the curve.

We then set Total equal to ($P_1$−Ref) in block (216). We then test in block (217) "Is Total less than −500?", which it is not. Using the "No" exit, a branch is made to block (218) which sets $S_2$ equal to $S_1$, followed by block (219) which sets $S_1$ equal to ($P_1-P_2$).

The next block, block (220), asks "Is the pass counter= 10?" Since the pass counter was 10, but has been decremented by block (226), it is now 9. So a branch is made to block (222) which asks "Is the pass counter=0?" In this case the pass counter is equal to 9, so the program follows the "No" branch of the decision block, traveling to the block which we previously passed through, block (226), which again decrements the pass counter. Therefore, the pass counter is now at 8, and a loop is made back to block (206) and, as can be seen, $P_2$ is set equal to $P_1$, or 209.

By means of blocks (206) through (211) we will then read the next value of the channel one input, which in our example will have the value of 218. This value will be within the transducer range so, using the "No" exit, we leave block (212) and go to block (215), which asks "Is the pass counter=10?" Since the pass counter is equal to 8, the "No" exit branches to block (216) which sets Total equal to ($P_1$−Ref). This is followed by block (217) which checks "Is Total less than −500?" Since "Total" is ($P_1$−Ref), "Total" equals (218−199) or 19, which is more than −500. Block (218) sets $S_2$=to $S_1$, block (219) sets $S_1$ equal to ($P_1-P_2$) and we then enter the decision block (220) which asks the question "Is the pass counter equal to 10?" We know, of course, it is not, as it is equal to 8, so that we enter the next decision block which asks the question "Is the pass counter greater than 0?" Of course, 8 is not equal to 0, so we will branch to block (226) which again decrements the pass counter to 7, and branches back to block (206).

It can be seen that this operation will continue for 10 samples, for a Total of 1 second, at which time the looping will stop because the decision block (222) which will ask "Is the pass counter equal to 0?" will answer that question "Yes". Branching to block (227), "Total" will be set equal to ($P_1$−Ref). Then in block (228) the question is asked "Is the test a full-time test?" If the parameter entry for mode control was entered as 0001, a projection test has been selected. In this case the answer for block (228) is "No". So block (230) is entered which sets "Total"="Total" times TIMEP, or the total projection value is equal to the total change of differential pressure from the moment the curve of the slope of the differential pressure transducer is "qualified" (at the reference point) until one second later, times the number of seconds that the projected test is programmed to project for. This Total is now tested in block (232). If the projected Total is greater than the entered limit of change of differential pressure, a branch is made to block (233) which is the reject block. Otherwise, a determination is made that the part is within acceptable limits and a branch is made to block (234), the accept routine.

Returning to block (228), if the entry of the mode parameter was 0000, a full-time test mode is indicated. So a branch would be made to block (229), which asks "Is the Total ($P_1$ − Ref) greater than the limit for the change of differential pressure?" If it is, a reject is indicated and a branch is made to block (233). If the answer for block (229) is "No", block (232) asks "Is TIME equal to 0 (is the test over)?" If the answer is "No", the test continues until $P_1$ goes out-of-range and causes a fault in block (213), or if the Total becomes less than −500 as a result of a test in block (213), which would also cause a fault to terminate in block (213), or until the Total is greater than the limit of change of differential pressure in block (229), which causes a branch to the reject routine, or until the test time is equal to zero in block (232), which causes an accept routine in block (234).

By running the full test time after the projected test, and finding that the projected leak rate as a percentage of full scale is nearly the same as if the test were run for the full test time, we can validate the projection mode of our system.

Figure 31:
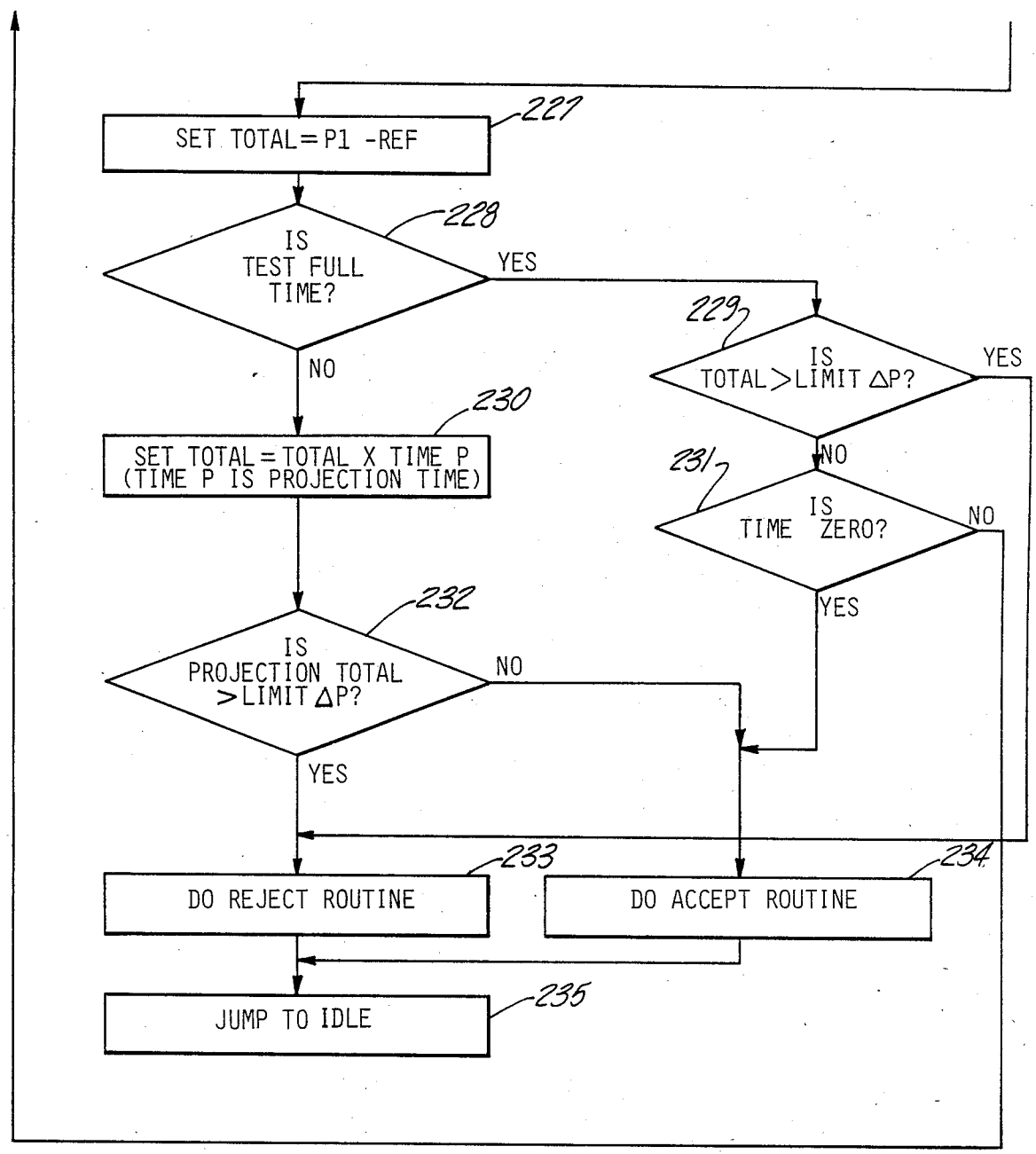
FIG. 31 is a flow chart showing the balance of the principle steps performed by the leak test system shown by the flow chart in FIG. 28, the operation of FIG. 31 taking place immediately after the operation shown in FIG. 30.

To complete the description of our preferred embodiment, it is necessary to describe the accept, reject and fault subroutines previously mentioned and, in fact, these all take place in one subroutine shown in FIG. 31A. If we are in any of the branches of the decision block that require entry into the accept subroutine, the program enters the subroutine shown in FIG. 31A at the block labeled "accept: turn on accept light", which results in the subroutine turning on the accept light and immediately branching out to turn off the test light, close the fill valve, open the balance valve, wait a delay time, open the exhaust valve, and return to the beginning of the test as shown in FIG. 28.

If we are at any of the branches of any of the decision blocks which require the part be rejected, the program enters the subroutine shown in FIG. 31A at the box labeled "reject: turn on reject light" which represents the subroutine turning on the reject light and immediately again branching out to turn off the test light, close the fill valve, open the balance valve, wait a delay time, open the exhaust valve, and return to beginning of test.

If we are at any of the branches of the decision block which require entry of the fault subroutine, we then enter the subroutine shown in FIG. 31A at the box labeled "fault: turn on fault and reject lights", which results in the subroutine turning on the fault and reject lights, and then proceeding to the operations of turning off the test light, followed by the operation of closing the fill valve, opening the balance valve, opening the exhaust valve and returning to the beginning of the test.

Now that we have seen how the accept, reject and fault subroutines work, how to use the indications of accept, reject and fault in combination with the differential pressure meter (53) and change in differential pressure meter (70) in our advanced dynamic projection leak test system to determine possible reasons why a part is leaking may be understood.

Referring now to FIGS. 35A–K, there is illustrated a series of possible readings of the differential pressure and change in differential pressure meters which may be encountered in actual practice.

Figure 35:
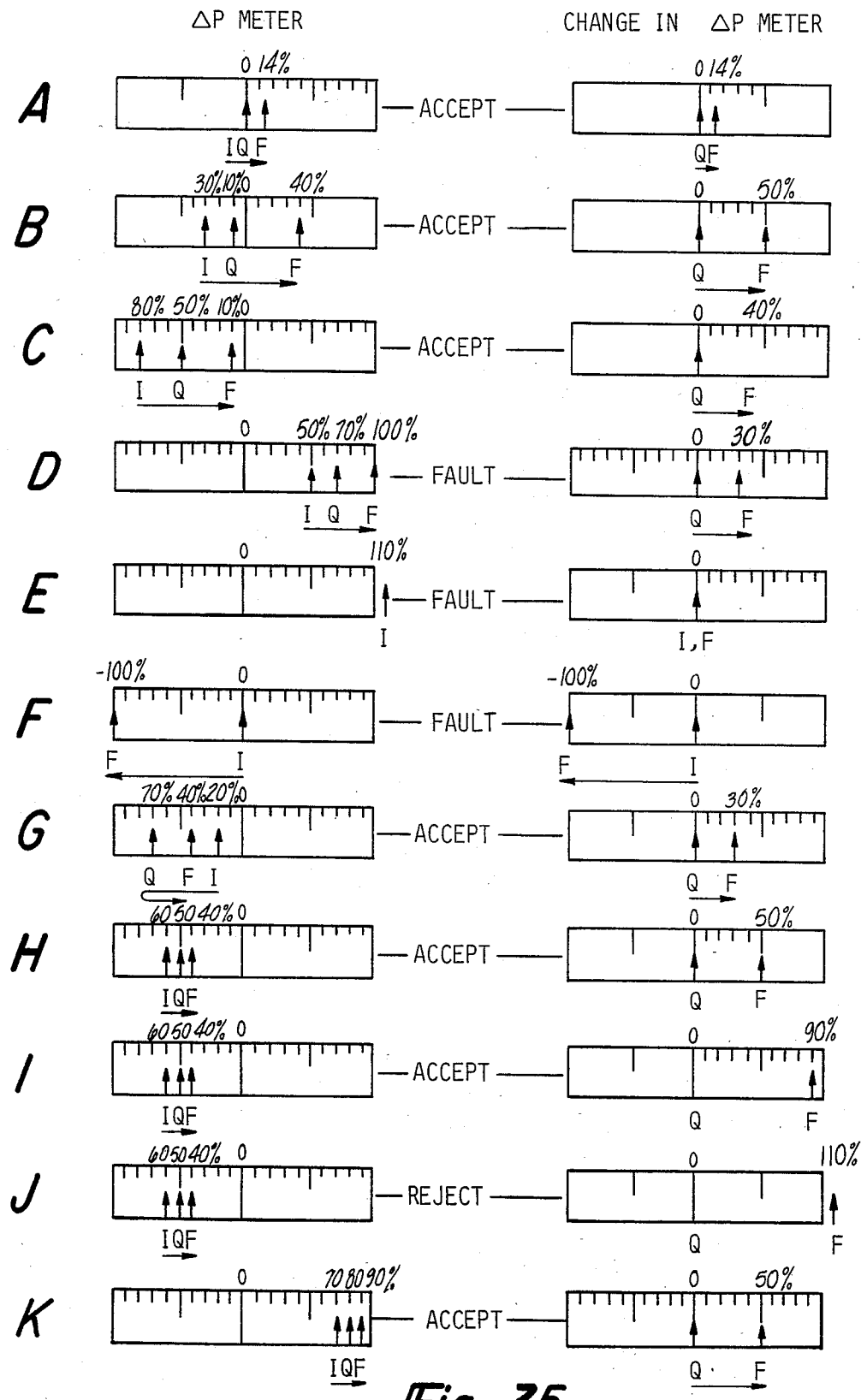
FIGS. 35A-K depict a series of various readings on the differential pressure and change in differential pressure meter used in the present system which may occur in our improved leak test system when it is built having the modification allowing it to operate in the dynamic projection mode and predict an "early accept" or "early reject". The meters used show conditions which may indicate an accept part, a fault in the test, or a rejection part.

FIG. 35A shows the results of a test wherein a sufficiently long fill time was used to compensate for any thermal effects, and a minimal balance time was used because wave effects were not expected in the test part. This results in the initial (I) and qualification (Q) points on the meters 53 and 70 being identical and at zero. Because the change in differential pressure meter shows a result of 14% full scale, the part would be acceptable if our previous 15% limit were used. In fact, the meters illustrated an acceptable part for any limit above 14%.

FIG. 35B shows a meter condition which can exist when a hotter than normal part is tested with a fill time which is not large enough to compensate for such occasional occurrence. This is shown by the negative migration of the initial (I) and qualifying (Q) points on the meter. In this case, the test could still be performed because the migration was insufficient to cause a reject condition to exist because of a negative off scale reading and the change in differential pressure meter 73 shows an accept condition for any limits greater than 50%.

Referring now to FIG. 35C, we see that an entire leak test could be run on the negative side of the differential pressure meter 53. The condition shown is somewhat like that illustrated in FIG. 36B in that thermal effects have caused a negative migration of I and Q, and the leak present is not great enough to cause the meter to go positive. Again, the reading on the change in differential pressure meter 73 shows an acceptable part for any limits greater than 40%.

FIG. 35D shows a fault condition caused by a positive off scale reading which occurred before the test time was up and before the differential pressure limit was reached. As discussed previously, this could be caused by an excessively cold part or a gross leak since these are difficult to differentiate, the part is faulted and made available for further testing.

Also, since such a large positive drift occurred, such a meter display might serve as an indication that the balance time should be reduced, a larger fill time be used, or a larger transducer range is needed.

FIG. 35E shows a fault caused by an immediate positive migration of such magnitude that the curve never qualifies. This usually indicates a gross leak, but could also indicate that the balance or fill time be changed or a larger transducer range be used.

FIG. 35F shows a negative off scale reading which is of such magnitude that it occurred before the curve qualified. This usually indicates an excessively warm part, but could also be caused by a loss of source pressure on inadequate balance or fill times. To allow the system operator to determine the problem, the part is faulted.

FIG. 35G shows what can happen when thermal effects cause a small negative migration and a leak exists at the same time. Since negative migration can be caused by an excessively warm part which cause a build up in pressure, the leak is masked until such time as the leak rate exceeds the rate of pressure build up. At this point, the curve qualifies and a test can begin with a final value occurring between the qualifying and initial value.

At this time, the value of having the change in differential pressure meter start reading from the qualification point rather than the initial point becomes evident. If it did not, you would have a reading of −20% of full scale, which would be an erroneous indication of what actually happened, rather than a +30% full scale, and you would at least fault the part or have to extend the balance or test time, rather than accept a good part.

Now referring to FIG. 35H, assuming a warm part with an incomplete fill time or a balance time which contributed additional negative offset due to thermal characteristics, it is still possible to test parts which our system because a final reading can still be taken in the projection mode. In this case, the 10% change in AP indicated for one second would be multiplied by the test time to be projected (for example 5 seconds) to get a projected 50% leak rate. Presuming limits above 50%, the part would be accepted.

FIGS. 35I-J show what effect the test time can have on the result of our projections. If the test time to be projected were extended to 9 seconds (35G), the part would be acceptable only if the differential pressure meter limits were greater than 90%.

If the test time to be projected were extended further to 11 seconds, the part would be rejected because the projected leak would exceed 100% and the change in differential pressure meter 70 would go off scale, Thus, the test time is an important parameter which must be chosen carefully by the manufacturer of the part to be tested.

Now regarding FIG. 35K, if in the projection mode a part is filled, and a balance time occurs after fill which permits the effects of any leak to develop an initial reading which is offset from zero, a display such as 35K might result. The initial reading taken immediately after the balance period might occur at a change in pressure equal to 70% of full scale.

The curve of the slope of the leak might be such that the curve is qualified at a point equal to 80% of full scale (the "Q" point). After ten more readings, the final reading might occur at 90% of full scale. Now a projection of the leak rate is made by the system. This is done by taking the total (the difference between the final reading and the "Q" point) and multiplying it times the number of integer seconds entered as parameter number seven.

The product is then compared to the limit of differential pressure that has been entered as parameter number six. If in this example the limit of differential pressure was greater than 50% of full scale, the part under test would be determined as a good part and the accept indicator would show this. If the value of parameter number six was 50% or less, then the part under test would be determined as bad, or a reject, and the reject indicator would show this. Note that the time of projection begins with the "Q" point is reached and can be any integer up to 99 seconds.

The process of projection should take just slightly longer than the time (one second) required to take the necessary ten samples after the "Q" point, and much less time than would be needed if a full test were run. Note also that in this example that if the part under test leaked at a rate such that it caused the display to go from the "Q" point at 80% of full scale to the final reading at 90% of full scale in one second, the transducer output would exceed the full scale displacement (100%) if the total test time exceeded two seconds. This would automatically cause a fault determination and the fault indicator would show this.

However, by using projection, a determination of accept or reject can be made without regard for the actual limitations caused by the transducer full scale limits, the initial offset due to balance delays, or incomplete fill, or bleed back times, provided the "Q" point is reached prior to one second before the transducer output exceeds its full scale range. This method thereby provides, by projection of data received, an estimated performance of a part which, when compared to a limit, permits a determination to be made that the part is a good or bad part prior to the time otherwise required to prove that the part is a good or bad part. Thus, the system is capable of making "early accept" or "early reject" determination.

It should be understood that we have attempted to give sufficient examples to teach the use of our improved leak test system, but that because of the vast number of test parts and test conditions which may be encountered, it is impossible to give every example which may occur. One skilled in the art, with the examples we have given, will be able to interpret the meaning of any readings on the differential pressure meter 53 and change in differential pressure meter 70 which occur.

Thus, by abandoning conventional electronic leak testing constructions, and providing instead an electronic dynamic balance type of leak test system with the capability of dynamically projecting leak rates, there is provided a greatly improved leak testing system having greatly improved sensitivity, and thus improved accuracy, whereby the objects of the present invention, and numerous other advantages, are obtained.

THE FOLLOWING INFORMATION IS A
PRINTOUT OF THE MACHINE USABLE PROGRAM,
GIVEN IN A FORMAT OF AN ADDRESS
FOLLOWED BY ITS CONTENTS.

| ADDR. DATA | ADDR. DATA | ADDR. DATA | ADDR. DATA | ADDR. DATA |
|---|---|---|---|---|
| | | C082 B6 80 40 | | |
| | C034 86 30 | C085 B6 80 42 | C0BF 08 | C10E B6 80 04 |
| | C036 B7 80 06 | C088 39 | C0C0 B6 80 40 | C111 86 01 |
| | | | C0C3 97 2C | C113 B7 80 04 |
| | C039 B6 80 04 | | C0C5 BD C2 E4 | C116 86 00 |
| | C03C B6 80 06 | | | C118 B7 80 06 |
| | | | C0C8 DE 31 | |
| | | | C0CA 96 25 | C11B DE 02 |

| ADDR. | DATA | | ADDR. | DATA | | ADDR. | DATA | | ADDR. | DATA | | ADDR. | DATA | |
|---|---|---|---|---|---|---|---|---|---|---|---|---|---|---|
| | | | C03F | 86 | 13 | | | | C0CC | A7 | 00 | C11D | DF | 33 |
| | | | C041 | B7 | 80 81 | | | | C0CE | 08 | | | | |
| | | | | | | C089 | B6 | 80 43 | C0CF | 96 | 26 | C11F | BD | C4 52 |
| | | | C044 | 86 | 11 | C08C | 84 | 80 | C0D1 | A7 | 00 | | | |
| C000 | 8E | A0 78 | C046 | B7 | 80 83 | C08E | 81 | 80 | C0D3 | 39 | | | | |
| C003 | BF | A0 08 | C049 | 86 | E0 | | | | | | | | | |
| C006 | 0F | | C04B | B7 | 80 80 | C090 | 26 | 03 | C0D4 | B6 | 80 42 | C122 | 86 | 00 |
| C007 | BD | C0 11 | | | | | | | C0D7 | 84 | 0F | C124 | B7 | 80 80 |
| C00A | 0F | | | | | C092 | BD | C0 96 | C0D9 | 97 | 0E | | | |
| C00B | BD | C0 89 | | | | | | | C0DB | B6 | 80 40 | C127 | 86 | 40 |
| C00E | 7E | C0 FF | C04E | 86 | 00 | | | | C0DE | 97 | 0F | C129 | B7 | 80 80 |
| | | | C050 | B7 | 80 82 | C095 | 39 | | | | | | | |
| | | | C053 | 86 | 17 | | | | C0E0 | 74 | 00 0E | C12C | 96 | 12 |
| | | | C055 | B7 | 80 81 | | | | C0E3 | 76 | 00 0F | C12E | 84 | 03 |
| | | | | | | | | | C0E6 | 74 | 00 0E | C130 | 97 | 12 |
| | | | C058 | 86 | 25 | | | | C0E9 | 76 | 00 0F | | | |
| | | | C05A | B7 | 80 83 | | | | C0EC | 74 | 00 0E | C132 | DE | 12 |
| | | | | | | C096 | B6 | 80 42 | C0EF | 76 | 00 0F | C134 | DF | 25 |
| | | | C05D | 86 | 00 | C099 | 84 | F0 | C0F2 | 74 | 00 0E | C136 | DE | 0A |
| | | | C05F | B7 | 80 80 | C09B | 44 | | C0F5 | 76 | 00 0F | C138 | DF | 27 |
| | | | | | | C09C | 44 | | | | | | | |
| C011 | 86 | 00 | | | | C09D | 44 | | C0F8 | DE | 0E | | | |
| C013 | B7 | 80 05 | C062 | B6 | 80 80 | C09E | 44 | | C0FA | DF | 2B | | | |
| | | | C065 | B6 | 80 82 | C09F | 97 | 3A | | | | C13A | 74 | 00 27 |
| C016 | 86 | FF | | | | C0A1 | 81 | 07 | C0FC | 7E | C0 C5 | C13D | 76 | 00 28 |
| C018 | B7 | 80 04 | | | | C0A3 | 2E | 2E | | | | | | |
| | | | C068 | 86 | 00 | | | | | | | C140 | BD | C3 8C |
| C01B | 86 | 07 | C06A | B7 | 80 41 | C0A5 | 86 | 00 | | | | C143 | 96 | 38 |
| C01D | B7 | 80 05 | C06D | B7 | 80 43 | C0A7 | 97 | 31 | C0FF | B6 | 80 05 | C145 | 81 | FF |
| C020 | 86 | 04 | C070 | 86 | 00 | C0A9 | 96 | 3A | C102 | 84 | 80 | | | |
| C022 | B7 | 80 04 | C072 | B7 | 80 40 | C0AB | 9B | 3A | C104 | 81 | 80 | C147 | 26 | 03 |
| | | | C075 | B7 | 80 42 | C0AD | 97 | 32 | | | | | | |
| | | | C078 | 86 | 07 | C0AF | B6 | 80 42 | C106 | 26 | 03 | C149 | 7E | C2 C8 |
| C025 | 86 | 00 | C07A | B7 | 80 41 | C0B2 | 84 | F0 | | | | C14C | DE | 12 |
| C027 | B7 | 80 07 | C07D | 86 | 05 | C0B4 | 81 | 70 | C108 | 7E | C1 0E | C14E | DF | 27 |
| C02A | 86 | FF | C07F | B7 | 80 43 | C0B6 | 27 | 1C | C10B | 7E | C0 0A | | | |
| C02C | B7 | 80 08 | | | | C0B8 | B6 | 80 42 | | | | C150 | DE | 08 |
| C02F | 86 | 04 | | | | C0BB | 84 | 0F | | | | C152 | DF | 25 |
| C031 | B7 | 80 07 | C193 | DF | 33 | C0BD | 97 | 2B | | | | | | |
| | | | | | | C1CD | 81 | FF | C211 | DF | 18 | C251 | DE | 12 |
| C154 | 74 | 00 25 | C195 | 86 | 07 | C1CF | 26 | 09 | | | | C253 | DF | 10 |
| C157 | 76 | 00 26 | C197 | B7 | 80 41 | | | | C213 | DE | 12 | | | |
| C15A | BD | C3 8C | C19A | DE | 12 | C1D1 | 7E | C2 C8 | C215 | DF | 21 | C255 | 96 | 06 |
| | | | C19C | DF | 14 | C1D4 | 96 | 39 | C217 | DE | 14 | C257 | 97 | 33 |
| C15D | 96 | 38 | | | | C1D6 | 81 | 0A | C219 | DF | 23 | | | |
| C15F | 81 | FF | C19E | 86 | 20 | C1D8 | 27 | 35 | C21B | BD | C3 64 | C259 | 96 | 01 |
| | | | C1A0 | B7 | 80 80 | C1DA | DE | 12 | C21E | DE | 25 | C25B | 81 | 01 |
| C161 | 27 | 03 | C1A3 | 86 | 50 | C1DC | DF | 21 | C220 | DF | 16 | C25D | 26 | 03 |
| C163 | 7E | C2 C8 | C1A5 | B7 | 80 80 | C1DE | DE | 10 | | | | C25F | BD | C4 23 |
| | | | C1A8 | 0E | | C1E0 | DF | 23 | C222 | 96 | 39 | C262 | 7A | 00 39 |
| | | | C1A9 | 3E | | C1E2 | BD | C3 64 | C224 | 81 | 0A | C265 | 7E | C1 9A |
| | | | | | | | | | C226 | 26 | 40 | C268 | 96 | 39 |
| | | | | | | | | | | | | C26A | 81 | 00 |
| C166 | 86 | 03 | | | | | | | | | | C26C | 26 | 50 |

| ADDR. | DATA | | ADDR. | DATA | | ADDR. | DATA | | ADDR. | DATA | | ADDR. | DATA | |
|---|---|---|---|---|---|---|---|---|---|---|---|---|---|---|
| C168 | B7 | 80 04 | | | | C1E5 | DE | 25 | | | | | | |
| | | | | | | C1E7 | DF | 1A | | | | C26E | BD | C4 23 |
| C16B | DE | 04 | | | | | | | C228 | DE | 18 | C271 | 96 | 01 |
| C16D | DF | 33 | | | | C1E9 | DE | 1C | C22A | DF | 23 | C273 | 81 | 01 |
| | | | | | | C1EB | DF | 27 | | | | | | |
| C16F | BD | C4 52 | | | | | | | C22C | CE | 00 E6 | C275 | 26 | 1F |
| | | | | | | C1ED | BD | C3 8C | C22F | DF | 21 | | | |
| | | | | | | | | | | | | C277 | DE | 1A |
| | | | C1AA | DE | 12 | C1F0 | 96 | 38 | C231 | BD | C3 2C | C279 | DF | 21 |
| | | | C1AC | DF | 25 | C1F2 | 81 | FF | | | | | | |
| | | | | | | | | | | | | C27B | DE | 0E |
| | | | C1AE | CE | 03 F4 | C1F4 | 26 | 19 | C234 | 96 | 25 | C27D | DF | 23 |
| | | | | | | | | | C236 | 97 | 26 | | | |
| C172 | DE | 0C | C1B1 | DF | 27 | C1F6 | DE | 25 | | | | C27F | BD | C3 2C |
| C174 | DF | 1C | C1B3 | BD | C3 8C | C1F8 | 70 | 00 25 | C238 | 86 | 00 | C282 | DE | 25 |
| C176 | 74 | 00 1C | | | | C1FB | 70 | 00 26 | C23A | 97 | 25 | C284 | DF | 1A |
| C179 | 76 | 00 1D | C1B6 | 96 | 38 | | | | | | | | | |
| | | | C1B8 | 81 | FF | C1FE | CE | 00 12 | C23C | DE | 16 | C286 | DE | 1C |
| | | | | | | C201 | DF | 27 | C23E | DF | 27 | C288 | DF | 27 |
| C17C | CE | 04 57 | | | | | | | | | | | | |
| C17F | DF | 16 | C1BA | 26 | 03 | C203 | BD | C3 8C | C240 | BD | C3 8C | | | |
| | | | C1BC | 7E | C2 C8 | C206 | 96 | 38 | C243 | 96 | 38 | C28A | BD | C3 8C |
| C181 | CE | 00 0C | | | | C208 | 81 | FF | C245 | 81 | FF | C28D | 96 | 38 |
| C184 | DF | 12 | C1BF | DE | 12 | | | | | | | C28F | 81 | FF |
| | | | C1C1 | DF | 27 | C20A | 26 | 03 | C247 | 26 | 03 | | | |
| C186 | CE | 00 00 | | | | C20C | 7E | C2 C8 | | | | C291 | 26 | 2E |
| C189 | DF | 10 | C1C3 | CE | 00 0C | | | | C249 | 7E | C1 9A | | | |
| C18B | DF | 1A | C1C6 | DF | 25 | | | | | | | C293 | 7E | C2 CF |
| | | | | | | | | | C24C | 86 | 10 | | | |
| C18D | 86 | 0A | C1C8 | BD | C3 8C | C20F | DE | 16 | C24E | B7 | 80 04 | C296 | DE | 1C |
| C18F | 97 | 39 | | | | | | | | | | C298 | DF | 27 |
| | | | C1CB | 96 | 38 | | | | | | | | | |
| C191 | DE | 06 | | | | C319 | 97 | 24 | C354 | DF | 25 | | | |
| C29A | DE | 1A | | | | | | | | | | | | |
| C29C | DF | 25 | C2E1 | 7E | C0 0A | C31B | BD | C3 1F | C356 | BD | C3 8A | | | |
| | | | | | | C31E | 39 | | C359 | 96 | 37 | C38A | 01 | |
| C29E | BD | C3 8C | | | | | | | C35B | 81 | FF | C38B | 01 | |
| | | | | | | | | | | | | C38C | 86 | 00 |
| C2A1 | 96 | 38 | | | | | | | C35D | 26 | D8 | C38E | 97 | 38 |
| C2A3 | 81 | FF | | | | | | | | | | C390 | 97 | 37 |
| | | | | | | | | | C35F | DE | 23 | C392 | 97 | 36 |
| C2A5 | 26 | 03 | | | | | | | C361 | DF | 25 | | | |
| | | | | | | | | | | | | C394 | 96 | 25 |
| C2A7 | 7E | C2 CF | | | | | | | C363 | 39 | | C396 | D6 | 27 |
| | | | | | | C31F | 96 | 22 | | | | C398 | 11 | |
| | | | | | | C321 | 9B | 24 | | | | | | |
| C2AA | CE | 00 00 | | | | C323 | 97 | 26 | | | | C399 | 22 | 10 |
| C2AD | DF | 27 | C2E4 | BD | C3 73 | C325 | 96 | 21 | | | | | | |
| | | | | | | C327 | 99 | 23 | | | | | | |
| C2AF | DE | 33 | C2E7 | 96 | 2B | C329 | 97 | 25 | | | | C39B | 26 | 15 |
| C2B1 | DF | 25 | C2E9 | 97 | 24 | | | | C364 | 73 | 00 24 | C39D | 96 | 26 |
| C2B3 | BD | C3 8A | | | | C32B | 39 | | C367 | 73 | 00 23 | C39F | D6 | 28 |
| | | | C2EB | 86 | 64 | | | | | | | C3A1 | 11 | |
| C2B6 | 96 | 37 | C2ED | 97 | 22 | | | | C36A | BD | C3 1F | C3A2 | 86 | FF |
| C2B8 | 81 | FF | | | | | | | | | | C3A4 | 22 | 05 |
| | | | C2EF | BD | C3 2C | | | | C36D | DE | 25 | C3A6 | 27 | 06 |
| C2BA | 26 | 02 | | | | | | | C36F | 08 | | C3A8 | 23 | 08 |
| | | | C2F2 | DE | 25 | | | | C370 | DF | 25 | C3AA | 39 | |
| C2BC | 20 | 03 | C2F4 | DF | 2D | | | | | | | | | |
| | | | C2F6 | BD | C3 73 | C32C | DE | 23 | C372 | 39 | | C3AB | 97 | 38 |
| C2BE | 7E | C1 9A | | | | C32E | DF | 2F | | | | C3AD | 39 | |
| | | | C2F9 | 96 | 2C | C330 | CE | 00 00 | | | | C3AE | 97 | 37 |

| ADDR. | DATA | | ADDR. | DATA | | ADDR. | DATA | | ADDR. | DATA | | ADDR. | DATA | |
|---|---|---|---|---|---|---|---|---|---|---|---|---|---|---|
| C2C1 | 86 | 20 | C2FB | 84 | F0 | C333 | DF | 23 | | | | C3B0 | 39 | |
| C2C3 | B7 | 80 06 | | | | C335 | DF | 27 | C373 | CE | 00 00 | C3B1 | 39 | |
| | | | C2FD | 44 | | | | | | | | C3B2 | 97 | 36 |
| C2C6 | 20 | 0C | C2FE | 44 | | C337 | 96 | 30 | C376 | DF | 21 | | | |
| | | | C2FF | 44 | | C339 | 84 | 01 | C378 | DF | 23 | | | |
| | | | C300 | 44 | | C33B | 81 | 01 | C37A | DF | 25 | | | |
| C2C8 | 86 | C0 | C301 | 97 | 24 | | | | | | | C3B4 | 86 | 11 |
| C2CA | B7 | 80 06 | | | | C33D | 26 | 07 | C37C | 39 | | C3B6 | 8A | 08 |
| C2CD | 20 | 05 | C303 | 86 | 0A | | | | | | | C3B8 | B7 | 80 83 |
| | | | C305 | 97 | 22 | | | | | | | | | |
| | | | | | | C33F | BD | C3 1F | | | | C3BB | 86 | FF |
| C2CF | 86 | 40 | C307 | BD | C3 2C | | | | C37D | B6 | 80 80 | C3BD | B7 | 80 82 |
| C2D1 | B7 | 80 06 | | | | C342 | DE | 25 | C380 | 84 | 03 | | | |
| | | | C30A | BD | C3 FA | C344 | DF | 23 | C382 | 97 | 12 | | | |
| C2D4 | CE | 00 1E | C30D | DE | 25 | C346 | 74 | 00 2F | | | | C3C0 | DE | 1A |
| C2D7 | DF | 33 | C30F | DF | 21 | C349 | 76 | 00 30 | C384 | B6 | 80 82 | C3C2 | DF | 23 |
| | | | | | | C34C | 78 | 00 22 | C387 | 97 | 13 | | | |
| C2D9 | 86 | 04 | C311 | 86 | 00 | C34F | 79 | 00 21 | | | | C3C4 | CE | 02 00 |
| C2DB | B7 | 80 04 | C313 | 97 | 23 | | | | C389 | 39 | | | | |
| | | | C315 | 96 | 2C | C352 | DE | 2F | | | | | | |
| C2DE | BD | C4 52 | C317 | 84 | 0F | | | | | | | | | |
| C3C7 | DF | 21 | | | | C440 | DE | 33 | | | | | | |
| | | | C402 | B6 | 80 41 | C442 | DF | 25 | | | | | | |
| C3C9 | BD | C3 1F | C405 | 84 | 80 | | | | | | | | | |
| | | | C407 | 81 | 80 | C444 | BD | C3 8A | | | | | | |
| C3CC | 74 | 00 25 | | | | | | | | | | | | |
| C3CF | 76 | 00 26 | C409 | 26 | 17 | C447 | 96 | 37 | | | | | | |
| | | | | | | C449 | 81 | FF | | | | | | |
| C3D2 | 74 | 00 25 | | | | | | | | | | | | |
| C3D5 | 76 | 00 26 | C40B | B6 | 80 04 | C44B | 26 | 04 | | | | | | |
| | | | C40E | BD | C3 7D | | | | | | | | | |
| C3D8 | 96 | 26 | C411 | 96 | 33 | | | | | | | | | |
| C3DA | B7 | 80 82 | C413 | 81 | 00 | C44D | 86 | FF | | | | | | |
| | | | C415 | 26 | 06 | C44F | 97 | 35 | | | | | | |
| C3DD | B6 | 80 80 | C417 | 96 | 34 | | | | | | | | | |
| C3E0 | 8A | 80 | C419 | 81 | 00 | C451 | 39 | | | | | | | |
| C3E2 | B7 | 80 80 | C41B | 27 | 05 | | | | | | | | | |
| | | | C41D | DE | 33 | | | | | | | | | |
| | | | C41F | 09 | | | | | | | | | | |
| C3E5 | 84 | 7F | C420 | DF | 33 | | | | | | | | | |
| C3E7 | B7 | 80 80 | | | | | | | | | | | | |
| | | | C422 | 3B | | C452 | BD | C4 36 | | | | | | |
| C3EA | 86 | 11 | | | | C455 | 96 | 33 | | | | | | |
| C3EC | B7 | 80 83 | | | | C457 | 81 | 00 | | | | | | |
| | | | C423 | DE | 12 | C459 | 26 | F7 | | | | | | |
| C3EF | 86 | 00 | C425 | DF | 21 | C45B | 96 | 34 | | | | | | |
| C3F1 | B7 | 80 82 | C427 | DE | 10 | C45D | 81 | 00 | | | | | | |
| | | | C429 | DF | 23 | C45F | 26 | F1 | | | | | | |
| C3F4 | 86 | 25 | | | | | | | | | | | | |
| C3F6 | B7 | 80 83 | C42B | BD | C3 64 | C461 | 0F | | | | | | | |
| | | | | | | C462 | 39 | | | | | | | |
| C3F9 | 39 | | C42E | DE | 25 | | | | | | | | | |
| | | | C430 | DF | 1A | | | | | | | | | |
| C3FA | DE | 2D | C432 | BD | C3 B4 | | | | | | | | | |
| C3FC | DF | 21 | | | | C7F8 | C4 | 02 | | | | | | |

| ADDR. DATA | ADDR. DATA | ADDR. DATA | ADDR. DATA | ADDR. DATA |
|---|---|---|---|---|
|  | C435 39 | C7FA C4 02 |  |  |
| C3FE BD C3 1F |  | C7FC C0 00 |  |  |
|  |  | C7FE C0 00 |  |  |
| C401 39 |  |  |  |  |
|  | C436 86 00 |  |  |  |
|  | C438 97 35 |  |  |  |
|  | C43A 0E |  |  |  |
|  | C43B CE 00 00 |  |  |  |
|  | C43E DF 27 |  |  |  |
The following is a representation of the various locations in memory of system components which are addressed by the CPU. The RAM from 0000 to 007F is physically located in the CPU, MC6802.
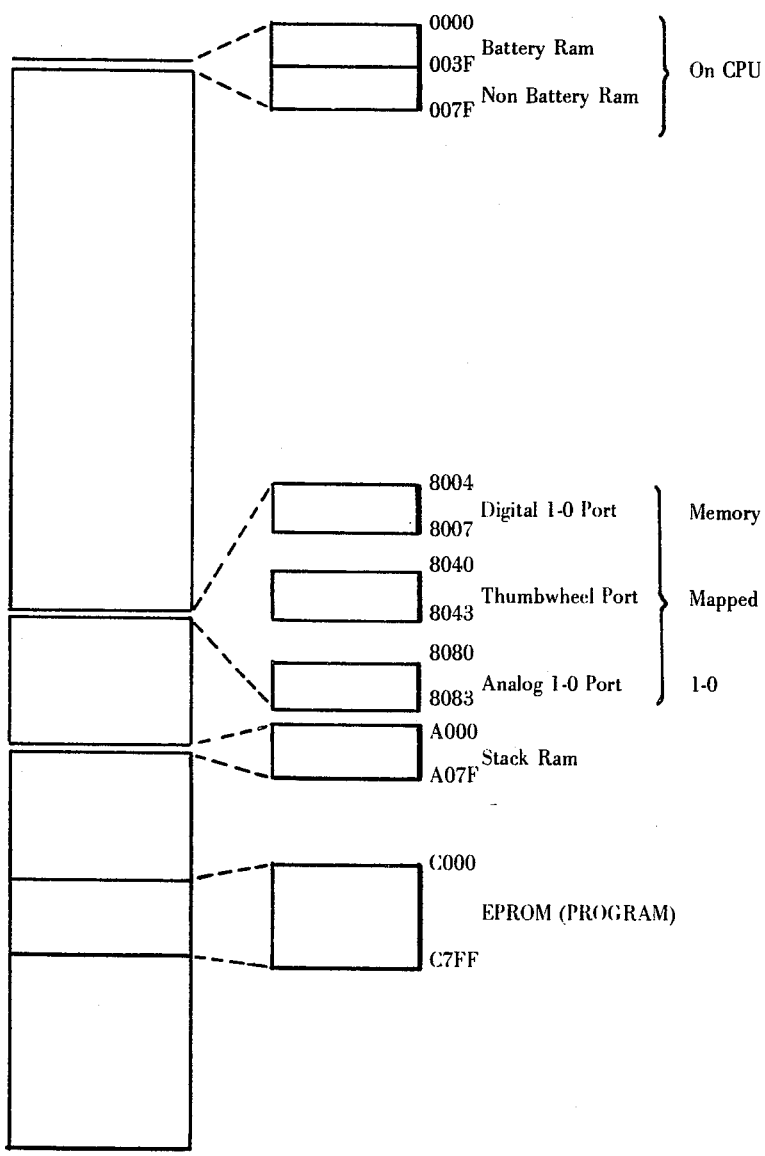

| FIG. # | Item # | Part Identification or Value | |
|---|---|---|---|
| 14 | 61 | MC 6821 | Motorola |
| | 62 | MC 6821 | Motorola |
| | 79 | MC 14538 | Motorola |
| 15 | 125 | MC 7407 | |
| | 126 | 10K ohm resistor | |
| | 127 | Solid State Relay - SIGMA 226R-1-5A1 | |
| 16 | 125 | MC 7407 | Motorola |
| | 126 | 10K ohm resistor | |
| | 128 | IN 4001 DIODE | |
| | 129 | R105-E1-Y2-J1K Relay | Potter & Brumfield |
| 16A | 166 | MC 7406 | Motorola |
| | 165 | 10 ohm resistor | |
| | 175 | 10K ohm resistor | |
| 17 | 178 | 100K ohm resistor | |
| | 179 | .22 micro farad cap. | |
| | 180 | 12K ohm resistor | |
| | 182 | 12K ohm resistor | |
| | 184 | MC 14538 | Motorola |
| 18 | 181 | 2N3904 transistor | Motorola |
| | 53 | ±5 ma meter G.E. (zero center type) | |
| 18A | 127 | 15K ohm resistor | |
| | 128 | 10K ohm resistor | |
| | 129 | 100K ohm pot. | Bourns 3006P-1-104 |
| | 130 | RC 1458 | Raytheon |
| | 131 | 8.2K ohm resistor | |
| | 133 | RC 1458 | Raytheon |
| | 134 | 2.2K ohm resistor | |
| 18B | 187 | 27K ohm resistor | |
| | 188 | LM 324 | National Semiconductor |
| | 189 | 50K pot. | Bourns 3006P-1-503 |
| | 190 | 51K ohm resistor | |
| | 191 | 50K pot. | Bourns 3006P-1-503 |
| | 192 | 18K ohm resistor | |
| | 193 | LM 324 | National Semiconductor |
| | 194 | 18K ohm resistor | |
| 21 | 115 | 10 ohm resistor | |
| | 116 | IN4001 diode | Motorola |
| | 117 | IN4001 diode | Motorola |
| | 118 | IN4001 diode | Motorola |
| | 119 | IN4001 diode | Motorola |
| | 120 | IN4001 diode | Motorola |
| | 121 | 2N3905 Transistor | |
| | 122 | 10K ohm resistor | |

We claim:

1. A method of electronically testing a part for leakage, said method including the steps of:
(a) providing a source of test medium at a predetermined desired pressure or vacuum;
(b) connecting a test part to said source of test medium;
(c) momentarily isolating said test part from said source of test medium;
(d) measuring the differential pressure existing between said source of test medium and said test part;
(e) calculating the change in differential pressure while said test part is isolated, wherein the step of calculating the change in differential pressure includes the steps of:
(aa) starting said leak test;
(bb) interposing an exhaust valve between said fill valve and said test part;
(cc) closing said exhaust valve;
(dd) opening said fill valve, thereby permitting said test medium from said source to equalize with (i.e. vacuum or pressure) said test part;
(ee) obtaining a reading from said fill pressure transducer, comparing said reading to predetermined limits and proceeding with said leak tests only if said reading is within said limits;
(ff) closing said balance valve, thereby isolating said test part from said source;
(gg) introducing the balance delay time;
(hh) obtaining at least one differential pressure reading from said differential pressure transducer, wherein the steps of obtaining differential pressure readings include the steps of:
(a) providing a microcomputer system;
(b) providing a test program to operate said microcomputer system; and
(c) utilizing said test program and said microcomputer system to obtain said differential pressure reading;
(ii) introducing a test delay time;
(jj) obtaining at least one additional differential pressure reading from said differential pressure transducer and proceeding with said leak test if said one additional reading is not beyond the range of said differential pressure transducer; and
(kk) calculating the change in differential pressure between said additional differential pressure reading obtained after said test delay time, and said differential pressure reading obtained prior to said test delay time;
(f) utilizing said differential pressure and said change in differential pressure to determine if said test part is acceptable, or unacceptable, or whether the test was faulty.

2. The method as defined in claim 1, wherein the step of obtaining at least one differential pressure reading includes the additional steps of:
(a) providing as part of said microcomputer system, an analog input circuit including an analog to digital converter, a multiplexer, and a sample and hold integrated circuit;
(b) providing as part of said test program an analog to digital converter subroutine;
(c) entering said analog to digital converter subroutine;
(d) selecting an appropriate channel input on said multiplexer for data acquisition;
(e) outputting to said sample and hold integrated circuit a sample signal allowing the analog signal from said differential pressure transducer to pass through said sample and hold integrated circuit to said analog to digital converter;
(f) introducing a delay for data acquisition;
(g) turning off said sample signal, thereby allowing said analog signal to be held, and not allowing further signals to pass through to said analog to digital converter;
(h) outputting a signal from said microcomputer system to said analog to digital converter to enable signals from said A/D converter to be supplied to said microcomputer system;
(i) reading the data from said analog to digital converter into said microcomputer system; and
(j) leaving said analog to digital converter subroutine.

3. The method as defined in claim 2, wherein the step of calculating the change in differential pressure includes the additional steps of:
(a) providing as part of said test program a leak test cycle subroutine;
(b) providing as part of said test program predetermined limits;
(c) providing a fill pressure transducer;
(d) providing a test indicating means;
(e) utilizing said leak test cycle subroutine to operate said exhaust valve, said fill valve, and said balance valve to allow said test medium to enter said test part;
(f) introducing a fill delay time;
(g) obtaining a fill pressure reading from said fill pressure transducer;

(h) checking to determine if said fill pressure reading is in limits, and if said fill pressure reading is in limits, closing said balance valve;
(i) introducing a balance delay time;
(j) obtaining and storing an initial differential pressure reading;
(k) checking to see if said initial value of differential pressure is at its maximum value, and if it is not at its maximum value, turning on said test indicating means;
(l) waiting said testing delay time;
(m) obtaining and storing a final differential pressure reading; and
(n) utilizing said initial differential pressure reading, said final differential pressure reading, said microcomputer system and said leak test cycle subroutine to calculate the change in differential pressure.

4. The method as defined in claim 3, wherein the step of providing predetermined limits includes the steps of:
(a) providing a thumbwheel switch assembly for entering test limits into said microcomputer, and connecting said thumbwheel switch assembly to said microcomputer;
(b) providing a data entry subroutine; and
(c) utilizing said test program to check that said leak test is not in process, and to check if a thumbwheel entry has been made on said thumbwheel switch assembly, and to utilize said data entry subroutine to store said thumbwheel entry as limits.

5. The method defined in claim 3, wherein the step of determining if said test part is acceptable includes the steps of:
(a) supplying an accept indicating means;
(b) determining that said final differential pressure reading is not out of range of said differential pressure transducer;
(c) determining if said change in differential pressure is within said predetermined limits;
(d) turning on said accept indicating means;
(e) turning off said test indicating means;
(f) opening said balance valve;
(g) close said fill valve;
(h) opening said exhaust valve; and
(i) leaving said leak test cycle subroutine.

6. The method defined in claim 3, wherein the step of determining if said test part is unacceptable includes the steps of:
(a) supplying a reject indicating means;
(b) determining that said change in differential pressure is greater than said predetermined limit;
(c) turning on said reject indicating means;
(d) turning off said test indicating means;
(e) opening said balance valve;
(f) close said fill valve;
(g) opening said exhaust valve; and
(h) leaving said leak test cycle subroutine.

7. The method as defined in claim 3, wherein the step of determining if said test was faulty includes the steps of:
(a) supplying a reject indicating means;
(b) supplying a fault indicating means;
(c) determining that said fill pressure is out of said predetermined limits, the change in pressure exceeded the range of said transducer;
(d) turning on said fault indicating means;
(e) turning on said reject indicating means;
(f) turning off said test indicating means;
(g) opening said balance valve;
(h) closing said fill valve;
(i) opening said exhaust valve; and
(j) leaving said leak test cycle subroutine.

8. The method as defined in claim 3, wherein the step of determining if said test was faulty includes the steps of:
(a) supplying a reject indicating means;
(b) supplying a fault indicating means;
(c) determining that said fill pressure is within said predetermined limits, and that said initial differential pressure reading is at its maximum value;
(d) turning on said fault indicating means;
(e) turning on said reject indicating means;
(f) turning off said test indicating means;
(g) opening said balance valve;
(h) closing said fill valve;
(i) opening said exhaust valve; and
(j) leaving said leak test cycle subroutine.

9. The method as defined in claim 3, wherein the step of determining if said test was faulty includes the steps of:
(a) supplying a reject indicating means;
(b) supplying a fault indicating means;
(c) determining that said fill pressure is within said predetermined limits, and that said initial differential pressure reading is not at its maximum value, and that said change in differential pressure is negative;
(d) turning on said fault indicating means;
(e) turning on said reject indicating means;
(f) turning off said test indicating means;
(g) opening said exhaust valve;
(h) opening said balance valve;
(i) closing said fill valve; and
(j) leaving said leak test cycle subroutine.

10. The method as defined in claim 3, wherein the step of determining if said test was faulty includes the steps of:
(a) supplying a reject indicating means;
(b) supplying a fault indicating means;
(c) determining that said fill pressure is within said predetermined limits, and that said initial differential pressure reading is not at its maximum value, and that said change in differential pressure is within limits, and that said final differential pressure reading is at its maximum value;
(d) turning on said fault indicating means;
(e) turning on said reject indicating means;
(f) turning off said test indicating means;
(g) opening said balance valve;
(h) closing said fill valve;
(i) opening said exhaust valve; and
(j) leaving said leak test cycle subroutine.

11. The method as defined in any one of claims 5–10, wherein the step of introducing said test delay time includes the steps of:
(a) obtaining a differential pressure reading;
(b) calculating the change in differential pressure;
(c) providing a change in differential pressure meter;
(d) outputting said change in differential pressure reading to said change in differential pressure meter;
(e) obtaining the differential pressure reading, calculating the change in differential pressure, and outputting said change in differential pressure to said change in differential pressure meter until a new test is initiated; and
(f) storing a final differential pressure reading.

12. A leak testing system including:
(a) means to provide a source of test medium at a predetermined desired pressure or vacuum;

(b) means to connect a test part to said source of test medium, said means to connect including a fill valve;

(c) means to isolate said test part from said source of test medium, said means to isolate including a balance valve;

(d) means to measure the differential pressure existing between said source of test medium and said test part, said means to measure including a differential pressure transducer;

(e) means to calculate the change in differential pressure while said test part is isolated, wherein said means to calculate the change in differential pressure while said test part is isolated include a microcomputer system connected to said fill valve, said bypass valve, and said differential pressure transducer to calculate the change in differential pressure while said test part is isolated; and (f) means to utilize said differential pressure measurement and said change in differential pressure to determine if said test part is acceptable, or unacceptable, or whether the test was faulty.

13. The system as defined in claim 12, wherein said microcomputer system includes:

(a) a central processing unit;
(b) a memory;
(c) an interface; and
(d) a test program to operate said central processing unit.

14. The system as defined in claim 13, wherein said interface of said microcomputer system includes:

(a) digital output circuitry;
(b) digital input circuitry;
(c) signal conditioning circuitry; and
(d) analog input circuitry.

15. The system as defined in claim 14, and including:

(a) an exhaust valve interposed in said first conduit and connected to said microcomputer system;
(b) a fill pressure transducer interposed in said first conduit immediately downstream of said fill valve;
(c) a test indicating means connected to said microcomputer system;
(d) a reject indicating means connected to said microcomputer system;
(e) a fault indicating means connected to said microcomputer system;
(f) an accept indicating means connected to said microcomputer system;
(g) a start test means connected to said microcomputer system; and
(h) a reset test means connected to said microcomputer system.

16. The system as defined in claim 15, wherein said central processing unit includes:

(a) a signal bus;
(b) a central processing unit connected to said signal bus;
(c) a random access memory connected to said signal bus; and
(d) an electronically programmable read only memory connected to said signal bus.

17. The system defined in claim 16, wherein said digital input circuitry and said digital output circuitry includes:

(a) a digital input-output peripheral interface adaptor connected to said central processing unit;
(b) a plurality of output buffers connected between said digital input-output peripheral interface adaptor and said exhaust valve, said fill valve, said balance valve, said accept indicating means, said test indicating means, said fault indicating means and said reject indicating means; and
(c) an input buffer connected to said digital input-output peripheral interface adaptor and said start test button and said reset button.

18. The system as defined in claim 17, wherein said signal conditioning circuitry includes:

(a) a differential pressure signal conditioner connected to said differential pressure transducer and to said analog input circuitry; and
(b) a fill pressure signal conditioner connected to said fill pressure transducer and said analog input circuitry.

19. The system as defined in claim 18, wherein said analog input circuitry additionally includes:

(a) an analog input-output peripheral interface adaptor connected to said central processing unit;
(b) a multiplexer connected to said analog input-output peripheral interface adaptor to receive a channel select signal therefrom, a channel zero input connected to said differential pressure transducer, a channel one input connected to said fill pressure transducer, an unused channel two input, an unused channel three input, and an output circuit;
(c) a non-inverting amplifier having an input connected to said multiplexer, and an output;
(d) a sample and hold circuit connected to said input-output peripheral interface adaptor to receive a sample and hold control signal therefrom, and having an input and an output, said input connected to said output of said non-inverting amplifier;
(e) an analog input gain circuit having an input and an output, said input connected to said output of said sample and hold circuit; and
(f) an analog to digital converter connected to said digital input-output peripheral interface adaptor to receive an enable output data signal therefrom, and to supply data signals thereto, and also connected to said output of said sample and hold circuit.

20. The system as defined in claim 19, wherein said plurality of output buffers include:

(a) a buffer/driver circuit having an input and an output, said input connected to said digital input-output peripheral interface adaptor;
(b) a solid-state relay having a positive and a negative input and a power and a load output, said positive input connected to said output of said buffer/driver circuit, said negative input connected to common, said power output of said solid-state relay connected to 115-volt AC current, and the load output of said solid-state relay connected to a device operated by said system; and
(c) an output buffer pull up resistor having two ends, one end of which is interposed between said output of said buffer/driver circuit and said positive input of said solid-state relay, and the other end of said resistor connected to system power.

21. The system as described in claim 19, wherein said plurality of output buffers include:

(a) a buffer/driver circuit having an input and an output with said input connected to said digital input-output peripheral interface adaptor;
(b) an output buffer pull up resistor having two ends, one end of which is connected to system power;
(c) an electro-mechanical relay having a positive and negative input, and having a set of relay contacts, the output of said buffer/driver circuit connected to said negative input of said electro-mechanical relay, the other end of said output buffer pull up resistor interposed between said output of said buffer/driver circuit and said negative input of said electro-mechanical relay, said positive input of said electro-mechanical relay connected to system power; and one of said relay contacts of said electro-mechanical relay connected to a power source and the other one of said relay contacts of said electro-mechanical relay connected to the device being operated; and (d) a noise suppression diode connected in parallel with said electro-mechanical relay coil.

22. The system as defined in claim 19, and including means to display the change in differential pressure occurring while said test part is isolated.

23. The leak test system as defined in claim 19, and including means to display said differential pressure between said source of test medium and said pressure in said test part.

24. The system as defined in claim 23, wherein said means to display said differential pressure is a zero center meter having a section with positive graduations and a section with negative graduations.

25. The system as defined in claim 19, and including a local-remote start select switch.

26. The system as defined in claim 25, wherein said digital input circuitry also includes a local-remote signal conditioner including:

(a) a single shot having an input and an output, its input connected to the output of said local-remote start select switch;

(b) interposed between said input-output connection is a current limiting resistor;

(c) a pull up resistor having two ends, one end connected to system power, the other end connected to said local-remote start select switch;

(d) a transistor having an emitter, a base and a collector, with its base connected to output of said single shot, and its emitter connected to the digital input-output peripheral interface adaptor; and (e) a load resistor connected between the emitter of said transistor and system common.

27. The system as defined in claim 19, wherein said means to display the change in differential pressure is a zero center meter having a section with positive graduations and negative graduations.

28. The system as defined in claim 27, wherein said interface of said microcomputer system also includes analog output circuitry.

29. The system as defined in claim 28, wherein said analog input circuitry includes:

(a) a latch chip having an input and an output, the input of said latch chip connected to said digital input-output peripheral interface adaptor;

(b) a digital to analog converter having an input and an output, the input of said digital to analog converter connected to the output of said latch chip; and (c) an analog output gain circuit having an input and an output, the input of said analog output gain circuit connected to the output of said digital to analog converter.

30. The system as defined in claim 19, and including:

(a) a thumbwheel switch assembly operatively connected to said microcomputer system for entering a series of values into said memory.

31. The system as defined in claim 30, wherein said thumbwheel switch assembly includes:

(a) a 4-digit thumbwheel switch; and
(b) a thumbwheel data entry switch.

32. The system defined in claim 31, wherein said digital input circuitry also includes:

(a) a thumbwheel switch peripheral interface adaptor connected to said central processing unit and to said thumbwheel switch assembly.

33. The system as defined in claim 19, and including a low battery indicator connected to said microcomputer system.

34. The system as defined in claim 33, and including:

(a) a battery backup circuit connected to a source of system power, to a source of battery power, and to said central processing unit; and (b) a low battery detector circuit connected to said battery power, to said system power, and to said low battery indicator.

35. The system as defined in claim 34, wherein said low battery detector circuit includes:

(a) a voltage divider having an input and an ouput, with said input connected to said system power;

(b) a comparator having an output and a pair of inputs connected, one each, to the output of said voltage divider and to said battery power; and (c) a light driver having an input and an output, with said input connected to said output of said comparator, and said output of said light driver connected to said low battery indicator light.

36. The system as defined in claim 35, wherein said battery backup circuit includes:

(a) a transistor having an emitter, a base and a collector;

(b) a power resistor having an input and an output, said input connected to battery power;

(c) a first diode having an anode and a cathode, said anode connected to said output of said power resistor;

(d) a second diode having an anode and a cathode, said anode connected to said cathode of said first diode, and said cathode connected to said collector of said transistor;

(e) a third diode having an anode and a cathode, with said anode connected to said base of said transistor;

(f) a second resistor having an input and an output, the input of said second resistor connected to system common, and the output of said second resistor connected to the cathode of said third diode;

(g) a fourth diode having a cathode and an anode, the cathode of said fourth diode connected to the cathode of said third diode, and the anode of said fourth diode connected to said system power; and (h) a fifth diode having an anode and a cathode, said cathode connected to the emitter of said transistor, and said anode of said fifth diode connected to said system power.

37. A method of testing a part for leakage, said method including the steps of:

(a) providing a source of test medium at a predetermined desired pressure or vacuum;

(b) connecting a test part to said source of test medium;

(c) momentarily isolating said test part from said source of test medium;

(d) measuring the differential pressure existing between said source of test medium and said test part;

(e) calculating a projected change in differential pressure while said test part is isolated; and (f) utilizing said projected change in differential pressure to determine if a test part is acceptable or unacceptable or whether the test conditions are invalid.

38. The method defined in claim 37, wherein the step of connecting said test part to said source includes the steps of:
(a) providing a test fixture to which said test part can be sealingly, but removably, attached;
(b) providing a first conduit having two ends;
(c) connecting said conduit at one of its ends to said test fixture;
(d) providing a second conduit having two ends;
(e) connecting said second conduit at one of its ends to said source, and at its other end to the other end of said first conduit; and
(f) providing a fill valve in said first conduit to allow said test medium to pass from said source to said test part when said fill valve is open.

39. The method defined in claim 38, wherein the step of momentarily isolating said test part from said source includes the steps of:
(a) interposing between said fill valve and said end of said first conduit connected to said second conduit, a first section of bypass conduit;
(b) interposing in said second conduit a second section of bypass conduit; and
(c) connecting a balance valve between said first section of bypass conduit and said second section of bypass conduit, so that when said fill valve and said balance valve are open test medium can pass from said source to said test part, but when said balance valve is closed said test part is isolated from said source of test medium.

40. The method defined in claim 39, wherein the step of calculating a projected differential pressure reading includes the steps of:
(a) providing a microcomputer system having means to accept data entry;
(b) providing a test program to operate said microcomputer system; and
(c) utilizing said test program and said microcomputer system to obtain said projected differential pressure reading.

41. The method defined in claim 40, wherein the step of calculating a projected change in differential pressure while said test part is isolated includes the steps of:
(a) entering a fill delay time in said microcomputer system;
(b) entering a balance delay time in said microcomputer system;
(c) entering a differential pressure limit in said microcomputer system;
(d) entering the time over which the projection is to calculate in said microcomputer system;
(e) entering a fill pressure limit in said microcomputer system;
(f) entering a low fill pressure limit in said microcomputer system;
(g) entering a projection mode selection in said microcomputer system;
(h) starting said leak test;
(i) closing said exhaust valve;
(j) opening said fill valve, thereby permitting said test medium from said source to enter said test part;
(k) waiting for completion of fill delay;
(l) checking the fill pressure and close balance valve;
(m) waiting for completion of balance delay;
(n) waiting until the rate of change of said differential pressure transducer qualifies as a leak rate;
(o) turning on said test light;
(p) taking a predetermined number of transducer readings at fixed intervals for a fixed period of time after said rate of change qualifies as a leak rate; and
(q) obtaining a projection of leak rate over a desired time from said transducer readings taken over said fixed period of time after qualification.

42. The method defined in claim 41, wherein the step of obtaining any differential pressure reading used in calculating said projected differential pressure reading includes the additional steps of:
(a) providing as part of said microcomputer system, an analog input circuit including an analog to digital converter, a multiplexer, and a sample and hold integrated circuit;
(b) providing as part of said test program an analog to digital converter subroutine;
(c) entering said analog to digital converter subroutine;
(d) selecting an appropriate channel input on said multiplexer for data acquisition;
(e) outputting to said sample and hold integrated circuit a sample signal allowing the analog signal from said differential pressure transducer to pass through said sample and hold integrated circuit to said analog to digital converter;
(f) introducing a delay for data acquisition;
(g) turning off said simple signal, thereby allowing said analog signal to be held, and not allowing further signals to pass through to said analog to digital converter;
(h) outputting a signal from said microcomputer system to said analog to digital converter to enable signals from said A/D converter to be supplied to said microcomputer system;
(i) reading the data from said analog to digital converter into said microcomputer system; and
(j) leaving said analog to digital converter subroutine.

43. The method defined in claim 42, wherein the step of calculating a projected differential pressure includes the additional steps of:
(a) providing a predetermined limit for the change in differential pressure;
(b) providing a fill pressure transducer;
(c) providing test, accept, reject, and fault indicating means;
(d) beginning a test subroutine to operate said exhaust valve, said fill valve and said balance valve to allow said test medium to enter said test part;
(e) introducing a fill delay time;
(f) selecting a mode of operation of said system;
(g) initializing the value of slope at a value sufficient such that 9/10 of a value of a previous slope will not be greater than the value of a current slope representing the leak rate of a test part;
(h) initializing a pass counter at a value of 10;
(i) initializing a variable entitled "time" to the value of projection test time;
(j) setting the value of a second variable representing differential pressure (P2) to the value of a first variable representing differential pressure (P1);
(k) reading said differential pressure transducer;
(l) determining if the reading of said differential pressure is outside of the range of said differential pressure transducer;
(m) if the reading of said differential pressure is outside of the range of said differential pressure transducer, proceeding to a fault subroutine;
(n) if the reading of differential pressure is not outside of the range of said differential pressure transducer, setting the value of a first variable representing differential pressure to the value received from said differential pressure transducer;

(o) asking is the value of said first variable representing pressure equal to or greater than the negative range of the differential pressure transducer;

(p) if the value of the first variable representing differential pressure (P1) is less than the value of the negative range limit of the differential pressure transducer, entering the fault subroutine, otherwise proceeding to the next step;

(q) if the value of the variable representing current differential pressure is less than the value of the variable representing a second differential pressure, set a value of a second variable (S2) representing previous slope equal to the value of a first variable (S1) representing current slope;

(r) calculating a new value for the variable representing a current slope by subtracting the value of said second variable representing differential pressure from the value representing the current differential pressure; and (s) determining if said pass counter is equal to 10.

44. The method defined in claim 43, and including the steps of:
(a) determining that said differential pressure reading from said differential pressure transducer is outside of said transducer range; and
(b) entering said fault subroutine.

45. The method defined in claim 43, and including the steps of:
(a) determining that the value of said variable representing said previous differential pressure reading is less than the value of said variable reading said current differential pressure reading; and
(b) entering said fault subroutine.

46. The method defined in claim 45, wherein said transducer reading is out of the range of said transducer and entering said fault subroutine.

47. The method defined in claim 45, wherein the value of the variable representing the current differential pressure is less than the current value of the variable representing previous differential pressure, and entering said fault subroutine.

48. The method defined in any one of claims 44, 45, 46 or 47, wherein said fault subroutine includes the steps of:
(a) turning on said fault indicating means;
(b) turning on said reject indicating means;
(c) turning off said test indicating means;
(d) closing said fill valve;
(e) opening said balance valve;
(f) opening said exhaust valve; and
(g) returning to said test subroutine.

49. The method defined in claim 43, wherein if said pass counter is equal to 10, the method of determining said projected value of said differential pressure includes the additional steps of:
(a) multiplying the value of the variable representing said previous slope by 0.9;
(b) determining if the value thus obtained is greater than the value representing the previous slope;
(c) if said value is greater than the value of the previous slope, continuously setting the value representing the immediately previous differential pressure equal to the value of the current differential pressure, obtaining a new differential pressure, determining that the value of the variable representing the current differential pressure is not less than the value representing the previous differential pressure;

(d) setting the value of the variable representing the previous slope equal to the value of the variable representing the current slope, calculating a new value for the current slope by subtracting the value of the variable representing the previous pressure from the value representing the current pressure;

(e) determining that the pass counter is equal to 10 and multiplying the value of the previous slope by 0.9 until such time as the value so obtained is less than S1; and (f) not turning on said test light until such time as 0.9S2 is less than S1.

50. The method defined in claim 49, and including the additional steps of:
(a) turning on said test light;
(b) setting the value of a first new variable (REF) equal to the initial value of the variable representing the current differential pressure; and
(c) determining if said test is to be a full test or a projection test by checking the parameter entered on said thumbwheel switch.

51. The method defined in claim 50, wherein it is determined that such test is not to be a full test and, therefore, including the following steps of:
(a) decrementing said pass counter and returning to said subroutine and continuing to calculate new values of the variables representing the current and the previous differential pressure and calculating new values for the variables representing said previous slope and said initial slope; and
(b) until such time as said pass counter equals 0.

52. The method defined in claim 51, and including the steps of:
(a) setting the value of TOTAL equal to the current value representing the current pressure (P1) minus the value of said first new variable (REF);
(b) determining if said test is to be a full time test, and if said test is a full time test;
(c) determining if the value of TOTAL is greater than said predetermined limits for the change in differential pressure;
(d) if the value of TOTAL is greater than said predetermined limits for said change in differential pressure, entering a reject subroutine;
(e) if the value of TOTAL is less than said predetermined limits for said change in differential pressure, determining if the time is equal to 0;
(f) if said time is equal to 0, entering an accept subroutine; and
(g) if said time is not equal to 0 setting P2 equal to P1 and proceeding with the test.

53. The method defined in claim 52, and including the steps of:
(a) determining that the test is not a full time test and setting the value of a fourth new variable (projection total) at a value equal to TOTAL multiplied by the projection time (TIMEP); and
(b) determining if the value of said fourth new variable (projection total) is less than said predetermined limits for the change in differential pressure.

54. The defined in claim 53, and including the steps of:
(a) determining that the value of said fourth new variable is less than said predetermined limits for the change in differential pressure, proceeding to an accept subroutine; and
(b) entering said accept subroutine.

55. The method defined in claim 54, wherein said accept subroutine includes the steps of:
(a) turning on the accept indicating means;
(b) turning off the test indicating means;
(c) closing the fill valve;
(d) opening the balance valve;
(e) opening the exhaust valve; and
(f) returning to said test subroutine.

56. The method defined in claim 53, and including the steps of:
(a) determining that the value of said fourth new variable is greater than the predetermined limits for change in differential pressure, proceeding to a reject subroutine; and
(b) entering said reject subroutine.

57. The method defined in claim 56, wherein said reject subroutine includes the steps of:
(a) turning on said reject indicating means;
(b) turning off said test indicating means;
(c) closing said fill valve; p0 (d) opening said balance valve;
(e) opening said exhaust valve; and
(f) returning to said test subroutine.

58. A system for testing a part for leakage, said apparatus including:
(a) a source of test medium at a predetermined desired pressure of vacuum;
(b) means to connect a test part to said source of test medium;
(c) means to momentarily isolate said test part from said source of test medium;
(d) means to measure the differential pressure existing between said souce of test medium and said test part;
(e) means to calculate a projected change in differential pressure while said test part is isolated; and
(f) means to utilize said projected change in differential pressure to determine if a test part is acceptable or unacceptable or whether the test conditions are invalid.

59. The system defined in claim 53, wherein said means to connect a test part to said source includes:
(a) a test fixture to which said test part can be sealingly, but removably, attached;
(b) a first conduit having two ends, said first conduit connected at one of its ends to said test fixture;
(c) a second conduit having two ends, said second conduit connected at one of its ends to said source, and at its other end to the other end of said first conduit, and
(d) a fill valve in said first conduit to allow said test medium to pass from said source to said test part when said fill valve is open.

60. The system defined in claim 59, wherein said means to momentarily isolate said test part from said source includes:
(a) a first section of bypass conduit interposed between said fill valve and said end of said first conduit connected to said second conduit;
(b) a second section of bypass conduit interposed in said second conduit; and
(c) a balance valve connected between said first section of bypass conduit and said second section of bypass conduit, so that when said fill valve and said balance valve are open said test medium can pass from said source to said test part, but when said balance valve is closed said test part is isolated from said test medium.

61. The system defined in claim 60, wherein said means to calculate a projected change in differential pressure reading include:
(a) a microcomputer system having means to accept data entry;
(b) a test program to operate said microcomputer system; and
(c) means to utilize said test program and said microcomputer system to obtain said projected differential pressure reading.

62. The system defined in claim 61, wherein said means to calculate a projected change in differential pressure while said test part is isolated includes:
(a) means to start said leak test;
(b) an exhaust valve interposed between said fill valve and said test part;
(c) means to close said exhaust valve;
(d) means to open said fill valve, thereby permitting said test medium from said source to enter said test part;
(e) means to enter fill delay time in said microcomputer system;
(f) means to enter balance delay time in said microcomputer system;
(g) means to wait for a fill delay time in said microcomputer system;
(h) means to check fill pressure and close the balance valve;
(i) means to wait a balance delay time; and
(j) means to obtain a projected change in differential pressure.

63. The system defined in claim 62, wherein said means to measure said differential pressure include;
(a) an analog input circuit including an analog to digital converter, a multiplexer, and a sample and hold integrated circuit;
(b) a differential pressure transducer connected to said analog input circuit;
(c) an analog to digital converter subroutine adapted to operate said analog to digital converter;
(d) means to select an appropriate channel input on said multiplexer for data acquisition;
(e) means to output to said sample and hold integrated circuit a sample signal allowing the analog signal from said differential pressure transducer to pass through said sample and hold integrated circuit to said analog to digital converter;
(f) means to introduce a delay for data acquisition;
(g) means to turn off said sample signal, thereby allowing said analog signal to be held, and not allowing further signals to pass through to said analog to digital converter;
(h) means to output said analog to digital converter a start convert pulse thereby causing an analog to digital conversion to take place;
(i) means to read the data from said analog to digital converter into said microcomputer system; and
(j) means to leave said analog to digital converter subroutine.

64. The system defined in claim 63, wherein said means to calculate a projected differential pressure includes:
(a) predetermined limits for the change in change in differential pressure;
(b) a fill pressure transducer;
(c) a test indicating means;
(d) means to cause a test subroutine to operate said exhaust valve, said fill valve and said balance valve to allow said test medium to enter said test part; and
(e) a mode select switch.

65. The system defined in claim 64, and including:
(a) a thumbwheel switch.

66. The system defined in claim 65, and including:
(a) an accept subroutine.

67. The system defined in claim 66, and including:
(a) a fault subroutine.

68. The system defined in claim 67, and including:
(a) a timer.

69. The system defined in claim 68, and including:
(a) a fault light;
(b) a reject light; and
(c) a test light.

70. A method of leak testing a part using a selected test medium from a selected source comprising the steps of:
(a) subjecting the part to a predetermined test medium pressure;
(b) isolating the part from the source of selected test medium while continuing to subject the part to pressure;
(c) sensing a first differential pressure between a pressure at the source of the test medium and a pressure at the part being tested;
(d) waiting a selected time interval;
(e) sensing a second differential pressure between the pressure at the source of the test medium and the pressure at the part being tested;
(f) determining the magnitude of any change between the first and second sensed pressure differentials;
(g) comparing the magnitude of the change between the first and second sensed differential pressures to a predetermined value; and
(h) accepting or rejecting the part based on the results of comparing the magnitude of the change between the first and second differential pressures to the predetermined value.

71. Apparatus for leak testing a part using a selected test medium from a selected source including:
(a) means for control;
(b) means for subjecting the part to a predetermined test medium pressure, said means for subjecting is connected to said means for control;
(c) means for isolating the part from the source of test medium pressure while continuing to subject the part to pressure, said means for isolating is connected to said means for control;
(d) means for sensing a selected pressure at the part being tested including electronic means for generating a digital representation of the sensed selected pressure, said means for sensing and said electronic means for generating are connected to said means for control;
(e) said means for control to cause said means for subjecting and said means for isolating to subject the part to be tested to the predetermined test medium then to isolate the part from the source of test medium and to cause said means for sensing and said means for generating to generate a digital representation of a first sensed selected pressure;
(f) means for storage connected to said control means to store the digital representation of the first sensed selected pressure,
(g) means to determine that a selected time interval has elapsed;
(h) said means for control to cause said means for sensing and said means for generating to generate a digital representation of a second sensed selected pressure when the selected time interval has passed;
(i) means for forming a difference, said means for forming connected to said means for control to form a difference between the digital representations of said first and second sensed selected pressures and to generate a selected binary representation of that difference; and
(j) means for comparing connected to said means for control to compare said difference between the first and second sensed selected pressures to a predetermined value and to generate an electrical signal corresponding to the results of said comparison indicating acceptance or rejection of the part.

72. A method of dynamically projecting whether or not a part will pass a leak test comprising the steps of:
(a) subjecting the part to a predetermined test medium pressure from a source of test medium;
(b) isolating the part from the source of test medium while continuing to subject the part to pressure;
(c) continuously sensing at a selected rate differential pressure between the source of the test medium and the part being tested;
(d) continuously forming a rate of change of differential pressure based on the differential pressures sensed at the selected rate;
(e) continuously comparing the formed rate of change of differential pressures to a predetermined value to determine if an essentially steady state condition has been reached;
(f) rejecting the part after a predetermined period of time if the essentially steady state condition is not reached;
(g) combining selected differential pressure measurements once an essentially steady state condition has been reached to form a value useable to project whether or not the part will pass the test; and
(h) accepting or rejecting the part based on the projection.

73. Apparatus for dynamically projecting whether or not a part will pass a leak test including:
(a) means for subjecting the part to a predetermined test medium pressure, including a source of test medium, connected to;
(b) means for isolating the part from the source of test medium while continuing to subject the part to pressure, connected to;
(c) means for continuously sensing at a selected rate differential pressure between said source of test medium and the part being tested, connected to;
(d) means for continuously forming a rate of change of differential pressure based on the incremental pressures sensed at the selected rate, connected to;
(e) means for continuously comparing the formed rate of change of differential pressure to a predetermined value to determine if an essentially steady state condition has been reached, connected to;
(f) means for rejecting the part after a predetermined period of time if the essentially steady state condition has been reached, connected to;

(g) means for combining selected differential pressure measurements once an essentially steady state condition has been reached to form a value useable to project whether or not the part will pass the leak test; and (h) means for accepting or rejecting the part based on the projection, said means for accepting or rejecting connected to said means for continuously comparing.

* * * * *

UNITED STATES PATENT AND TRADEMARK OFFICE
CERTIFICATE OF CORRECTION

PATENT NO. : 4,587,619

DATED : May 6, 1986

INVENTOR(S) : Vernon G. Converse, III et al.

It is certified that error appears in the above-identified patent and that said Letters Patent is hereby corrected as shown below:

Column 11, line 33, delete "the", third occurrence.

Column 27, line 6, delete "(15 x 27.7 x 415.5)" and insert
-- (15 x 27.7 = 415.5) --.

Column 33, line 8, delete "equal and insert -- equals --.

Column 38, line 1, delete "rejet" and insert -- reject --.

Column 47, line 67, delete "the" and insert -- a --.

Signed and Sealed this

Third Day of February, 1987

Attest:

DONALD J. QUIGG

*Attesting Officer*  *Commissioner of Patents and Trademarks*